(12) United States Patent
Shin et al.

(10) Patent No.: US 12,442,787 B2
(45) Date of Patent: Oct. 14, 2025

(54) TRANSITION METAL ELECTRON TRANSFER COMPLEX HAVING C—N LIGAND AND ELECTROCHEMICAL BIO SENSOR USING SAME

(71) Applicants: I-sens, Inc., Seoul (KR); SOGANG UNIVERSITY RESEARCH & BUSINESS DEVELOPMENT FOUNDATION, Seoul (KR)

(72) Inventors: Hyunseo Shin, Seoul (KR); Young Jea Kang, Seoul (KR); Seok-Won Lee, Seoul (KR); Bongjin Moon, Seoul (KR); Gwang Jin Kim, Seoul (KR)

(73) Assignees: I-SENS, INC., Seoul (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 469 days.

(21) Appl. No.: 17/785,507

(22) PCT Filed: Dec. 16, 2020

(86) PCT No.: PCT/KR2020/018456
§ 371 (c)(1),
(2) Date: Jun. 15, 2022

(87) PCT Pub. No.: WO2021/125791
PCT Pub. Date: Jun. 24, 2021

(65) Prior Publication Data
US 2023/0125122 A1    Apr. 27, 2023

(30) Foreign Application Priority Data
Dec. 16, 2019  (KR) .......................... 10-2019-0168319

(51) Int. Cl.
*G01N 27/327*    (2006.01)
*A61B 5/145*    (2006.01)
(Continued)

(52) U.S. Cl.
CPC ....... *G01N 27/3277* (2013.01); *C07F 15/002* (2013.01); *G01N 27/3271* (2013.01); *A61B 5/14532* (2013.01); *A61B 5/14865* (2013.01)

(58) Field of Classification Search
CPC ............ G01N 27/3277; G01N 27/3271; C07F 15/002; A61B 5/14532; A61B 5/14865;
(Continued)

(56) References Cited

U.S. PATENT DOCUMENTS

| 2009/0294307 A1* | 12/2009 | Liu ...................... A61B 5/1495 205/792 |
| 2010/0018872 A1* | 1/2010 | Feldman ............ G01N 27/3272 204/403.14 |

(Continued)

FOREIGN PATENT DOCUMENTS

| EP | 2275494 | 1/2011 |
| JP | 2004-176072 | 6/2004 |

(Continued)

OTHER PUBLICATIONS

Cerón-Camacho et al. (A glance at the reactivity of osma(II)cycles [Os(C—N)x(bpy)3-x]m+(x =0-3) Covering a 1.8 V Potential Range toward Peroxidase through Monte Carlo Simulations (-C—N=o-2-phenylpyridinato,bpy = 2,2'-bipyridine), Journal of Inorganic biochemistry, 2014, 134, 20-24 (Year: 2014).*

(Continued)

*Primary Examiner* — Luan V Van
*Assistant Examiner* — Shizhi Qian
(74) *Attorney, Agent, or Firm* — LEX IP MEISTER, PLLC

(57) ABSTRACT

The present invention relates: to a novel transition metal complex having a C—N ligand, which can be used for
(Continued)

various devices including an electrochemical sensor, to a device comprising same; and preferably, to an electrochemical sensor.

4 Claims, 27 Drawing Sheets

(51) Int. Cl.
*A61B 5/1486* (2006.01)
*C07F 15/00* (2006.01)
(58) Field of Classification Search
CPC ..... A61B 5/145; A61B 5/1468; A61B 5/1486; C12Q 1/001
See application file for complete search history.

(56) References Cited

U.S. PATENT DOCUMENTS

| | | | |
|---|---|---|---|
| 2010/0213082 A1* | 8/2010 | Feldman | C12Q 1/006 204/403.14 |
| 2011/0155238 A1 | 6/2011 | Shen et al. | |
| 2012/0215000 A1 | 8/2012 | Tsai | |
| 2013/0034664 A1* | 2/2013 | Forrow | C12Q 1/006 427/58 |
| 2014/0138653 A1 | 5/2014 | Tsai et al. | |
| 2017/0350850 A1 | 12/2017 | Yoon et al. | |

FOREIGN PATENT DOCUMENTS

| | | |
|---|---|---|
| KR | 20160082160 | 7/2016 |
| WO | 2009-131183 | 10/2009 |
| WO | 2013/117870 | 8/2013 |

OTHER PUBLICATIONS

Su et al., A new cycloruthenated complex: Synthesis, characterization and colorimetric detection of bisulphite in water, Journal of Organometallic Chemistry, 2015, 781, 59-64 (Year: 2015).*
Brian J. MacLean et al., "Bithiophene-bithiazole copolymers and their metal complexes", J. Mater. Chem., 2001, 11, 1357-1363, Mar. 16, 2001, DOI: 10.1039/b009568k.
Guangjiu Li et al., "Electrochemical biosensor based on the interaction between copper (II) complex with 4,5-diazafluorene-9-one and bromine ligands and deoxyribonucleic acid", Electrochimica Acta 53 (2008) 2870-2876, Nov. 13, 2007, doi:10.1016/j.electacta.2007.10.079.
Sipo, Office Action of CN 202080087558.1 dated May 8, 2024.
Stefan Barwe et al., "Codeposited Poly(benzoxazine) and Os-Complex Modified Polymethacrylate Layers as Immobilization Matrix for Glucose Biosensors", Electroanalysis 2015, 27, 2158-2163, Jul. 14, 2015.
Geoffrey McGarraugh, "The Chemistry of Commercial Continuous Glucose Monitors", Diabetes Technology & Therapeutics, vol. 11, Supplement 1, 2009, S-17-S-24, May 2009, total 8 pages.
Sipo, Notice of Allowance of the corresponding CN Patent Application No. 202080087558.1., dated Sep. 12, 2024, total 6 pages.
Cerón-Camacho, Ricardo, et al. "A glance at the reactivity of osma (II) cycles [Os (C—N) x (bpy) 3-x] m+(x= 0-3) Covering a 1.8 V Potential Range toward Peroxidase through Monte Carlo Simulations (-C—N= o-2-phenylpyridinato, bpy= 2, 2'-bipyridine)." Journal of Inorganic Biochemistry 134 (Jan. 22, 2014): 20-24.
Soukharev, Valentin S., et al. "Synthesis, properties, and biosensor applications of cycloruthenated 2-phenylimidazoles." Journal of organometallic chemistry 668.1-2 (Jan. 16, 2003): 75-81.
KIPO, Office Action of the corresponding Korean Patent Application No. 10-2020-0176631 dated Jan. 30, 2023.
EPO, the extended European search report of application No. 20901134.5 dated May 10, 2023.
Cerón-Camacho, Ricardo, et al. "Easy access to bio-inspired Osmium (II) complexes through electrophilic intramolecular C (sp 2)-H bond cyclometalation." Inorganic chemistry 47.11 (May 6, 2008): 4988-4995.
Boff, Bastien, et al. "Cancer cell cytotoxicity of cyclometalated compounds obtained with osmium (II) complexes." Inorganic Chemistry 52.5 (Feb. 21, 2013): 2705-2715.
Cerón-Camacho, Ricardo, et al. "Cyclometalated [Os (C—N) x (N—N) 3-x] m+ mimetics of tris (2, 2'-bipyridine) osmium (ii): Covering a 2 V potential range by known (x= 0, 1) and new (x= 2, 3) species (C—N= o-2-phenylpyridinato)." Chemical Communications 47.10 (Jan. 14, 2011): 2823-2825.
Cerón-Camacho, Ricardo, et al. "A glance at the reactivity of osma (II) cycles [Os (C—N) x (bpy) 3-x] m+(x= 0-3) Covering a 1.8 V Potential Range toward Peroxidase through Monte Carlo Simulations (-C—N= o-2-phenylpyridinato, bpy= 2, 2'-bipyridine)." Journal of Inorganic Biochemistry 134 (Available online Jan. 22, 2014): 20-24.
KIPO, PCT Search Report & Written Opinion of PCT/KR2020/018456 dated Mar. 22, 2021.
Alexander D. Ryabov et al., "Low-Potential Cyclometalated Osmium(II) Mediators of Glucose Oxidase", Inorganic chemistry, 2003, 42, pp. 6598-6600.
Alexander D. Ryabov et al., "TAML Activator-Based Amperometric Analytical Devices as Alternatives to Peroxidase Biosensors", Analytical chemistry, 2012, 84, pp. 9096-9100, Sep. 25, 2012.
Ricardo Ceron-Camacho et al., "Cyclometalated [Os(C—N)x(N—N)3-x]m+ mimetics of tris(2,2'-bipyridine)osmium(ii): covering a 2 V potential range by known (x = 0, 1) and new (x = 2, 3) species (C—N = o-2-phenylpyridinato)", Chem. Commun., 2011, 47, 2823-2825.
JPO, Office Action of the corresponding Japanese Patent Application No. 2022-537823, dated Jul. 7, 2023.
Ricardo Cerón-Camacho et al., "A glance at the reactivity of osma(II)cycles [Os(C—N)x(bpy)3-x]m+ (x=0-3) Covering a 1.8V Potential Range toward Peroxidase through Monte Carlo Simulations (-C—N=o-2-phenylpyridinato, bpy=2,2'-bipyridine)," Journal of Inorganic Biochemistry, vol. 134, pp. 20-24, Jan. 22, 2014, doi: https://doi.org/10.1016/j.jinorgbio.2014.01.008.
Bobak Gholamkhass et al., "Evaluation of Electronic Interaction Matrix Elements for Photoinduced Electron Transfer Processes within Mixed-Valence Complexes", J. Phys. Chem. B 1997, 101, 9010-9021.
T. Arthur et al., "Synthesis of Triple Halide-Bridged Arene Complexes of Ruthenium(II) and Osmium(II)", Journal of Organometallic Chemistry, 208 (1981) 369-387.

* cited by examiner

[FIG 1]
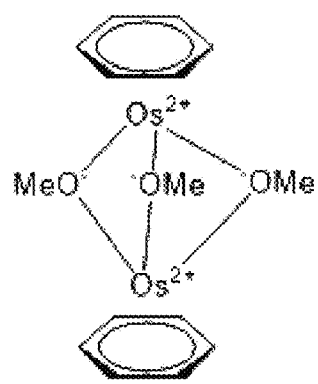
$C_{15}H_{21}O_3Os_2$
Exact Mass: 633.071
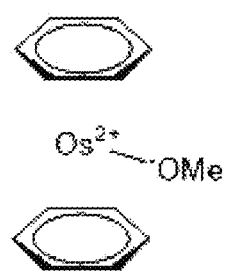
$C_{13}H_{15}OOs$
Exact Mass: 379.073

[FIG 2]
C-N complex
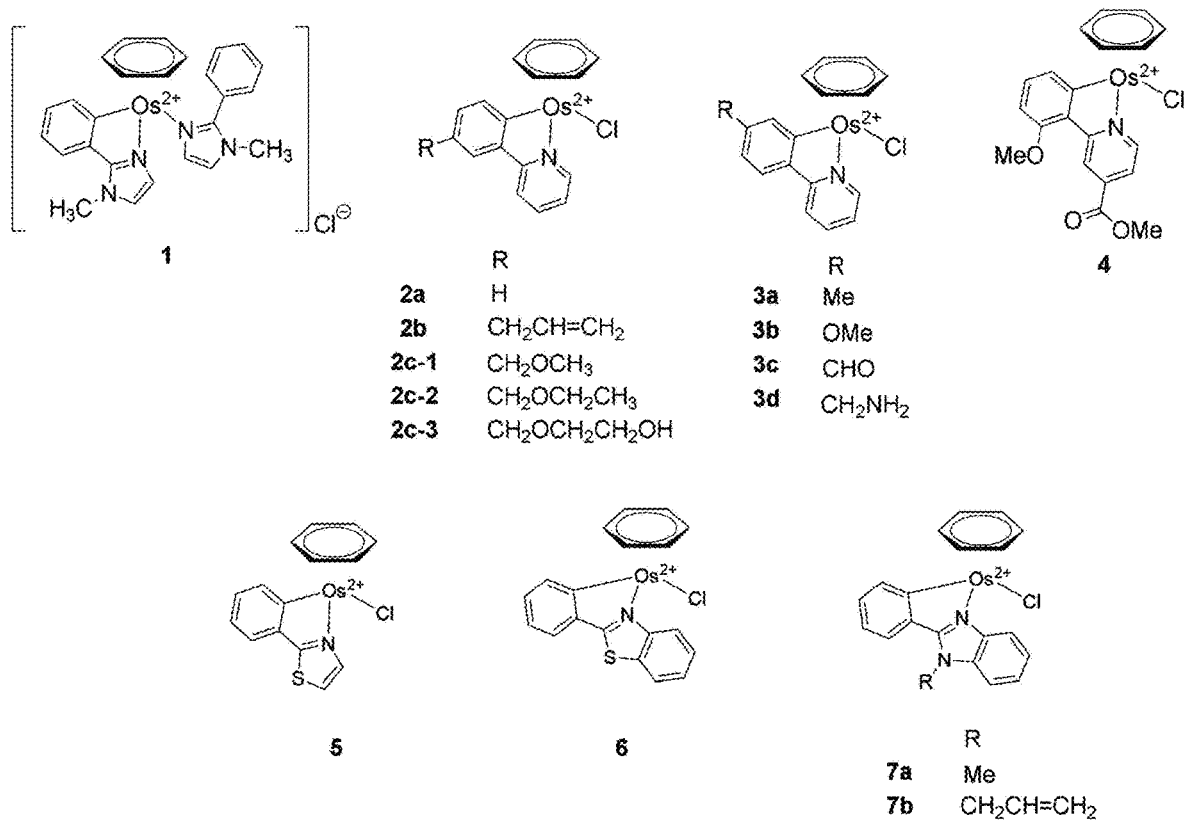

[FIG 3a]
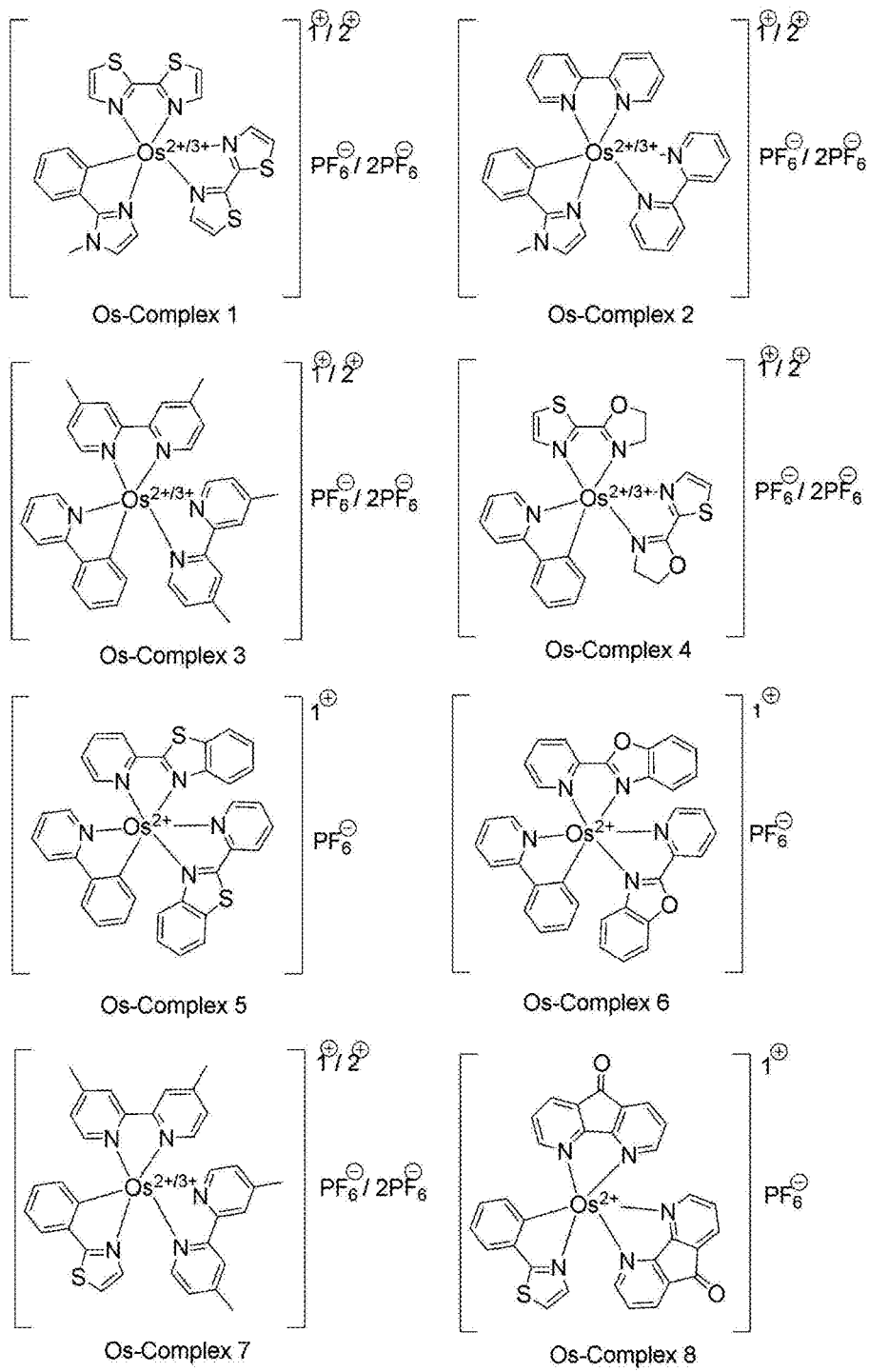

[FIG 3b]
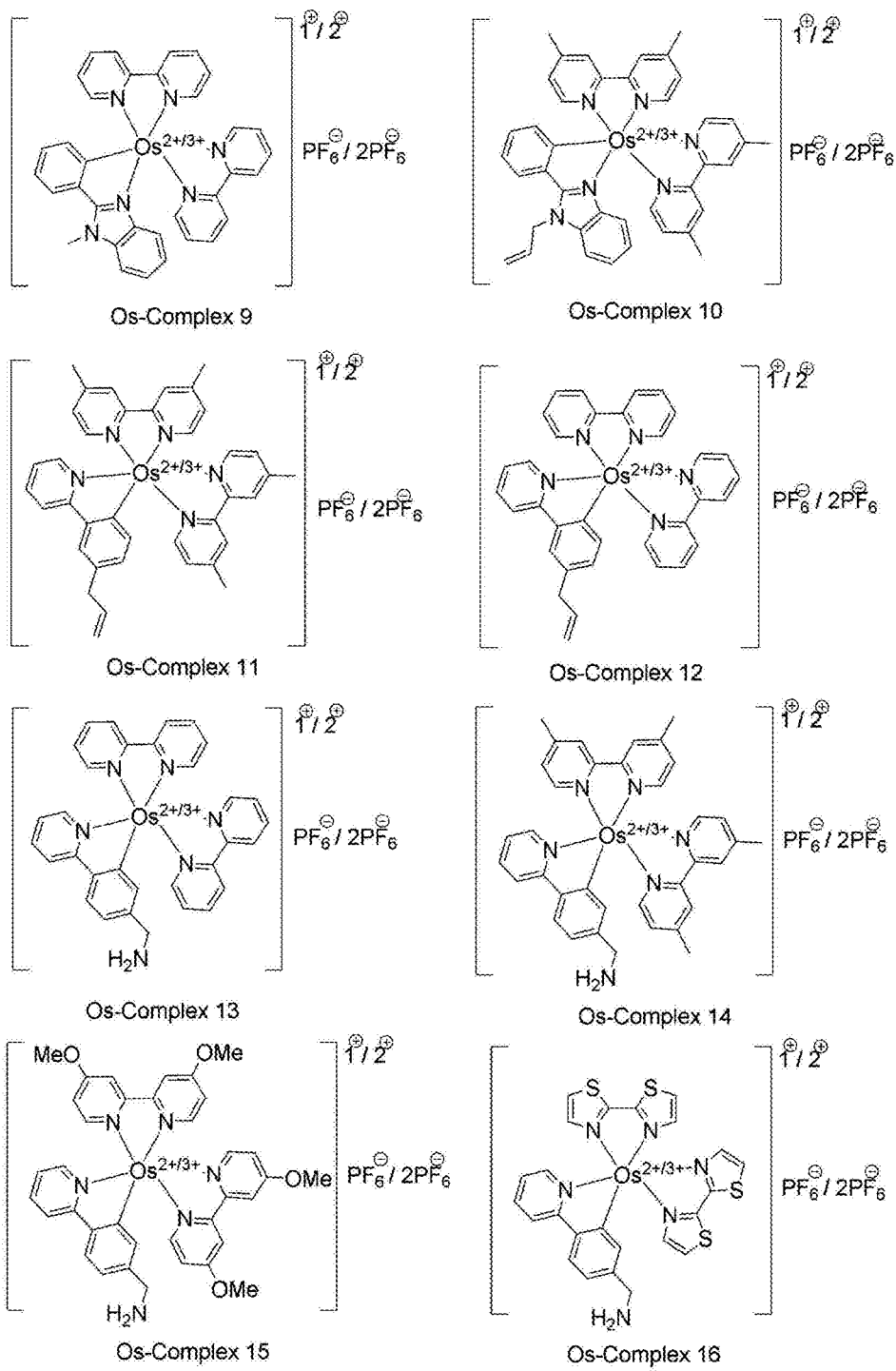

[FIG 3c]
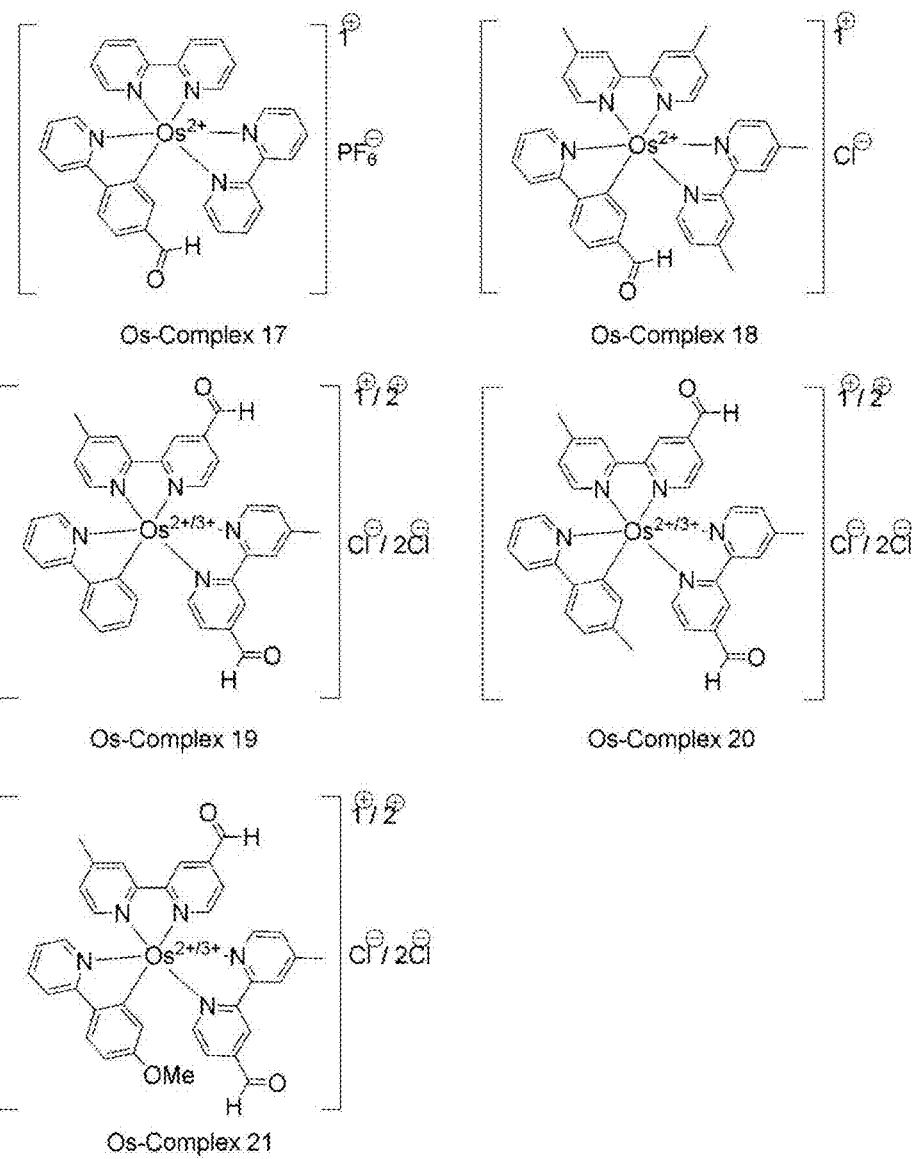

[FIG 4]
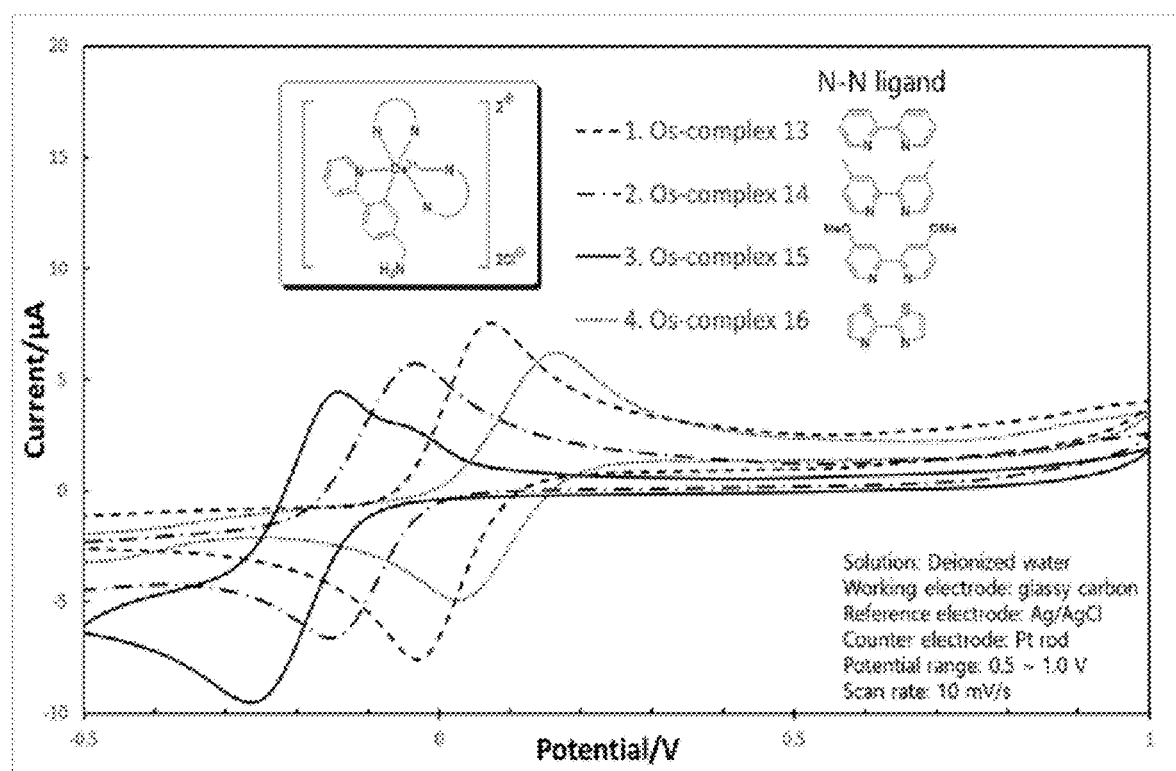

[FIG 5]
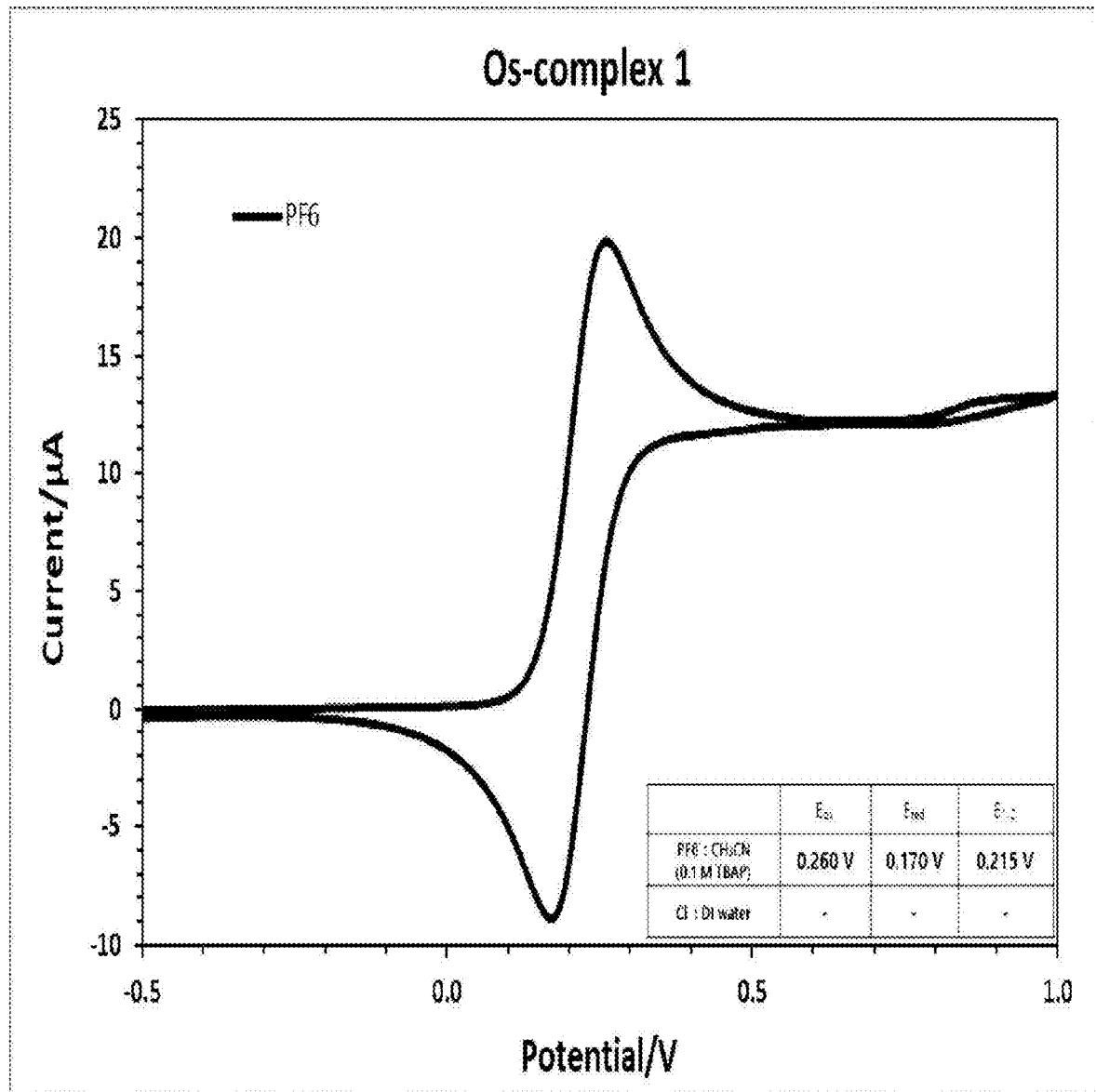

[FIG 6]
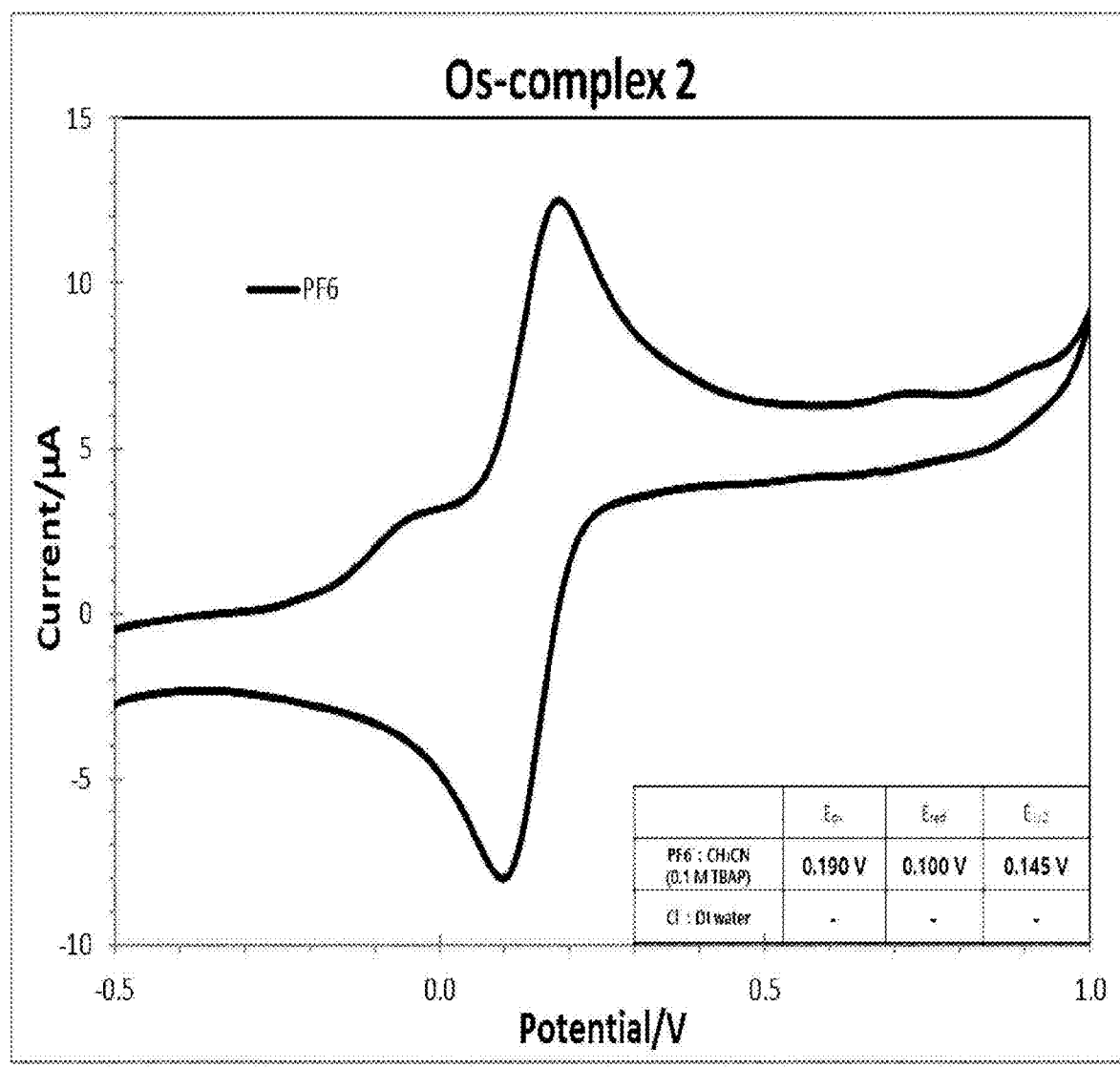

[FIG 7]
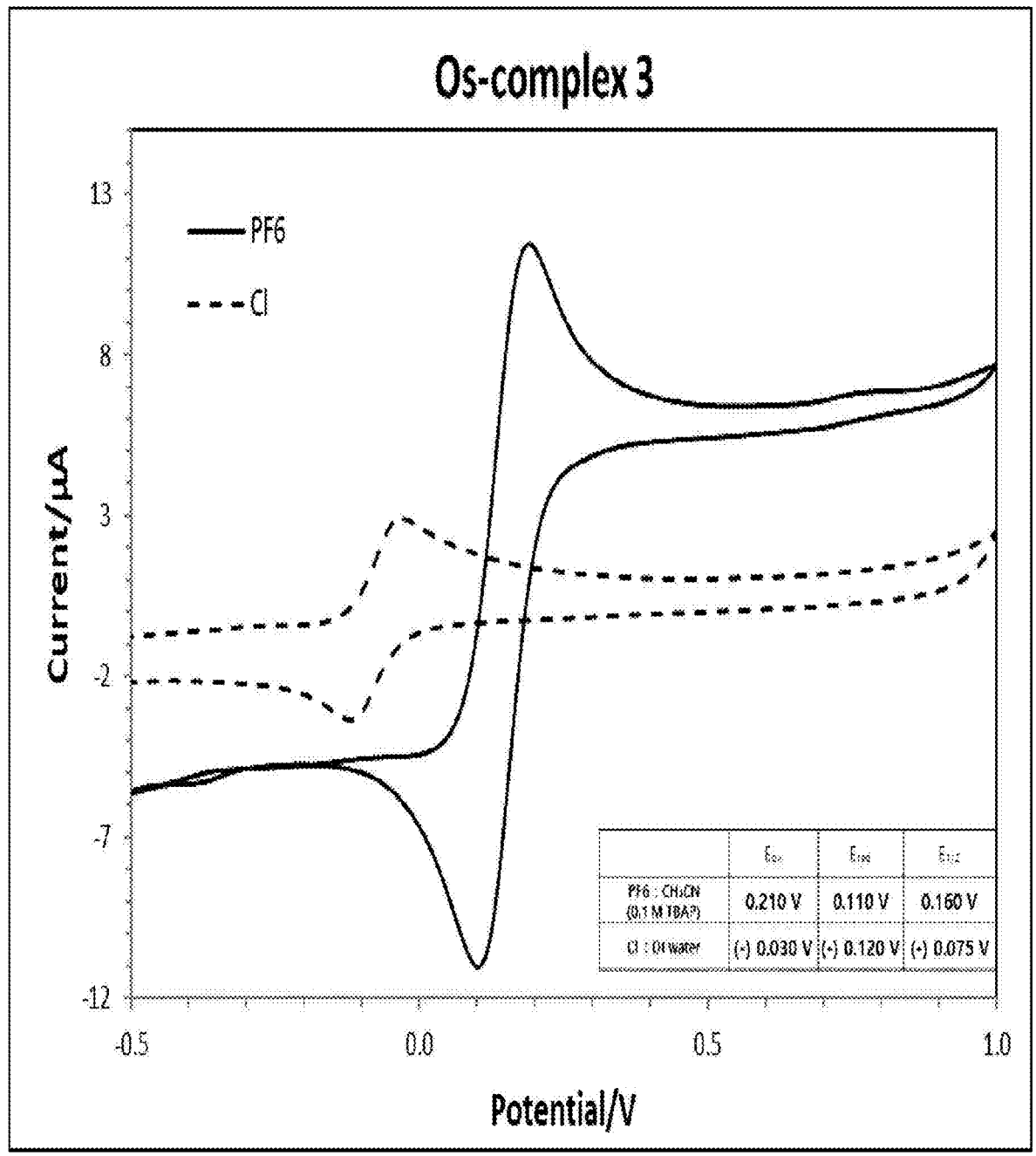

[FIG 8]
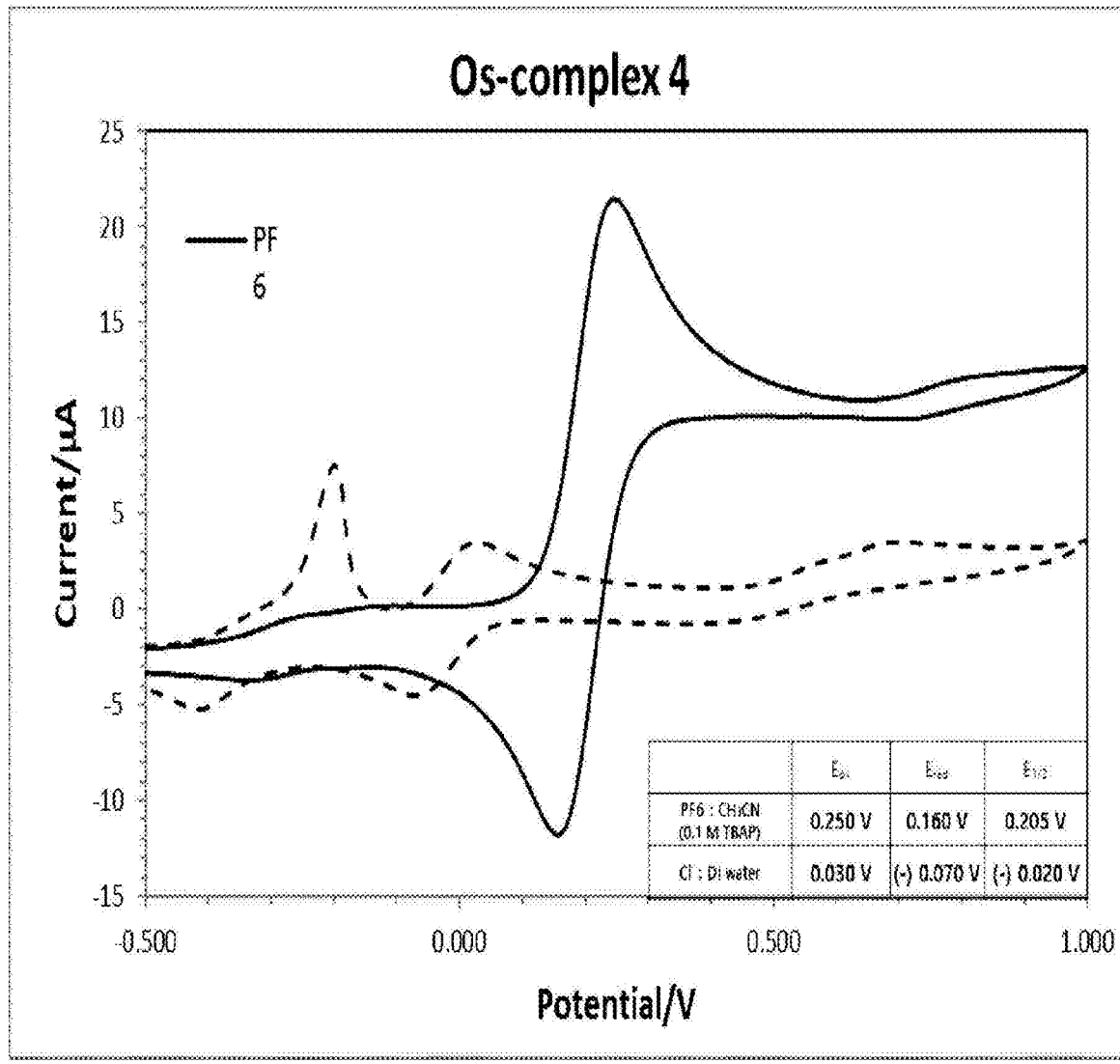

[FIG 9]
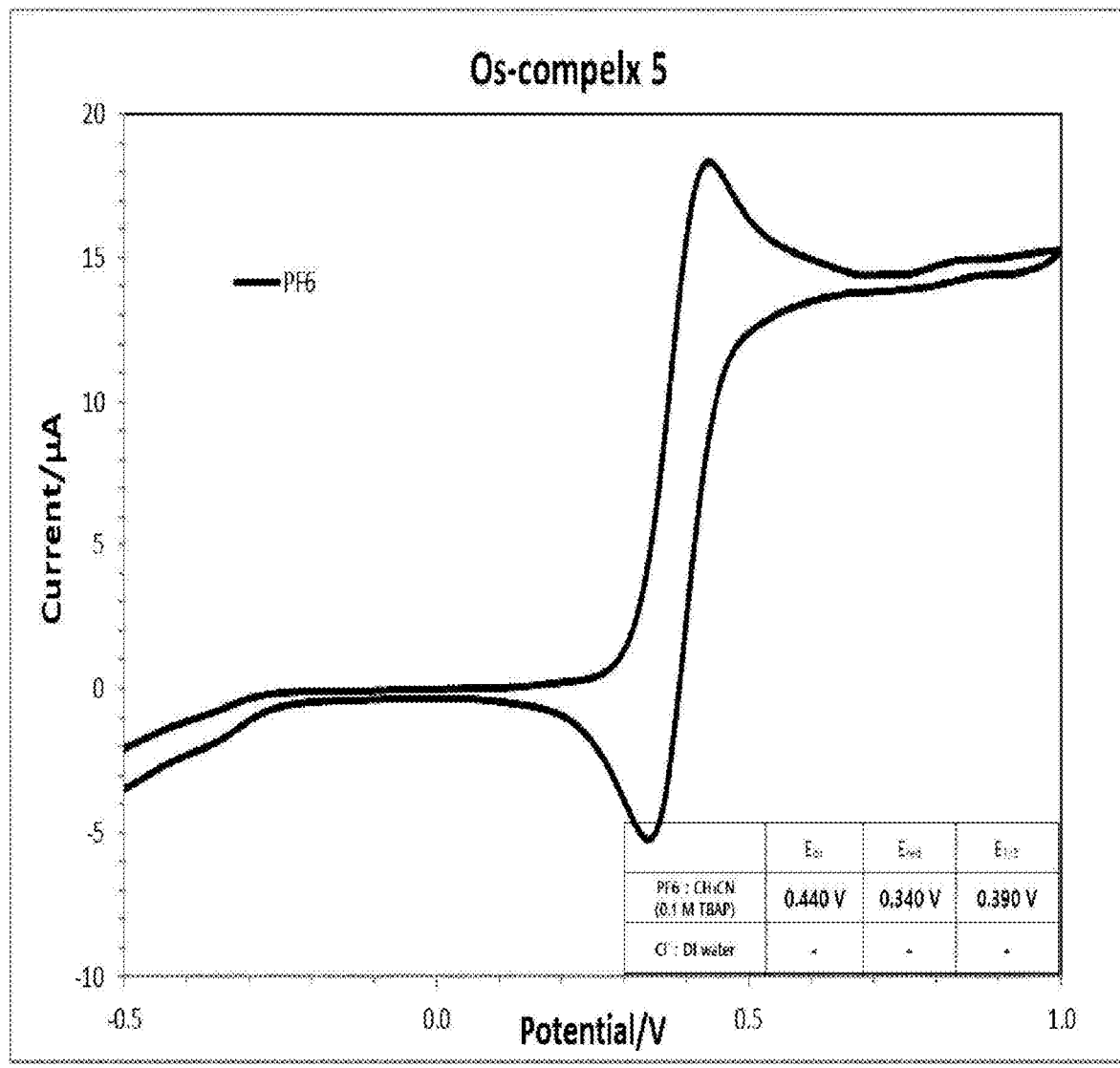

[FIG 10]
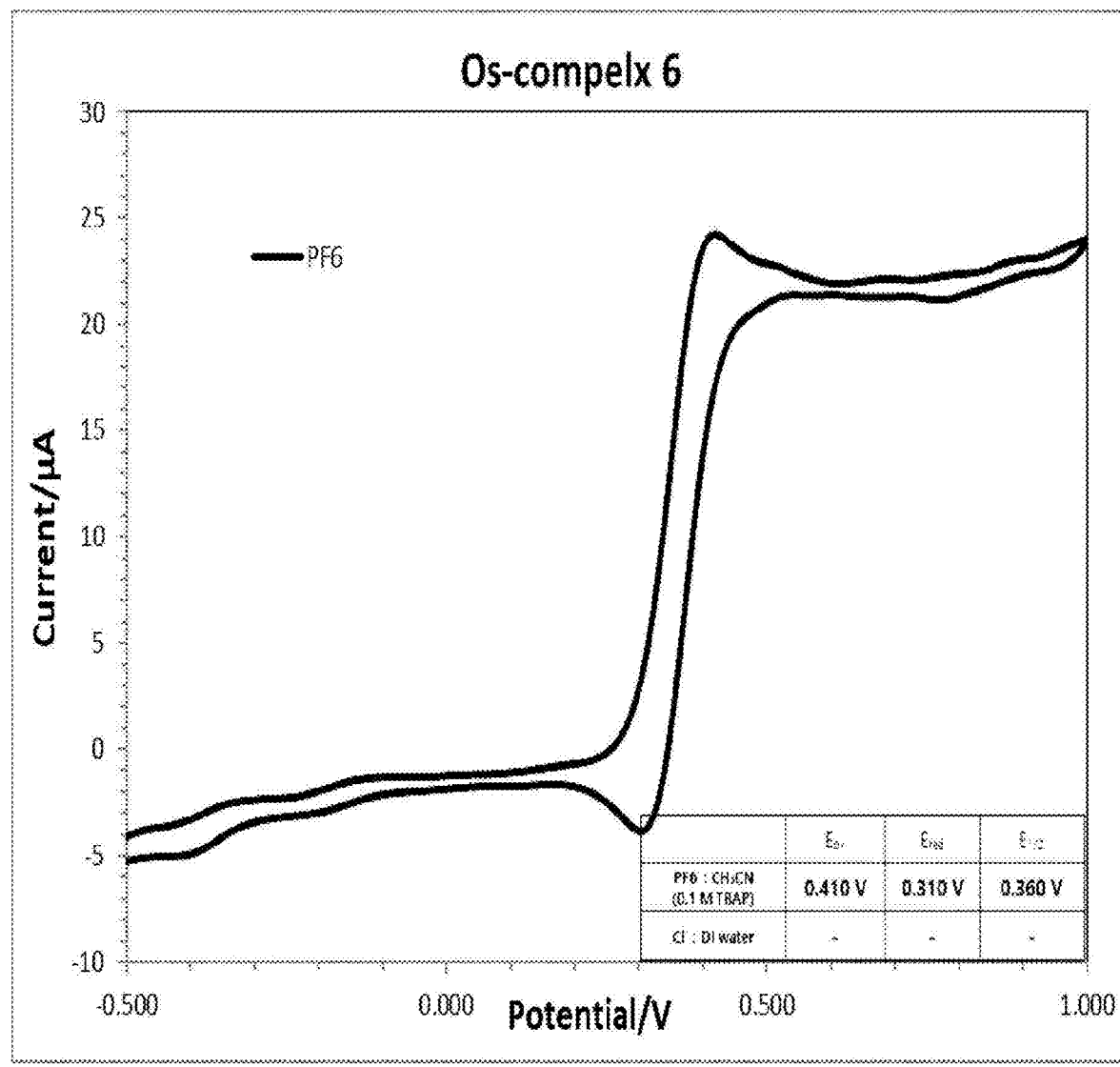

[FIG 11]
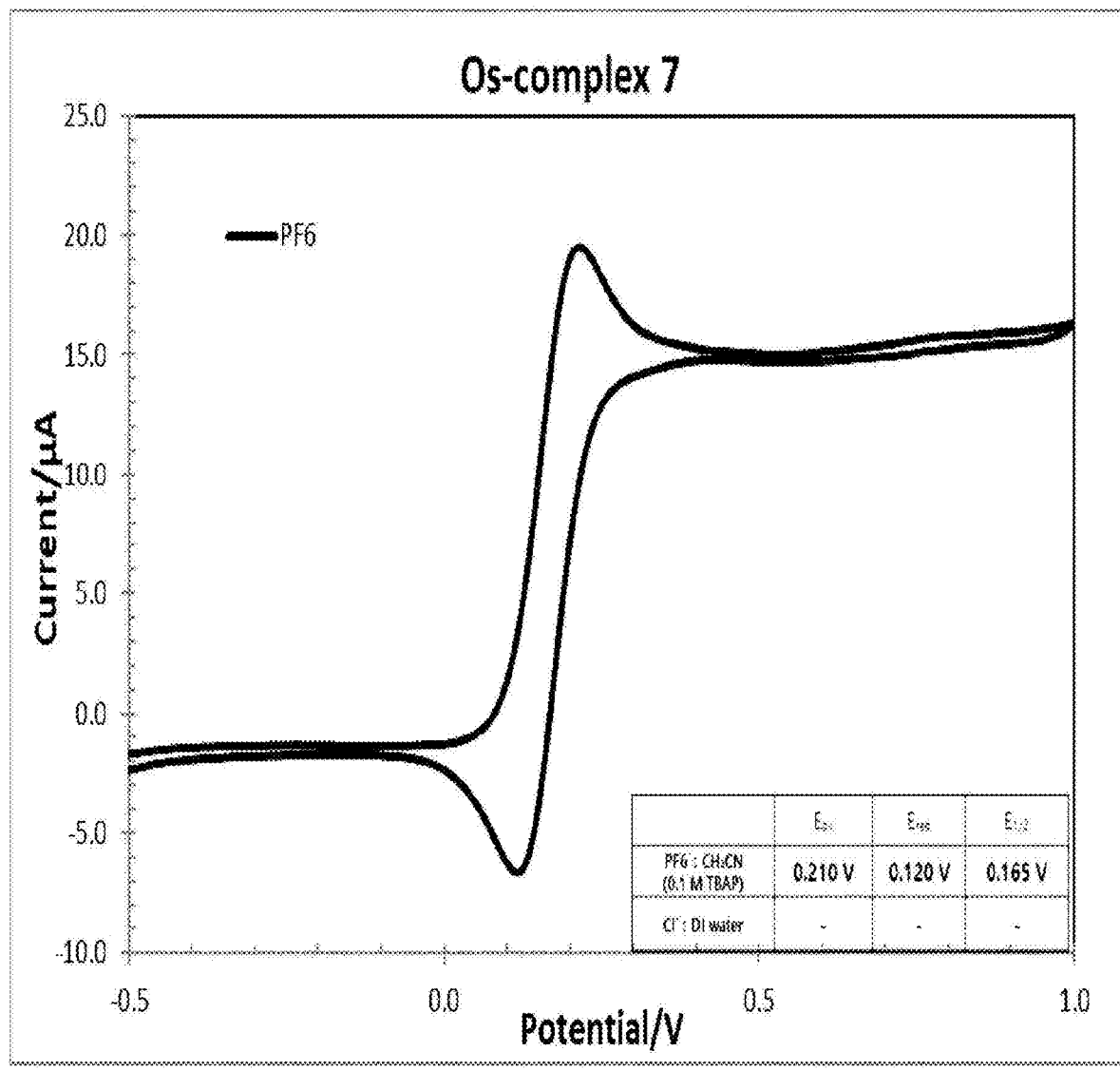

[FIG 12]
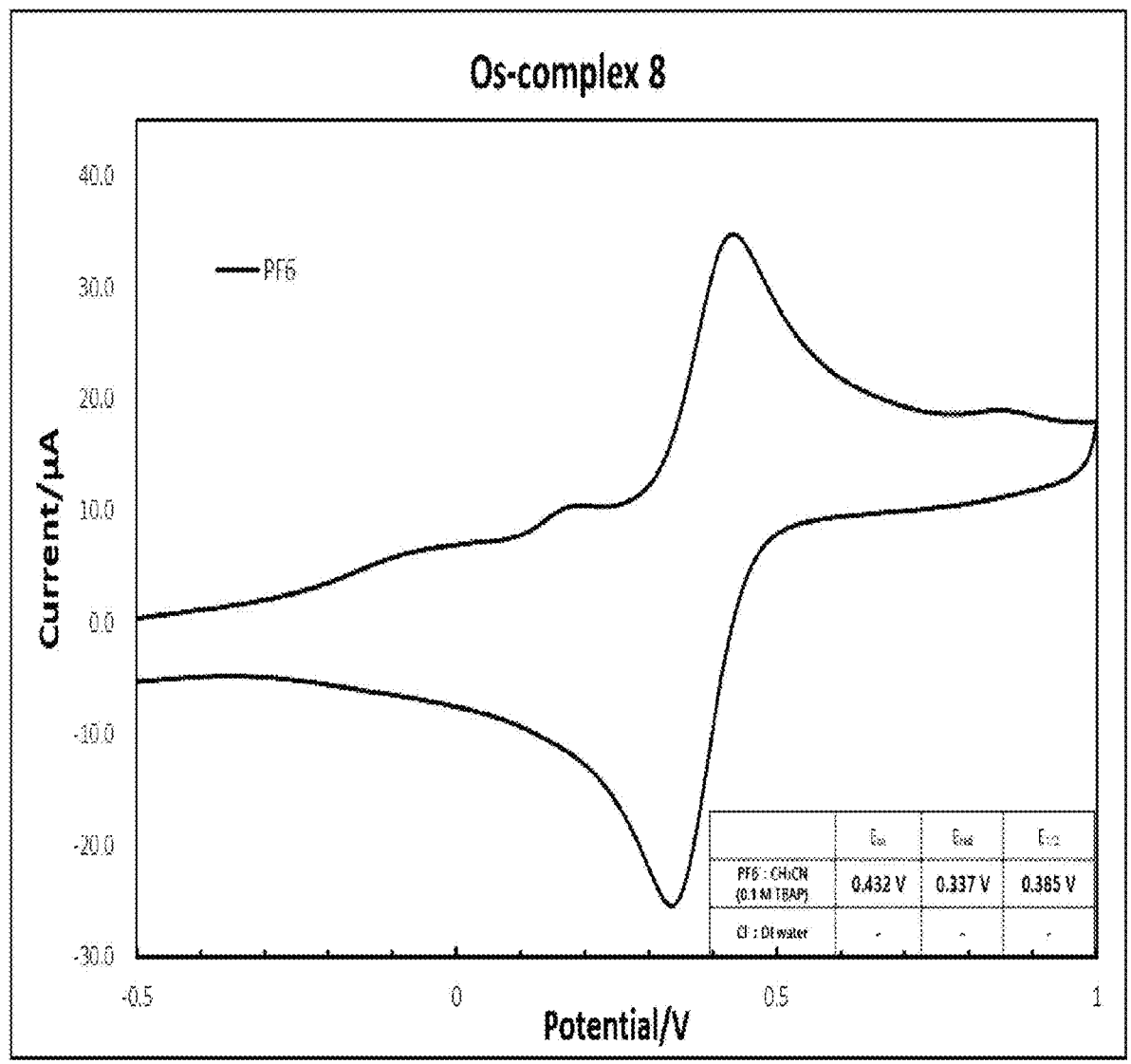

[FIG 13]
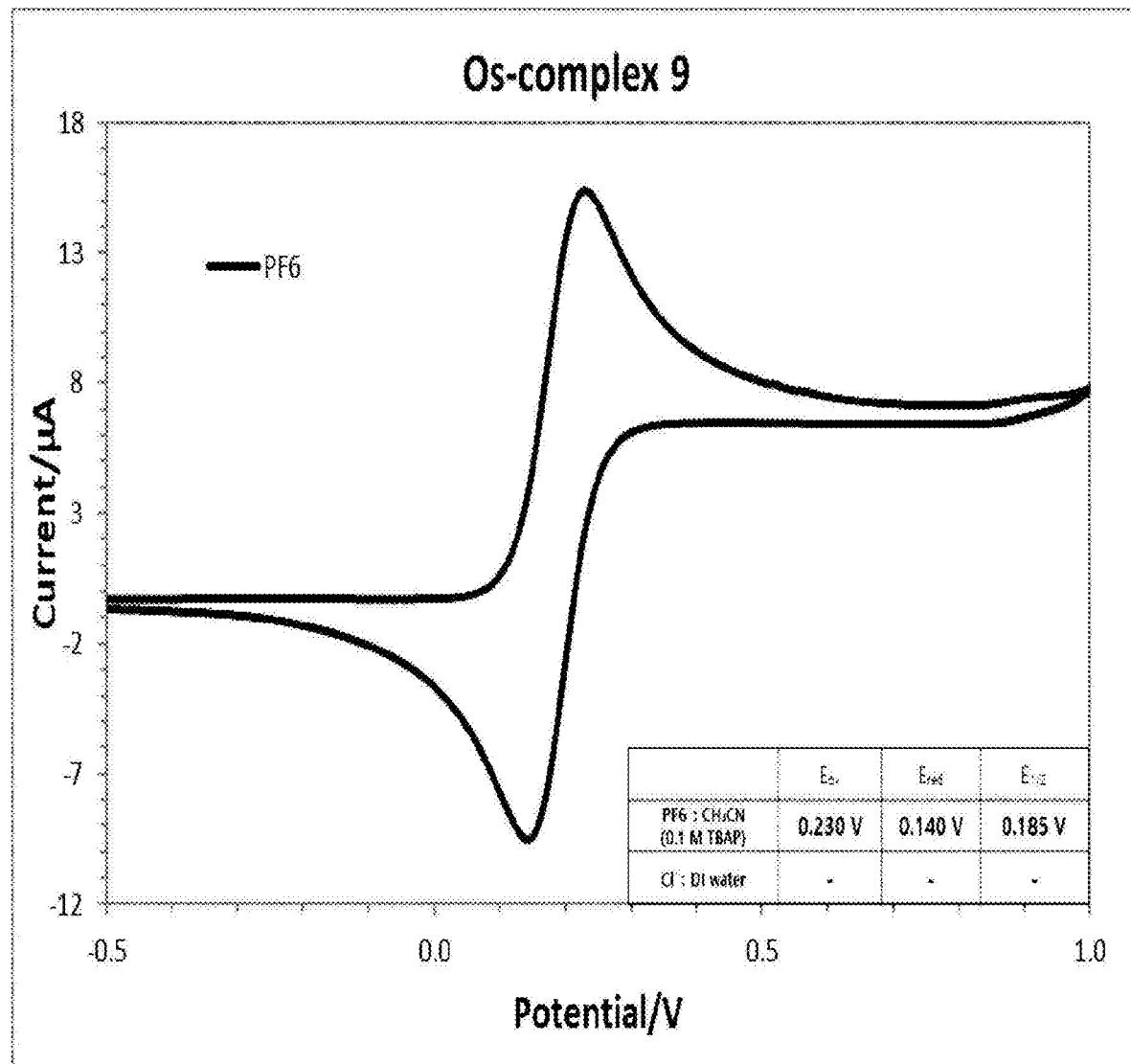

[FIG 14]
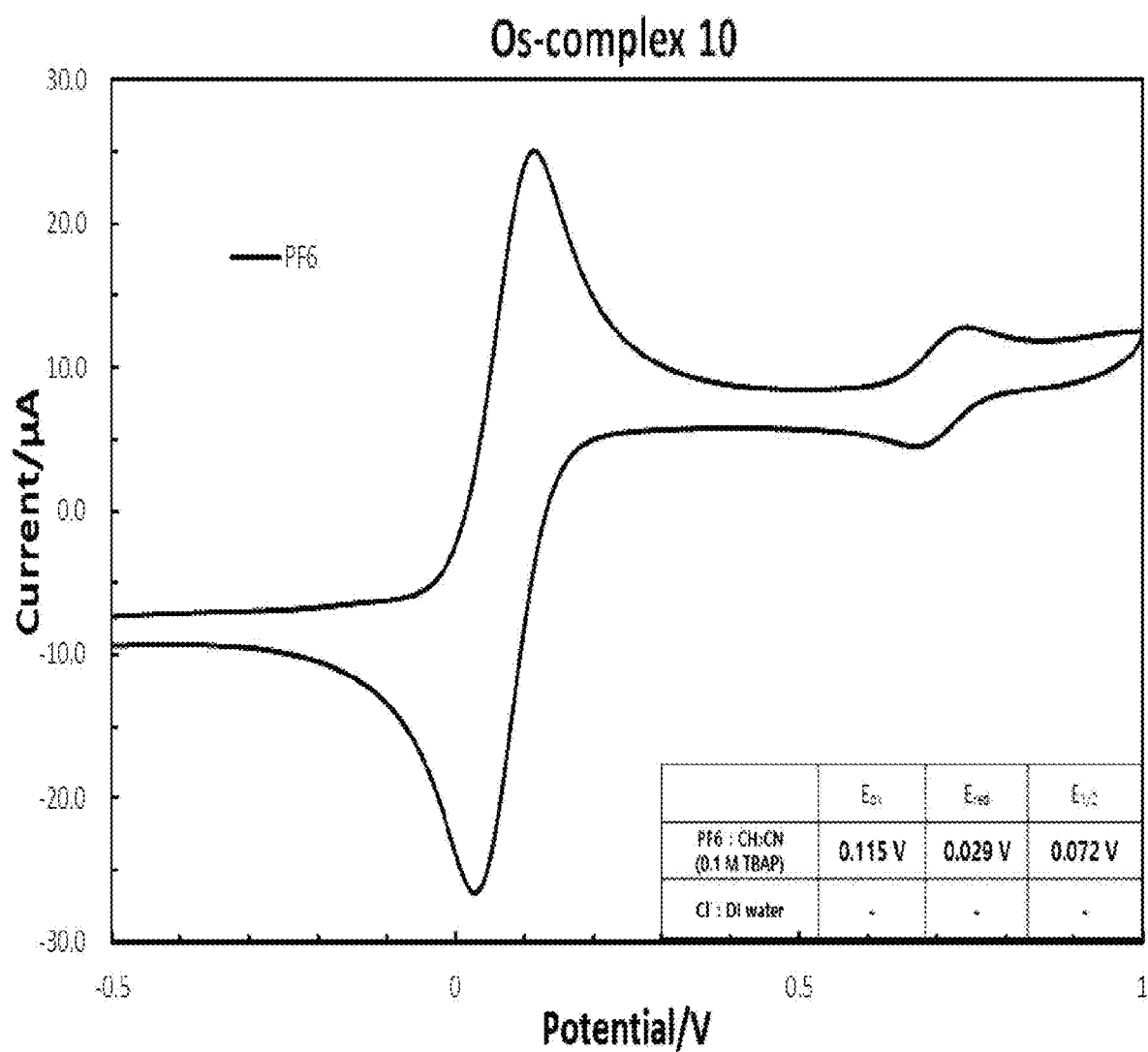

[FIG 15]
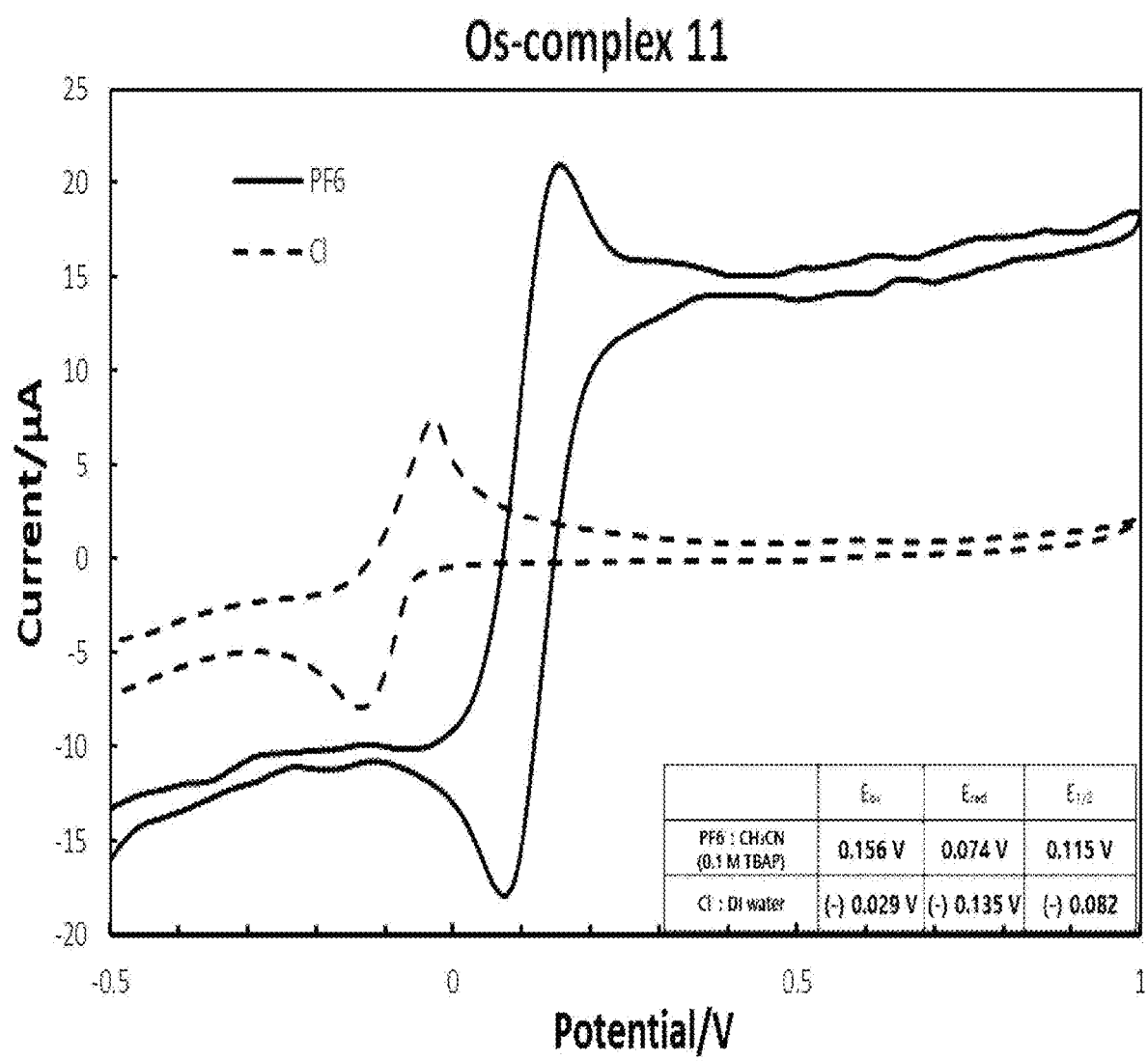

[FIG 16]
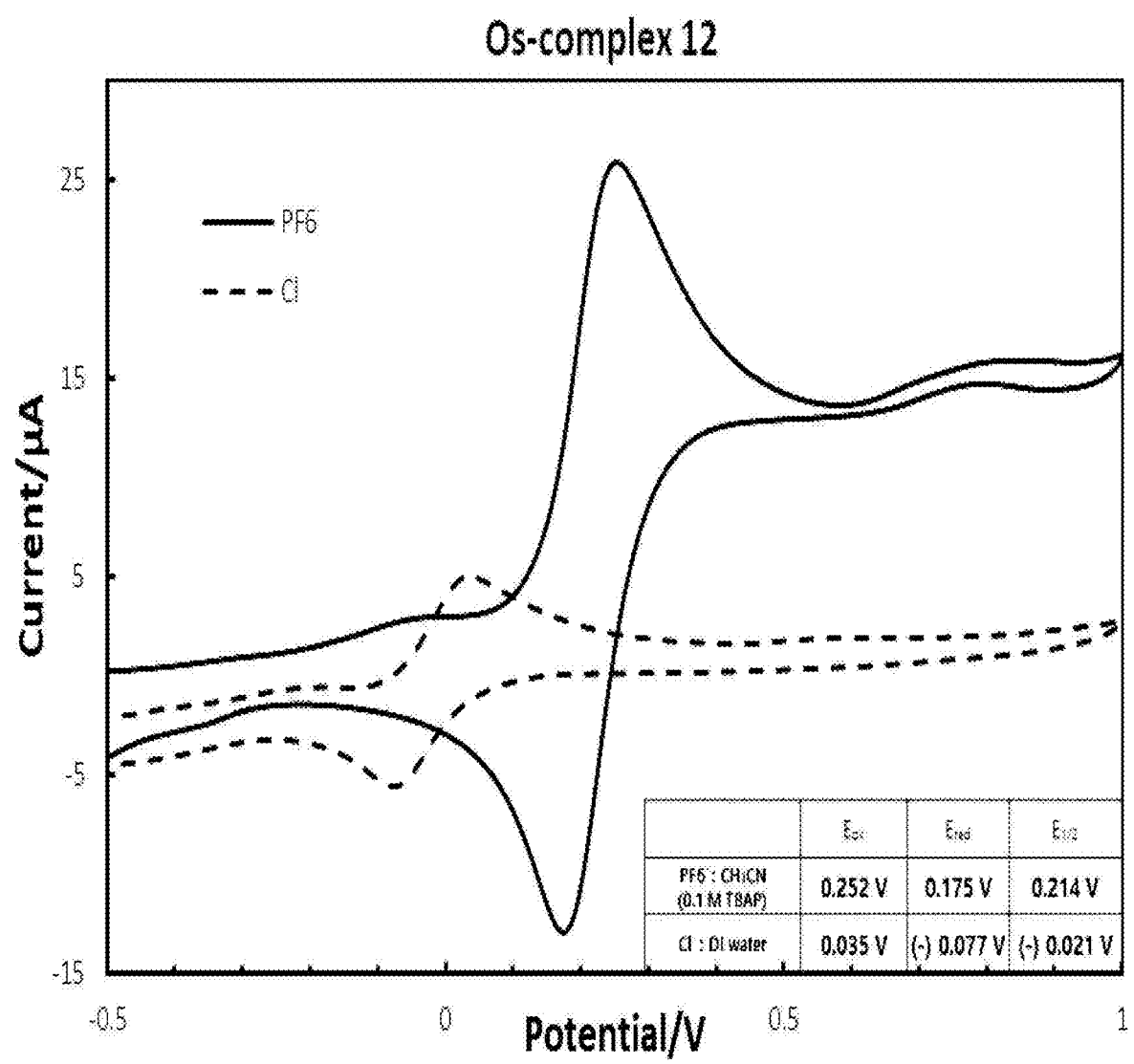

[FIG 17]
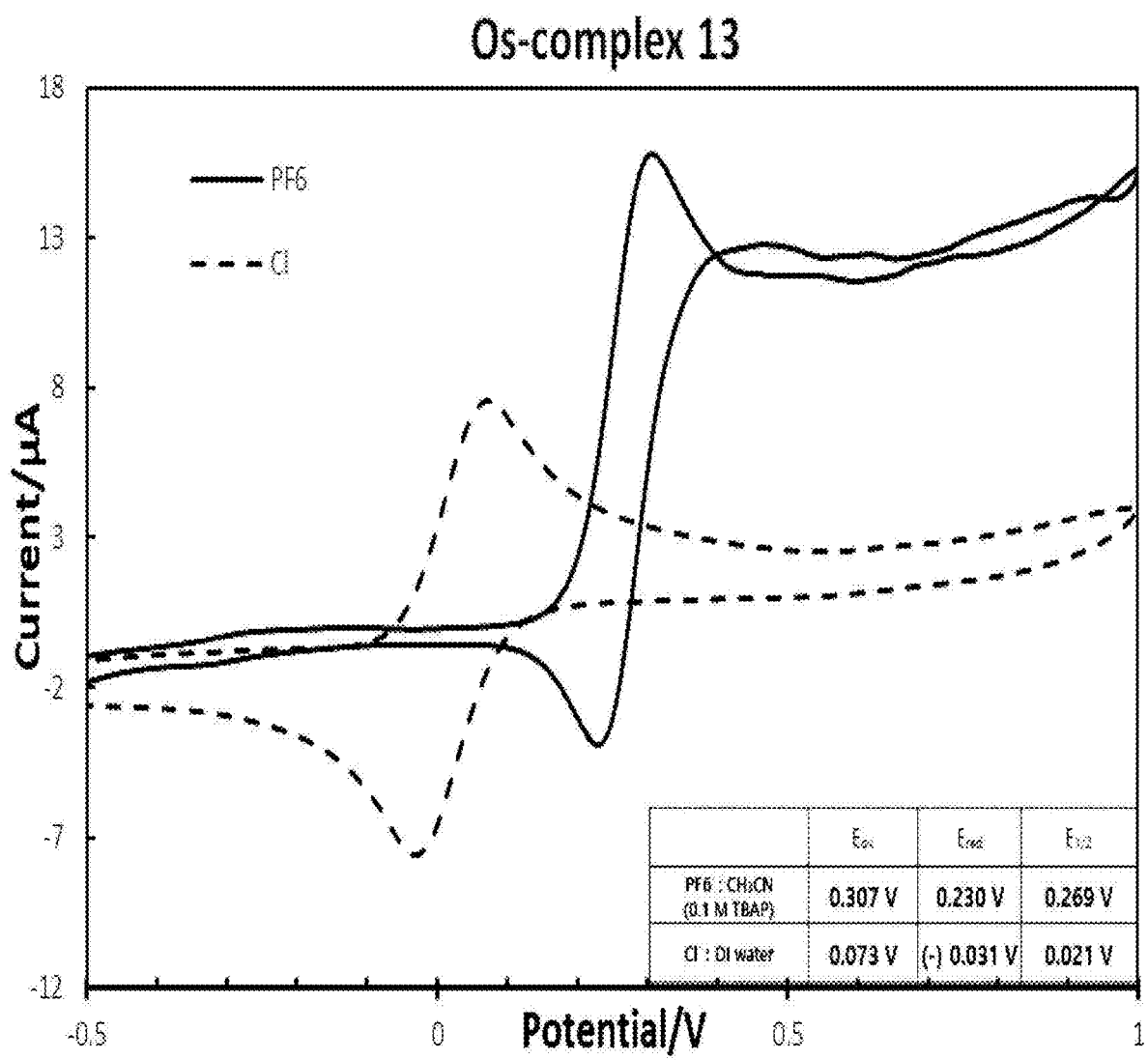

[FIG 18]
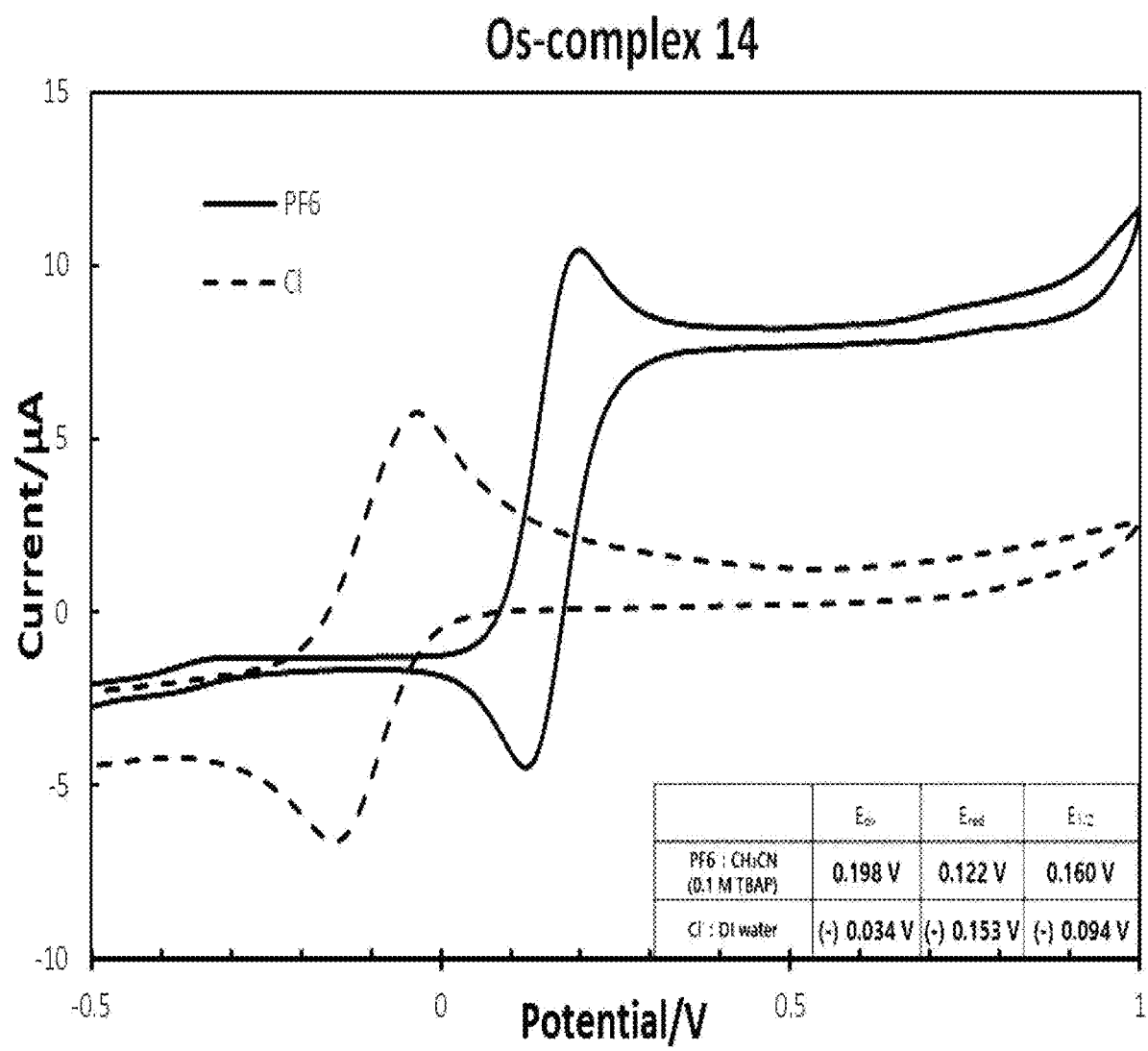

[FIG 19]
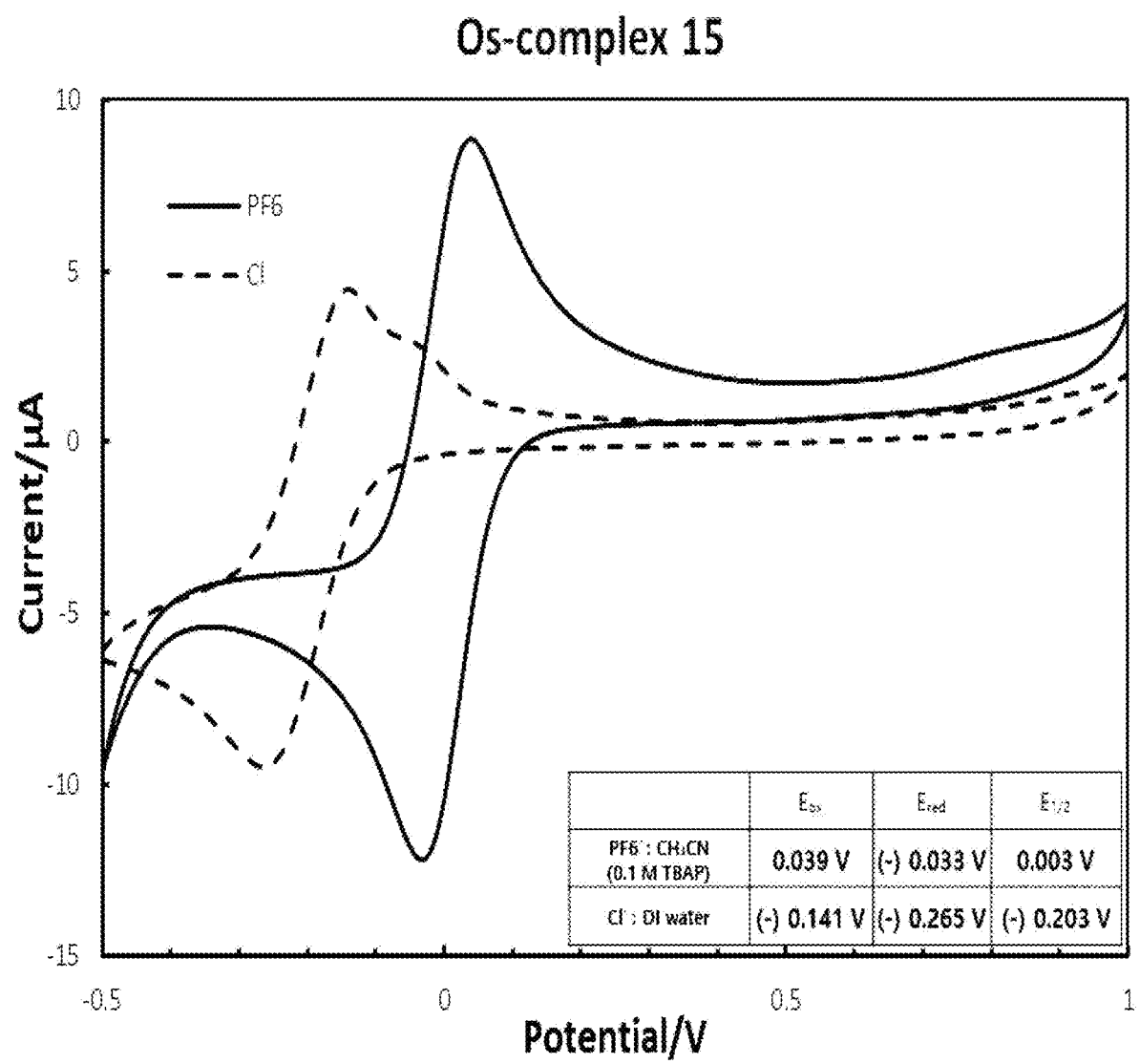

[FIG 20]
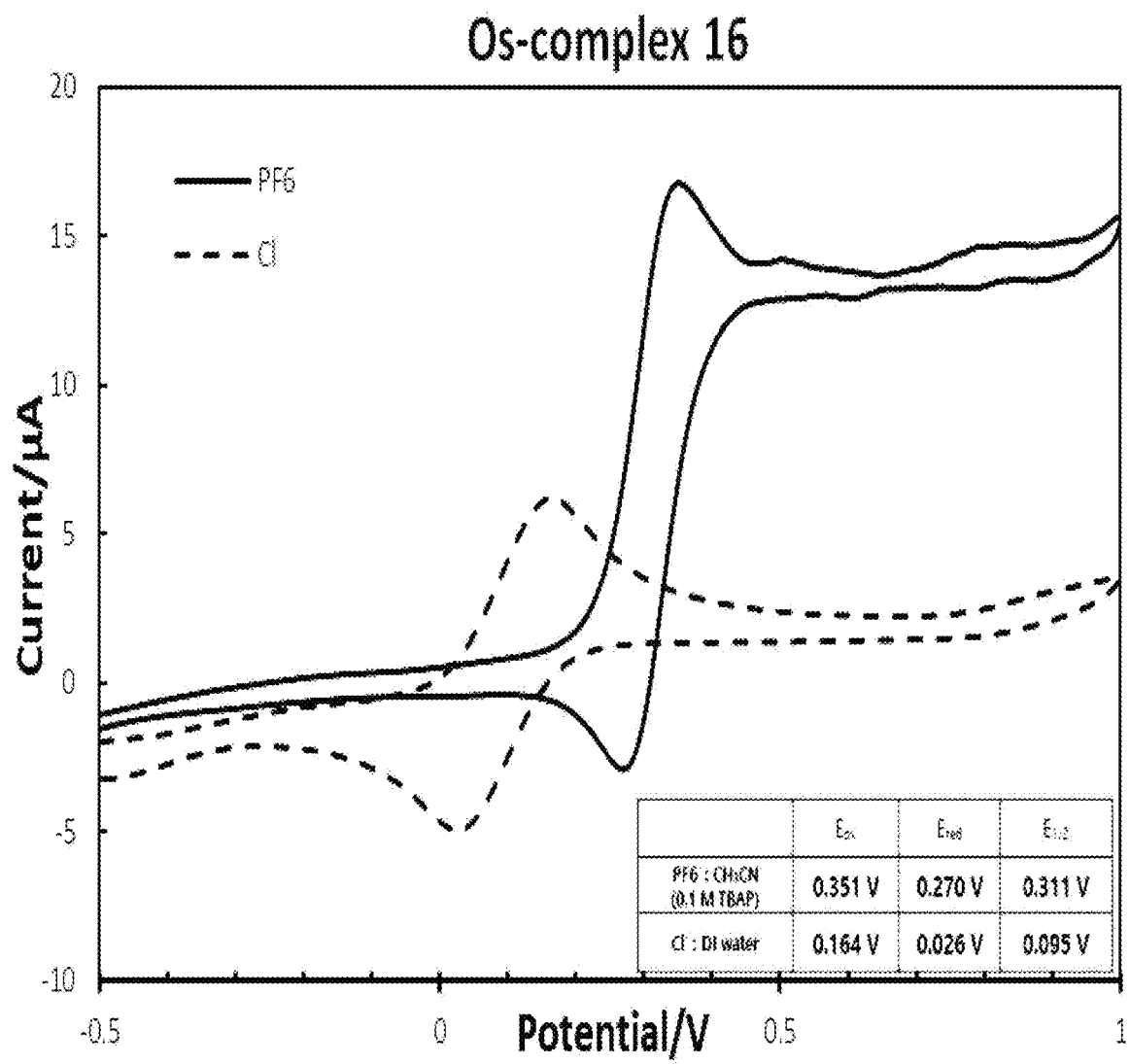

[FIG 21]
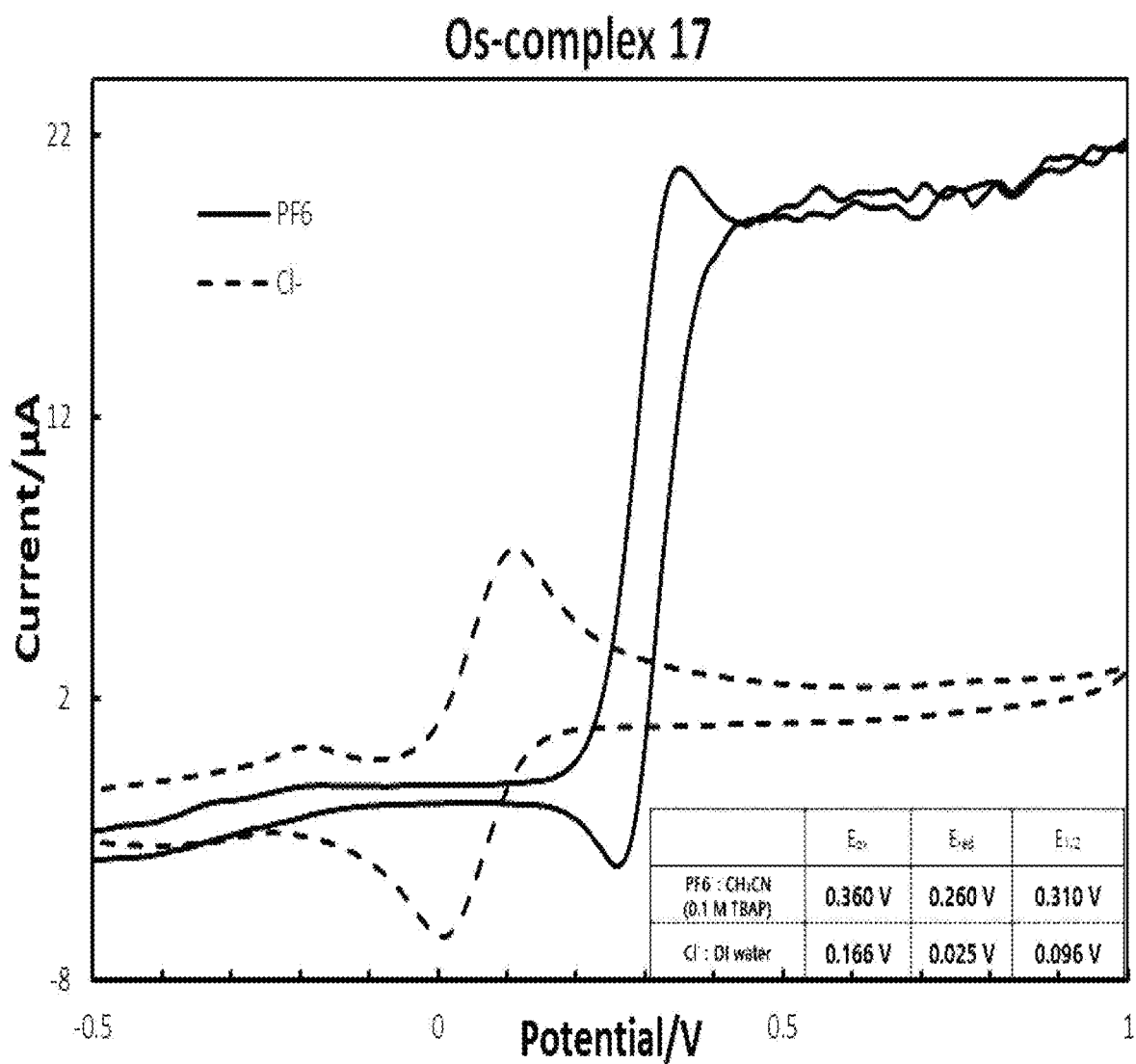

[FIG 22]
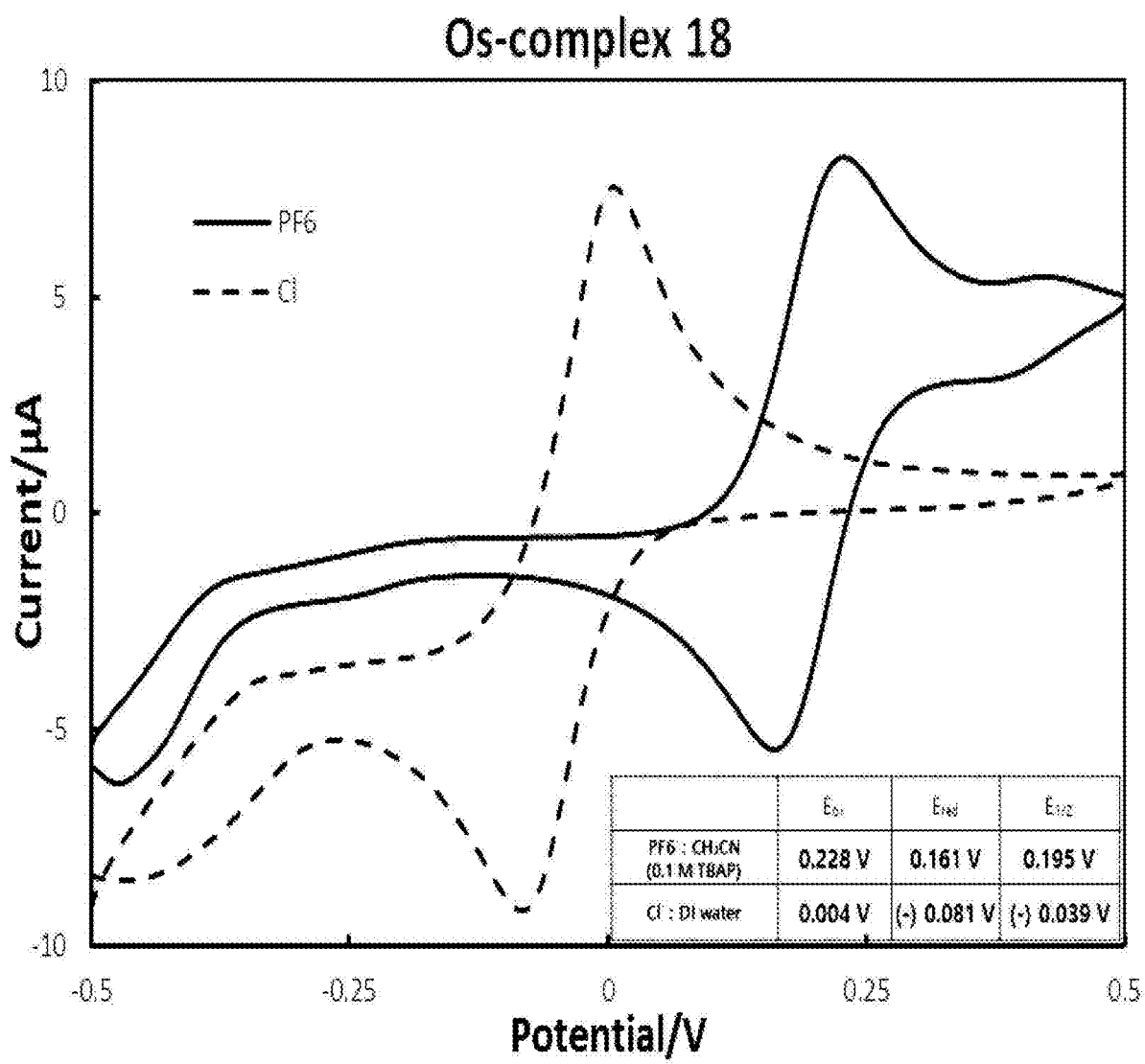

[FIG 23]
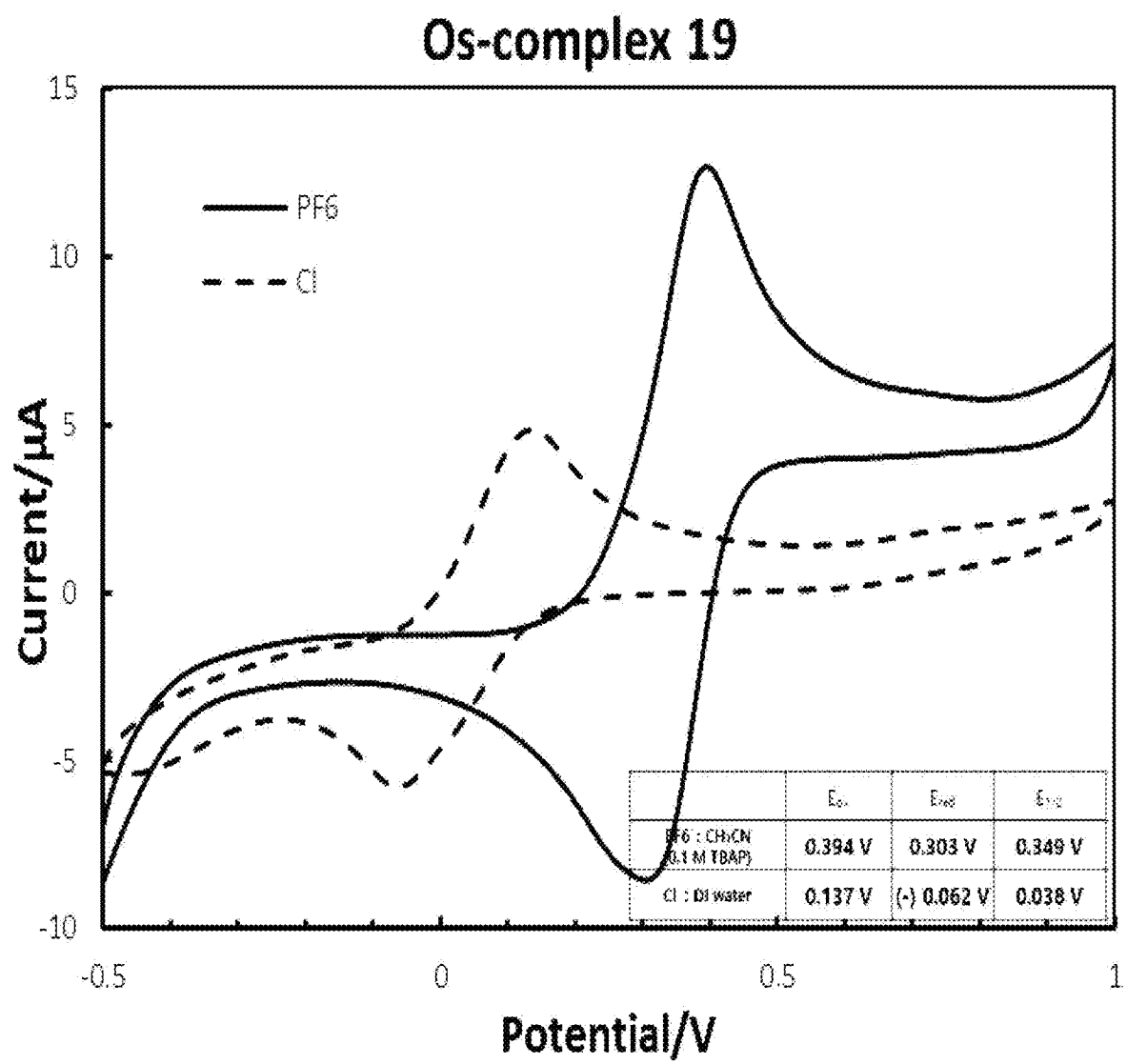

[FIG 24]
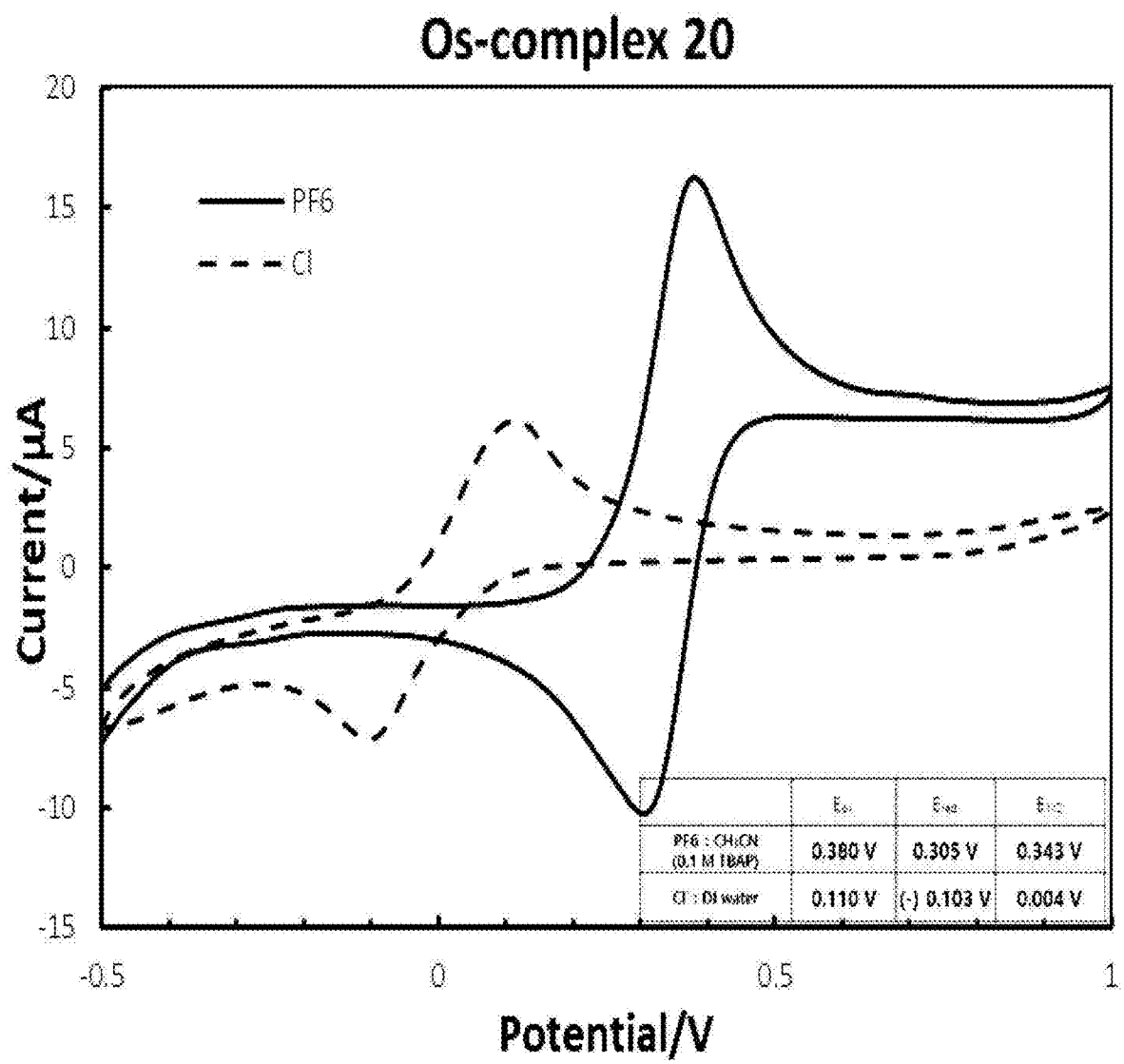

[FIG 25]
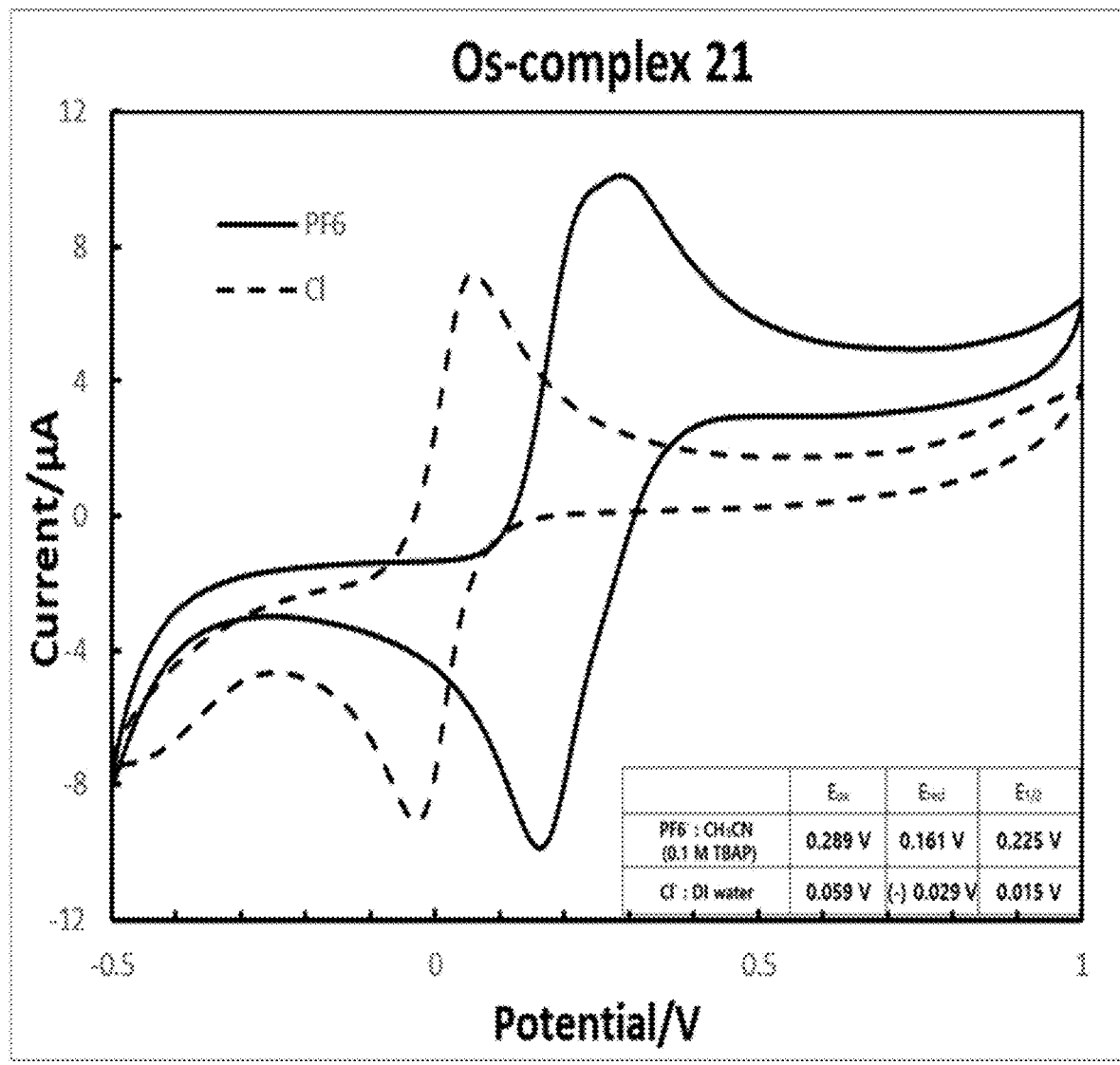

TRANSITION METAL ELECTRON TRANSFER COMPLEX HAVING C—N LIGAND AND ELECTROCHEMICAL BIO SENSOR USING SAME

TECHNICAL FIELD

The present disclosure relates to a novel transition metal election traps it complex having a C—N ligand and an electrochemical biosensor using same.

BACKGROUND ART

Recently, interest in the development of biosensors is increasing day by day for quantitative and qualitative analysis of target analytes from the medical field to the environment and food fields. In particular, an enzymatic biosensor is a chemical sensor used to selectively detect and measure chemical substances contained in a sample by utilizing the biological detection function in which a functional substance of an organism or an organism such as a microorganism reacts sensitively with a specific substance, and it has been mainly developed for medical applications such as blood glucose sensors, and is also being studied even in applications in the fields of food engineering and environmental measurement.

Periodic measurement of blood glucose is very important in the management of diabetes. Therefore, various blood glucose level measuring devices are being developed including a portable measuring device that easily measure blood glucose levels. The operating principle of such a biosensor is based on an optical method or an electrochemical method. Such an electrochemical biosensor can reduce the influence of oxygen, unlike a biosensor using a conventional optical method, and has the advantage that it can be used without any separate pretreatment even if the sample becomes turbid. Therefore, various types of electrochemical biosensors with accuracy and precision are widely used.

Currently commercialized electrochemical blood glucose sensors mainly use enzyme electrodes. More specifically, it has a structure in which a glucose oxidase is immobilized on an electrode capable of converting an electrical signal by a chemical or physical method. These electrochemical blood glucose sensors are based on the principle of measuring the electric current generated by transferring electrons generated by the enzymatic oxidation of glucose in analytes such as blood to the electrodes, thereby providing the glucose concentration in the analyte. In the case of a biosensor using an enzyme electrode, there is a problem that since the distance from an active center of the enzyme is too long, it is difficult to directly transfer electrons generated by an oxidization of the substrate to the electrode. Accordingly, an oxidation and reduction mediator, that is, an electron transfer mediator, is necessarily needed in order to easily perform such an electron transfer reaction. Therefore, it is the type of enzyme used and the characteristics of the electron transfer medium that have the greatest influence on the characteristics of the electrochemical biosensor that measures blood glucose levels.

The development trend of blood glucose sensors has therefore changed into the use of GDH, requiring no oxygen in the enzymatic reaction, in order to block changes in measured values due to differences in oxygen partial pressure ($pO_2$) depending on blood (venous blood, capillary blood, etc.), instead of GOx including oxygen involved in the enzymatic reaction with the blood glucose. In addition, in the case of electron transfer mediators, organic compounds such as quinone derivatives (phenanthroline quinone, Quineonediimine etc.) and organometallic compounds such as Ru complexes (ruthenium hexamine, etc.) or osmium complexes replace the Ferricyanide having low stability to temperature and humidity have been developed.

The most commonly used electron transfer medium is potassium Ferricyanide [$K_3Fe(CN)_6$]. Because it is inexpensive and has a good reactivity, it can be useful for all sensors using FAD-GOx, PQQ-GDH or FAD-GDH. However, the sensor using the electron transfer mediator causes a measurement error caused by the interfering substance such as uric acid or gentisic acid in the blood and is easily deteriorated due to temperature and humidity. Thus, special attention must be paid to preparation and storage, and it does not accurately detect glucose at a low concentration due to a change in background current after long storage.

Hexamine ruthenium chloride [$Ru(NH_3)_6Cl_3$] has higher redox stability than the Ferricyanide. Biosensors using hexamine ruthenium chloride as an electron transfer medium has advantages in manufacturing and storage and has stability due to small change of background current even when it is stored for a long time. However, there is a disadvantage in that it cannot match the reactivity of FAD-GDH, when it is used with FAD-GDH, and thus, it is difficult to manufacture as a commercially useful sensor.

Furthermore, in the case of using such a biosensor, the ability to obtain accurate and rapid measurement values with a small amount of sample volume is very important to maximize user convenience.

Therefore, the development of a new electron-transport medium capable of achieving the shorter measurement time than the conventional electron-transport medium is still required.

On the other hand, a continuous glucose monitoring (CGM) system is used to continuously monitor blood glucose levels and manage diseases such as diabetes, and existing enzyme sensors that collect blood from the fingertips induce a considerable pain due to a needle during blood collection and thus limits the measurement frequency and cannot be used for such CGM. In order to solve these problems, an improved version of a continuous glucose monitoring sensor that can adhere to the body and thus minimize invasion has recently been developed. In the case of such as continuous blood glucose monitoring enzyme sensor, since a part of the sensor enters the human body, in order to prevent the electron transport chain containing transition metals and the like from being absorbed by the human body and causing toxicity and side effects as described above, an attempt was made to mainly use a heterocyclic polymer containing nitrogen atoms such as poly(vinylpyridine) or poly(vinylimidazole) as a polymer backbone, and fix the transition metal complex via a linker, thereby preventing problems due to the loss of the electron transfer medium in the human body.

In the case of oxidation-reduction polymers to which an electron transfer medium is linked in this way, conventionally, in order to efficiently immobilize the transition metal complex to the main polymer backbone, a pairing reaction using N-hydroxysuccinimide (NHS), which is an active ester, has been mainly used. However, in the case of such an existing synthesis method, there are problems that it has to go through very complicated steps until it is finally synthesized into an oxidation-reduction polymer, the immobilization efficiency of the transition metal complex by hydrolysis during the progress of the pairing reaction using the NHS is not really high, and it is difficult to introduce other types of linkers or functional groups into the main skeleton of the polymer. Thus, there is an increasing demand for the development of oxidation-reduction polymers for biosensors that can solve these problems.

DETAILED DESCRIPTION OF THE INVENTION

Technical Problem

It is an object of the present disclosure to provide a novel transition metal complex comprising C—N ligand.

It is another object of the present disclosure to provide an electrochemical biosensor comprising an oxidation-reduction polymer containing the transition metal complex.

It is another object of the present disclosure to provide an intermediate compound used for the production of the transition metal complex.

It is yet another object of the present disclosure to provide a method for producing the transition metal complex.

Technical Solution

In one aspect of the present disclosure, there is provided a transition metal complex useful as electron transport media having the following chemical structural formula:

[Chemical Formula 1]

wherein, M may be one selected from the group consisting of Fe, Co, Ru, Os, Rh and Ir;

α is an integer from 1 to 3;

C—N is a bidentate ligand containing a phenyl ring and a heterocycle having one or more nitrogen atoms;

in a specific aspect, the heterocyclic ring having one or more nitrogen atoms may be a heterocyclic ring containing at least one nitrogen atom, preferably 1 to 3 nitrogen atom(s), or a heterocyclic ring including one or two heteroatoms selected from the group consisting of O and S together with one or more nitrogen atoms. Also, the heterocyclic ring may be a mono-, di-, tri- or multi-heterocyclic ring, and may be a 4-membered to 16-membered, 5-membered to 15-membered, or 5-membered to 14-membered heterocyclic ring, but is not limited thereto.

N—N is a bidentate ligand which is a heterocyclic ring containing a nitrogen atom;

m is a negative or positive charge representing −1 to −5 or 1 to 5;

d is an integer from 0 to 2; and

X is a counter ion, preferably a counter ion selected from the group consisting of F, Cl, Br, I and $PF_6$.

Advantageous Effects

The transition metal complex containing the C—N ligand according to the present disclosure remarkably improves the performance of the electrochemical sensor when used in the electrochemical sensor.

BRIEF DESCRIPTION OF THE DRAWINGS

FIG. 1 is a diagram showing that weak osmium-chloride bonds are broken in the case of analysis by ESI-MS.

FIG. 2 is a diagram showing the structure of various osmium complexes (hereinafter, also referred to as "C—N complex") having a C—N ligand synthesized in the second step of Examples.

FIGS. 3*a*-3*c* are diagrams showing the structure of the osmium complex according to the present disclosure having a C—N ligand and an N—N ligand synthesized in the third step of Examples.

FIG. 4 is a graph comparing a cyclic voltammetry curve showing electrochemical characteristics of the osmium complexes (Os-complexes 13, 14, 15 and 16) according to the present disclosure.

FIG. 5 is a cyclic a cyclic voltammetry curve showing the electrochemical characteristics of the osmium complex (Os-complex 1) according to the present disclosure.

FIG. 6 is a cyclic voltammetry curve showing the electrochemical characteristics of the osmium complex (Os-complex 2) according to the present disclosure.

FIG. 7 is a cyclic voltammetry curve showing the electrochemical characteristics of the osmium complex (Os-complex 3) according to the present disclosure.

FIG. 8 is a cyclic voltammetry curve showing the electrochemical characteristics of the osmium complex (Os-complex 4) according to the present disclosure.

FIG. 9 is a cyclic voltammetry curve showing the electrochemical characteristics of the osmium complex (Os-complex 5) according to the present disclosure.

FIG. 10 is a cyclic voltammetry curve showing the electrochemical characteristics of the osmium complex (Os-complex 6) according to the present disclosure.

FIG. 11 is a cyclic voltammetry curve showing the electrochemical characteristics of the osmium complex (Os-complex 7) according to the present disclosure.

FIG. 12 is a cyclic voltammetry curve showing the electrochemical characteristics of the osmium complex (Os-complex 8) according to the present disclosure.

FIG. 13 is a cyclic voltammetry curve showing the electrochemical characteristics of the osmium complex (Os-complex 9) according to the present disclosure.

FIG. 14 is a cyclic voltammetry curve showing the electrochemical characteristics of the osmium complex (Os-complex 10) according to the present disclosure.

FIG. 15 is a cyclic voltammetry curve showing the electrochemical characteristics of the osmium complex (Os-complex 11) according to the present disclosure.

FIG. 16 is a cyclic voltammetry curve showing the electrochemical characteristics of the osmium complex (Os-complex 12) according to the present disclosure.

FIG. 17 is a cyclic voltammetry curve showing the electrochemical characteristics of the osmium complex (Os-complex 13) according to the present disclosure.

FIG. 18 is a cyclic voltammetry curve showing the electrochemical characteristics of the osmium complex (Os-complex 14) according to the present disclosure.

FIG. 19 is a cyclic voltammetry curve showing the electrochemical characteristics of the osmium complex (Os-complex 15) according to the present disclosure.

FIG. 20 is a cyclic voltammetry curve showing the electrochemical characteristics of the osmium complex (Os-complex 16) according to the present disclosure.

FIG. 21 is a cyclic voltammetry curve showing the electrochemical characteristics of the osmium complex (Os-complex 17) according to the present disclosure.

FIG. 22 is a cyclic voltammetry curve showing the electrochemical characteristics of the osmium complex (Os-complex 18) according to the present disclosure.

FIG. 23 is a cyclic voltammetry curve showing the electrochemical characteristics of the osmium complex (Os-complex 19) according to the present disclosure.

FIG. 24 is a cyclic voltammetry curve showing the electrochemical characteristics of the osmium complex (Os-complex 20) according to the present disclosure.

FIG. 25 is a cyclic voltammetry curve showing the electrochemical characteristics of the osmium complex (Os-complex 21) according to the present disclosure.

DETAILED DESCRIPTION OF THE EMBODIMENTS

Hereinafter, embodiments of the present disclosure will be described in detail.

Unless otherwise defined, all technical terms used herein have the same meaning as commonly understood by one of ordinary skill in the art to which this disclosure belongs. Although exemplary methods or materials are listed herein, other similar or equivalent ones are also within the scope of the present disclosure. All numerical values represented herein are regarded including the meaning of "approximately" or "about", although not explicitly recited. All publications disclosed as references herein are incorporated in their entirety by reference.

The definitions of residues as used herein will be described in detail. Unless otherwise stated, each residue has the following definitions and is used in the sense commonly understood by those skilled in the art.

As used herein, "halo" or "halogen" refers to, for example, fluoro, chloro, bromo and iodo.

As used herein, the term "alkyl" refers to an aliphatic hydrocarbon radical, and includes both straight-chain or branched hydrocarbon radicals. For example, an aliphatic hydrocarbon having 1 to 6 carbon atoms includes methyl, ethyl, propyl, isopropyl, butyl, isobutyl, sec-butyl, tert-butyl, pentyl, isopentyl, neopentyl, 1-ethylpropyl, hexyl, isohexyl, 11-dimethylbutyl, 2,2-dimethylbutyl, 3,3-dimethylbutyl and 2-ethylbutyl, but is not limited thereto. Unless otherwise defined, the alkyl means an alkyl having 1 to 6 carbon atoms, preferably an alkyl having 1 to 4 carbon atoms, more preferably an alkyl having 1 to 6 carbon atoms.

As used herein, the term "alkoxy" refers to an —O-alkyl or alkyl-O— group, wherein the alkyl group is as defined above. Examples thereof include methoxy, ethoxy, n-propoxy, n-butoxy, t-butoxy, and the like, but are not limited thereto. The alkoxy group may be unsubstituted or substituted with one or more suitable groups.

As used herein, the term "hydroxy" or "hydroxyl", alone or in combination with other terms, refers to —OH.

As used herein, the "amino" refers to —NH$_2$; and the "nitro" refers to —NO$_2$.

As used herein, the "aryl" refers to a monovalent aromatic hydrocarbon having 6 to 20 carbon atoms, 6 to 12 carbon atoms, or 6 to 10 carbon atoms, which is derived by the removal of one hydrogen atom from a single carbon atom of a parent aromatic ring system. The aryl may include an aromatic ring fused with a bicyclic radical containing saturated, partially unsaturated ring. Exemplary aryl groups include radicals derived from benzene (phenyl), substituted phenyl, biphenyl, naphthyl, tetrahydronaphthyl, fluorenyl, toluyl, naphthalenyl, anthracenyl, indenil, indanil and the like, but are not limited thereto. The aryl group may be unsubstituted or substituted with one or more suitable groups.

As used herein, when a specific definition is not otherwise provided, the term "substituted" refers to one substituted with 1 to 3 types of substituents selected from the group consisting of halogen (e.g., F, Cl, Br or I), a cyano group, a hydroxyl group, a thiol group, a nitro group, an amino group, an imino group, an azido group, an amidino group, a hydrazino group, a hydrazono group, an oxo group, a carbonyl group, a carbamyl group, an ester group, an ether group, a carboxyl group or a salt thereof, a sulfonic acid group or a salt thereof, phosphoric acid or its salt, an alkyl group having 1 to 6 carbon atoms, a haloalkyl group having 1 to 6 carbon atoms, an alkenyl group having 2 to 6 carbon atoms, a haloalkenyl group having 2 to 6 carbon atoms, an alkynyl group having 2 to 6 carbon atoms, a haloalkynyl group having 2 to 6 carbon atoms, an alkoxy group having 1 to 6 carbon atoms, a haloalkoxy group having 1 to 6 carbon atoms, an alkylthio group having 1 to 6 carbon atoms, a cycloalkyl group having 3 to 20 carbon atoms, a 5- to 12-membered heterocycloalkyl group, a 5- to 12-membered heteroaryl group, an aryl group having 6 to 10 carbon atoms, an aryloxy group having 6 to 10 carbon atoms, and an arylthio group having 6 to 10 carbon atoms.

In a specific embodiment, the Chemical Formula 1 may be represented by any one of Chemical Formulas 2 to 4 below:

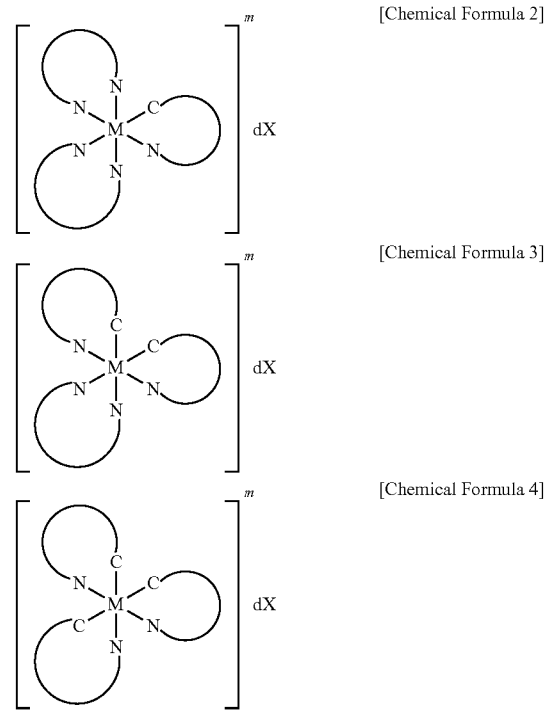

[Chemical Formula 2]

[Chemical Formula 3]

[Chemical Formula 4]

wherein, M is one selected from the group consisting of Fe, Co, Ru, Os, Rh and Ir;

m is a negative or positive charge representing −1 to −5 or 1 to 5;

d is an integer from 0 to 2; and

X is a counter ion.

X is a counter ion, preferably a counter ion selected from the group consisting of F, Cl, Br, I and PF$_6$.

Preferably, the M may be Os.

Preferably, the C—N ligand may be represented by the structure of Chemical Formula 5 below.

[Chemical Formula 5]

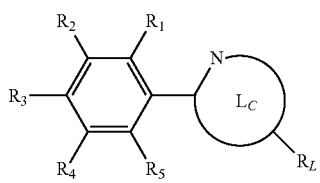

wherein, $L_C$ is a heterocyclic ring containing at least one nitrogen atom, and is connected to a phenyl ring at the 2nd position of the heterocyclic ring;

$R_L$ is any functional group of the heterocyclic compound Lc;

$R_L$, $R_2$, $R_3$, $R_4$, $R_5$ are each independently selected from the group consisting of —H, —F, —Cl, —Br, —I, —$NO_2$, —CN, —C(=O)H, —$CO_2H$, —$SO_3H$, —$NHNH_2$, —SH, —OH, —$NH_2$, a substituted or unsubstituted alkoxycarbonyl, a substituted or unsubstituted alkylaminocarbonyl, a substituted or unsubstituted dialkylaminocarbonyl, a substituted or unsubstituted alkoxy, a substituted or unsubstituted alkylamino, a substituted or unsubstituted dialkylamino, a substituted or unsubstituted alkanylamino, a substituted or unsubstituted arylcarboxyamido, a substituted or unsubstituted hydrazine, a substituted or unsubstituted alkyl hydrazine, a substituted or unsubstituted hydroxyamino, a substituted or unsubstituted alkoxyamino, a substituted or unsubstituted alkylthio, a substituted or unsubstituted alkenyl, a substituted or unsubstituted aryl and a substituted or unsubstituted alkyl, and $R_1$ is a moiety that coordinates with the transition metal.

And, the N—N ligand may be represented by the structure of Chemical Formula 6 below.

[Chemical Formula 6]

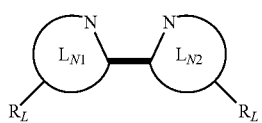

wherein, $L_{N1}$ and $L_{N2}$ are each independently a heterocycle including at least one nitrogen atom, and $L_{N1}$ and $L_{N2}$ are each connected to each other at the 2nd position of the heterocycle;

wherein, $R_L$ is a functional group of $L_{N1}$ and $L_{N2}$, which are heterocycles, and each is —H, —F, —Cl, —Br, —I, —$NO_2$, —CN, —C(=O)H, —$CO_2H$, —$SO_3H$, —$NHNH_2$, —SH, —OH, —$NH_2$, or a substituted or unsubstituted alkoxycarbonyl, a substituted or unsubstituted alkylaminocarbonyl, a substituted or unsubstituted dialkylaminocarbonyl, a substituted or unsubstituted alkoxy, a substituted or unsubstituted alkylamino, a substituted or unsubstituted dialkylamino, a substituted or unsubstituted alkanylamino, a substituted or unsubstituted arylcarboxyamido, a substituted or unsubstituted hydrazine, a substituted or unsubstituted alkyl hydrazine, a substituted or unsubstituted hydroxyamino, a substituted or unsubstituted alkoxyamino, a substituted or unsubstituted alkylthio, a substituted or unsubstituted alkenyl, a substituted or unsubstituted aryl, or a substituted or unsubstituted alkyl, or two types of $R_L$s that are respectively connected to the $L_{N1}$ and $L_{N2}$ are connected to each other to form a substituted or unsubstituted tricyclic heterocycle together with $L_{N1}$ and $L_{N2}$, wherein, the ring formed by connecting two types of $R_L$s that are respectively connected to the $L_{N1}$ and $L_{N2}$ are connected to each other be a 5- to 7-membered ring, the 5- to 7-membered ring is substituted or unsubstituted with oxo (=O), —$CO_2H$, —$SO_3H$, —$NHNH_2$, —SH, —OH, —$NH_2$ or a substituted or unsubstituted alkoxycarbonyl, a substituted or unsubstituted alkylaminocarbonyl, a substituted or unsubstituted dialkylaminocarbonyl, a substituted or unsubstituted alkoxy, a substituted or unsubstituted alkylamino, a substituted or unsubstituted dialkylamino, a substituted or unsubstituted alkanylamino, a substituted or unsubstituted arylcarboxyamido, a substituted or unsubstituted hydrazine, a substituted or unsubstituted alkyl hydrazine, a substituted or unsubstituted hydroxyamino, a substituted or unsubstituted alkoxyamino, a substituted or unsubstituted alkylthio, a substituted or unsubstituted alkenyl, a substituted or unsubstituted aryl, or a substituted or unsubstituted alkyl.

In one specific embodiment, the heterocycle may be at least one selected from the group consisting of imidazole, pyridine, pyrimidine, pyrazole, isoxazole, oxazole, thiazole, benzothiazole, benzimidazole, benzoxazole and diazafluorenone.

In one specific embodiment, when the alkoxycarbonyl, alkylaminocarbonyl, dialkylaminocarbonyl, alkoxy, alkylamino, dialkylamino, alkenylamino, arylcarboxyamido, hydrazino, alkyl hydrazino, hydroxyamino, alkoxyamino, alkylthio, alkenyl, aryl, alkyl and tricyclic heterocycles are substituted, these may be substituted with at least one, preferably 1 to 3, selected from the group consisting of —F, —Cl, —Br, —I, —OH, oxo, an alkyl group having 1 to 3 carbon atoms and an alkoxy group having 1 to 3 carbon atoms.

Specifically, the C—N ligand of Chemical Formula 5 may be selected from the following structures.

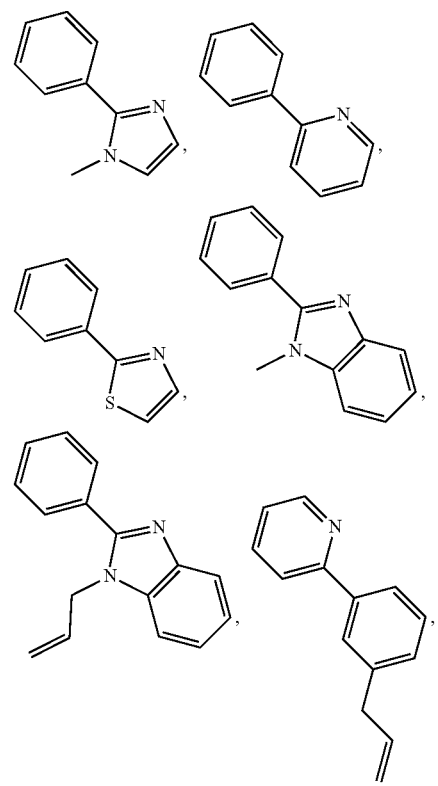

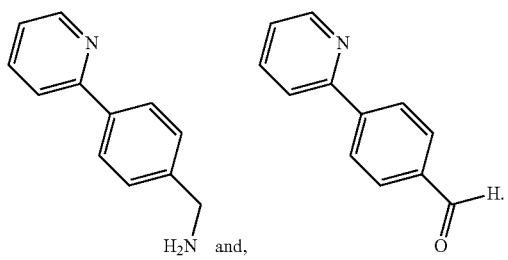
Specifically, the N—N ligand of Chemical Formula 6 may be is selected from the following structures:
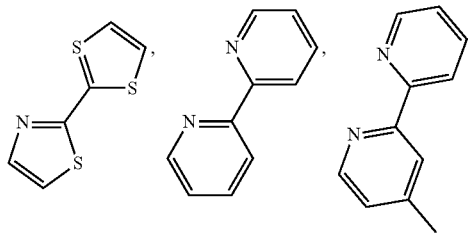
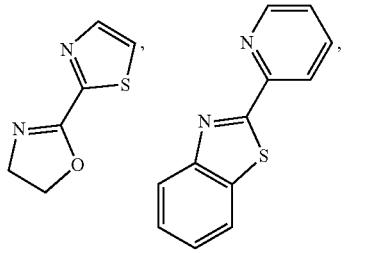
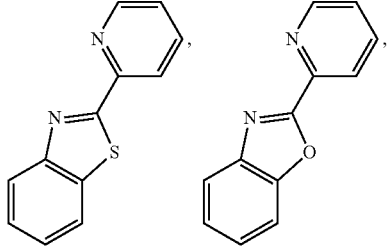
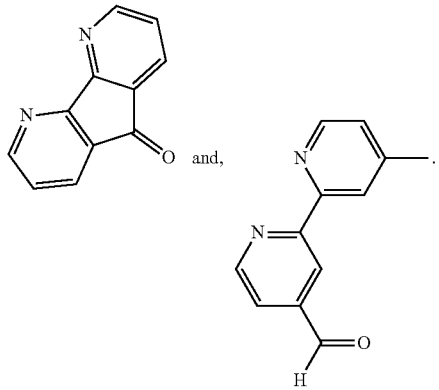
Os-Complex 1
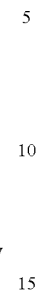 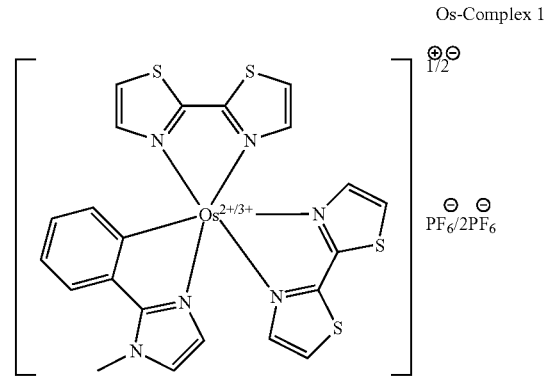
Os-Complex 2
 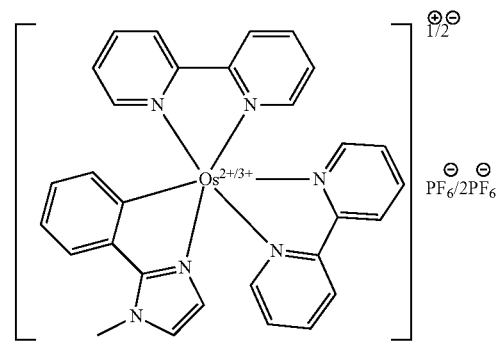
Os-Complex 3
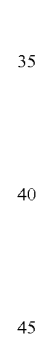 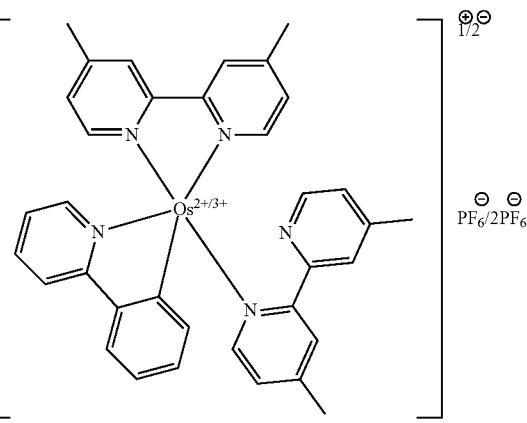
Os-Complex 4
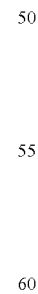 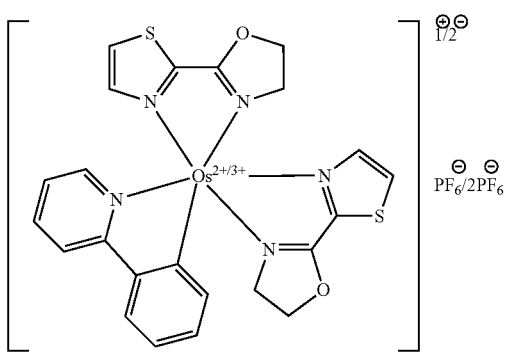
In one specific embodiment, the compound of Chemical Formula 1 according to the present disclosure may be any one of the transition metal complexes shown below.

Os-Complex 5
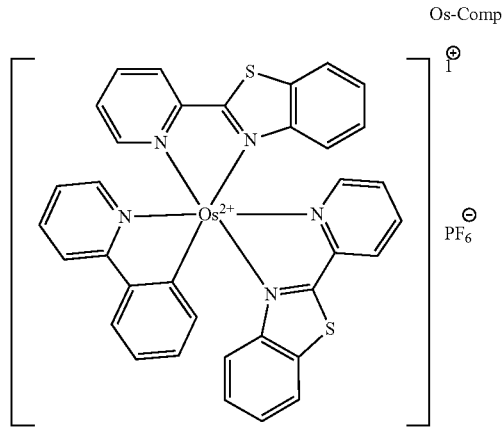
Os Complex 6
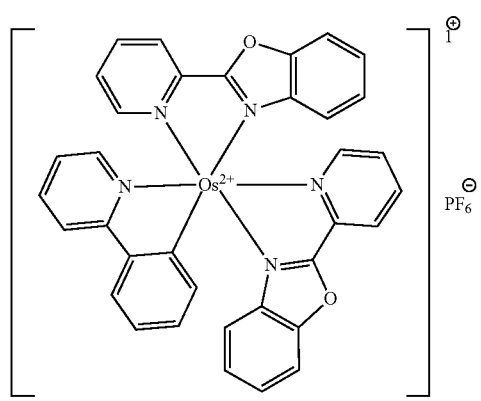
Os-Complex 7
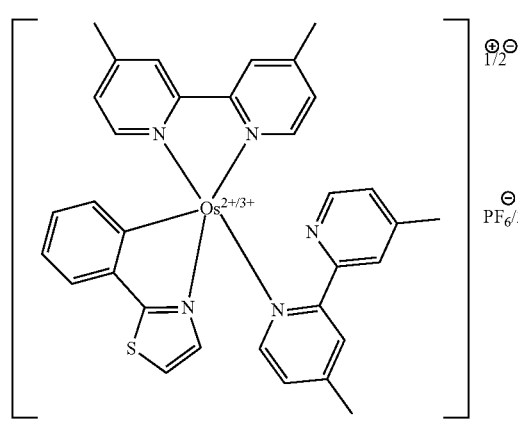
Os-Complex 8
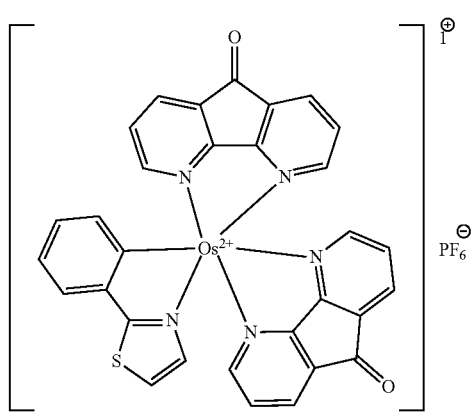
Os-Complex 9
Os-Complex 10

Os-Complex 11
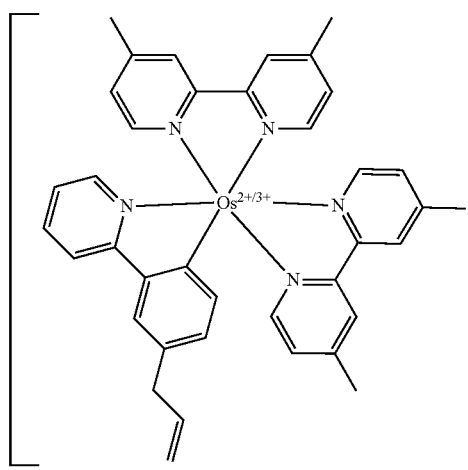
Os-Complex 14
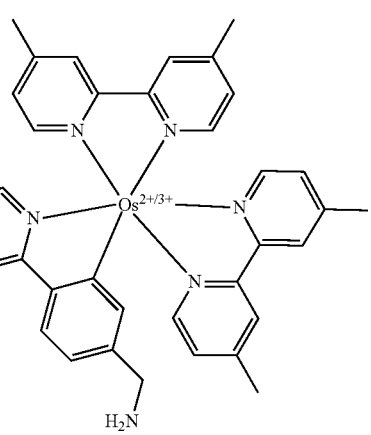
Os-Complex 12
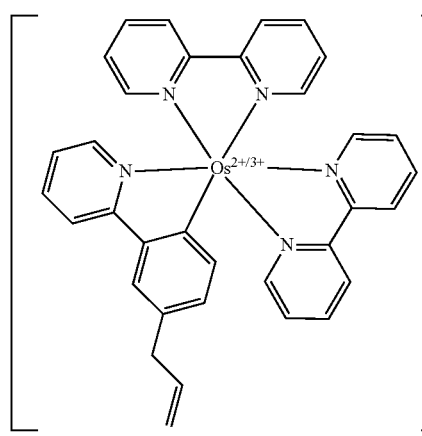
Os-Complex 15
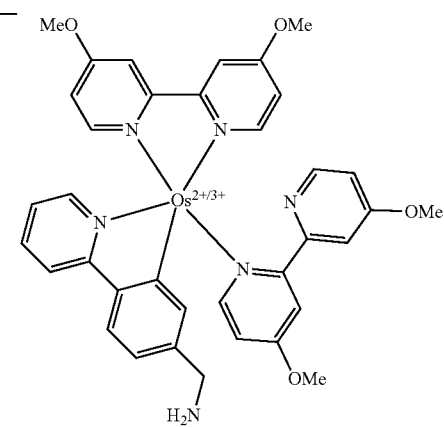
Os-Complex 13
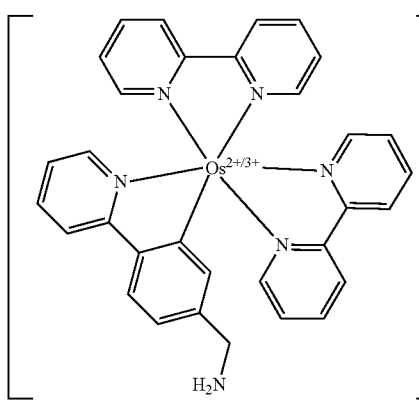
Os-Complex 16
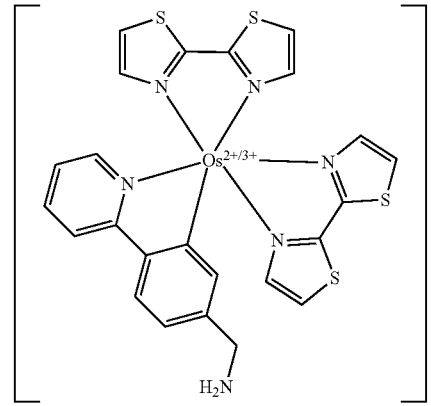

Os-Complex 17

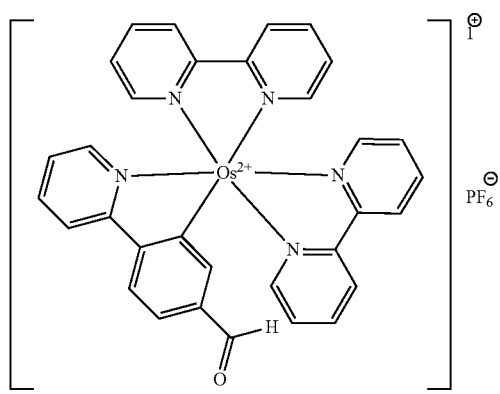

Os-Complex 20

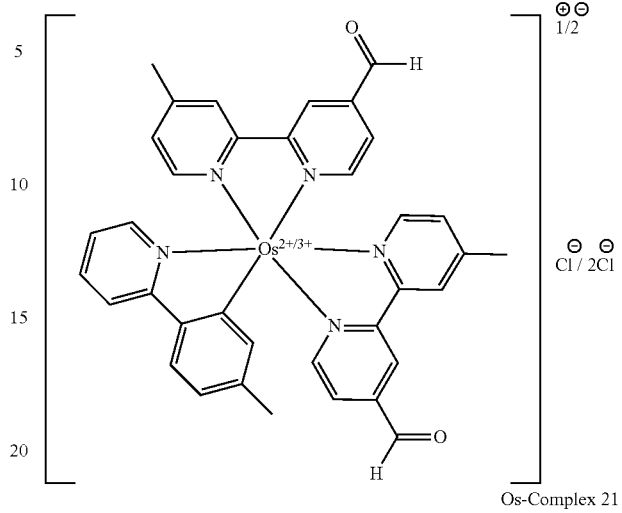

Os-Complex 18

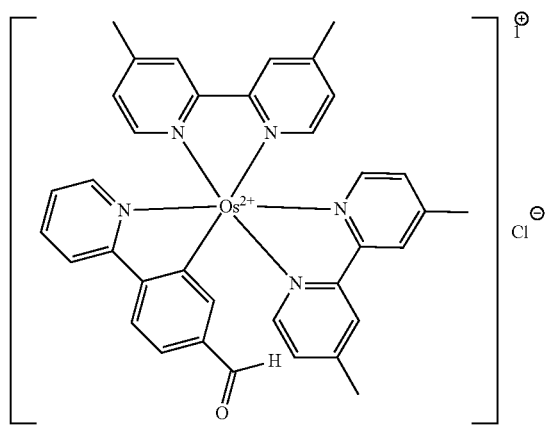

Os-Complex 21

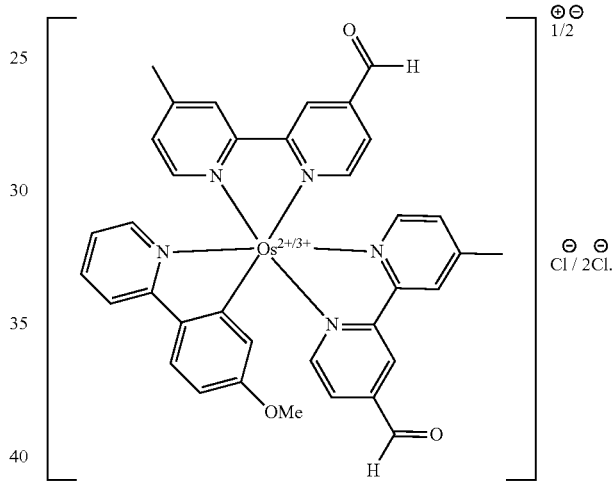

Os-Complex 19

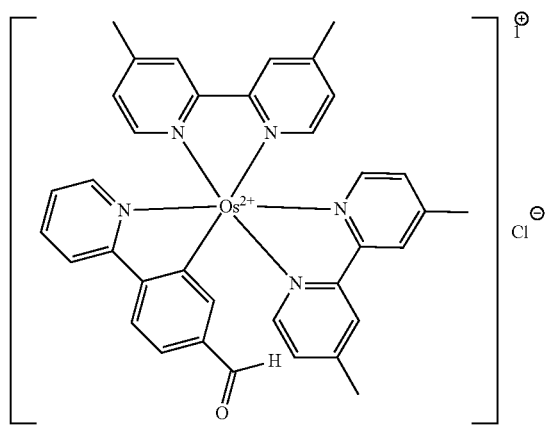

In another aspect, the present disclosure provides a method for preparing the compound of Chemical Formula 1. Specifically, when the transition metal of the transition metal complex containing a C—N ligand according to the present disclosure is osmium, it can be prepared through three-step synthesis by using a commercially available osmium salt as an electron transport medium, which may specifically include the following steps:

i) reacting hexachloroosmium ammonium salt with 1,3-cyclohexadiene to prepare bis[(η⁶-benzene)dichloro-diosmium[(η⁶-bz)OsCl₂]₂ of the following Chemical Formula 7 which is an osmium dimer;

ii) introducing a C—N ligand into the bis[(η⁶-benzene)dichlorodiosmium[(η⁶-bz)OsCl₂]₂ prepared in step i) to prepare a C—N complex; and iii) introducing an N—N ligand into the C—N complex prepared in step ii) to prepare the transition metal complex of Chemical Formula 1.

[Chemical Formula 7]

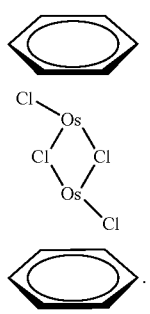

Step i) is a step of synthesizing the compound of Chemical Formula 7, which is an osmium direr to which a C—N ligand can be bound, and is characterized by using an osmium halide salt (hexachloroosmium ammonium salt. [(NH—$_4$)$_2$OsCl$_6$]) having a counterion of ammonium as a starting material.

Generally, during the synthesis of an osmium dimer with benzene attached at the top and bottom as shown in Chemical Formula 7, a hydrate form of osmium salt (OsCl$_3$·xH$_2$O, H$_2$OsCll$_6$·xH$_2$O) or an osmium halide salt (Na$_2$OsCl$_6$) having a counterion of sodium is used as commercially available osmium starting materials, but the use of the hexachloroosmium ammonium salt according to the present disclosure has advantages in terms of supply and price.

In step i), 1,3-cyclohexadiene is used in an amount of 7 to 10 equivalents relative to hexachloroosmium ammonium salt. Also, the reaction temperature during the reaction is 90° C. to 100° C., and the reaction time is 48 hours to 72 hours. The reaction solvent may be an aqueous ethanol solution, more specifically, an 80% (v/v) aqueous ethanol solution, but is not limited thereto. It also includes the step of adding an reaction intermediate water (H$_2$O).

Step ii) is a step of introducing a C—N ligand into the osmium dimer of Chemical Formula 7 prepared in step i) to prepare a C—N complex, wherein the C—N ligand is used in the amount of 2, to 4 equivalents based on the osmium dimer of Chemical Formula 7. The reaction temperature during the reaction is 80° C. to 160° C., and the reaction time is 6 hours to 48 hours. Alcohols are used as the reaction solvent, and alcohols are not limited thereto, but lower alcohols having 1 to 6 carbon atoms, 1 to 4 carbon atoms, or methanol or ethanol can be used.

The C—N ligand used in step ii) may be used without limitation as long as it has a structure in which a phenyl ring and a heterocyclic ring having nitrogen are connected to each other (phenyl ring-(nitrogen)heterocyclic ring). Preferably, it may be a C—N ligand of Chemical Formula 5.

In a specific embodiment, the C—N complex may be one selected from the following compounds, but is not limited thereto.

| C-N Complex | Structure |
|---|---|
| C-N complex 1 | |
| C-N complex 2a | |
| C-N complex 2b | |
| C-N complex 2c-1 | |
| C-N complex 2c-2 | |

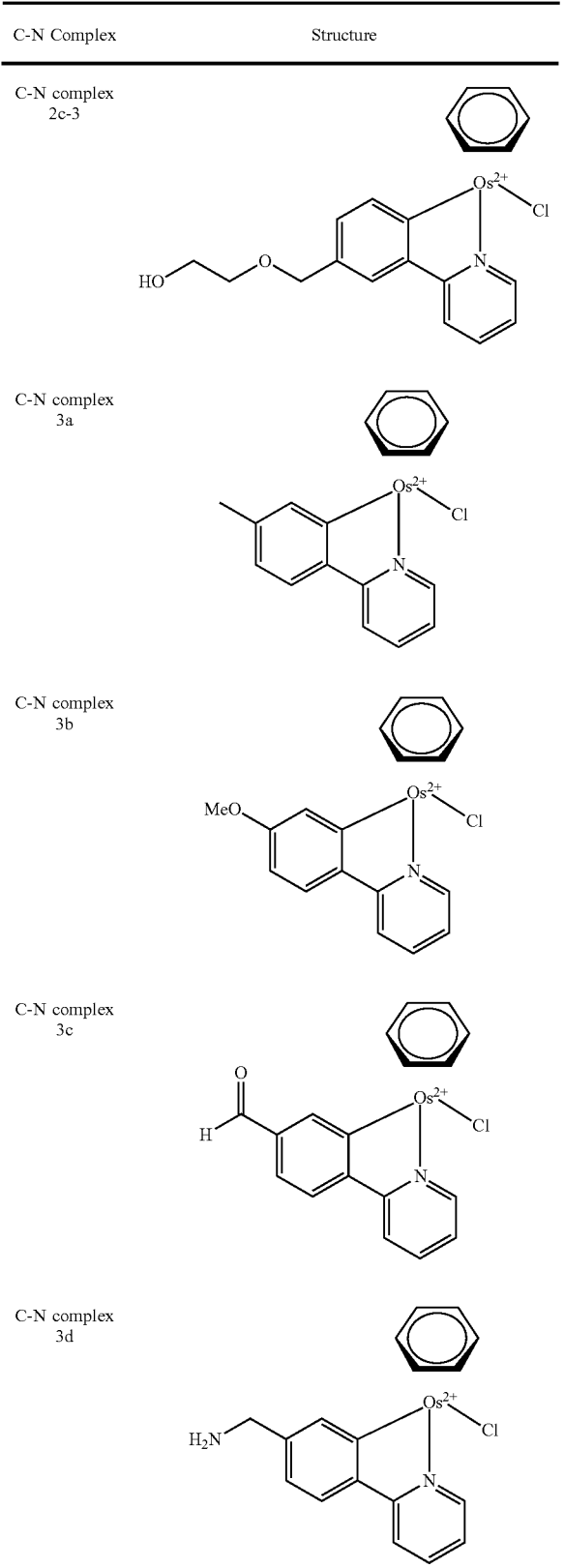
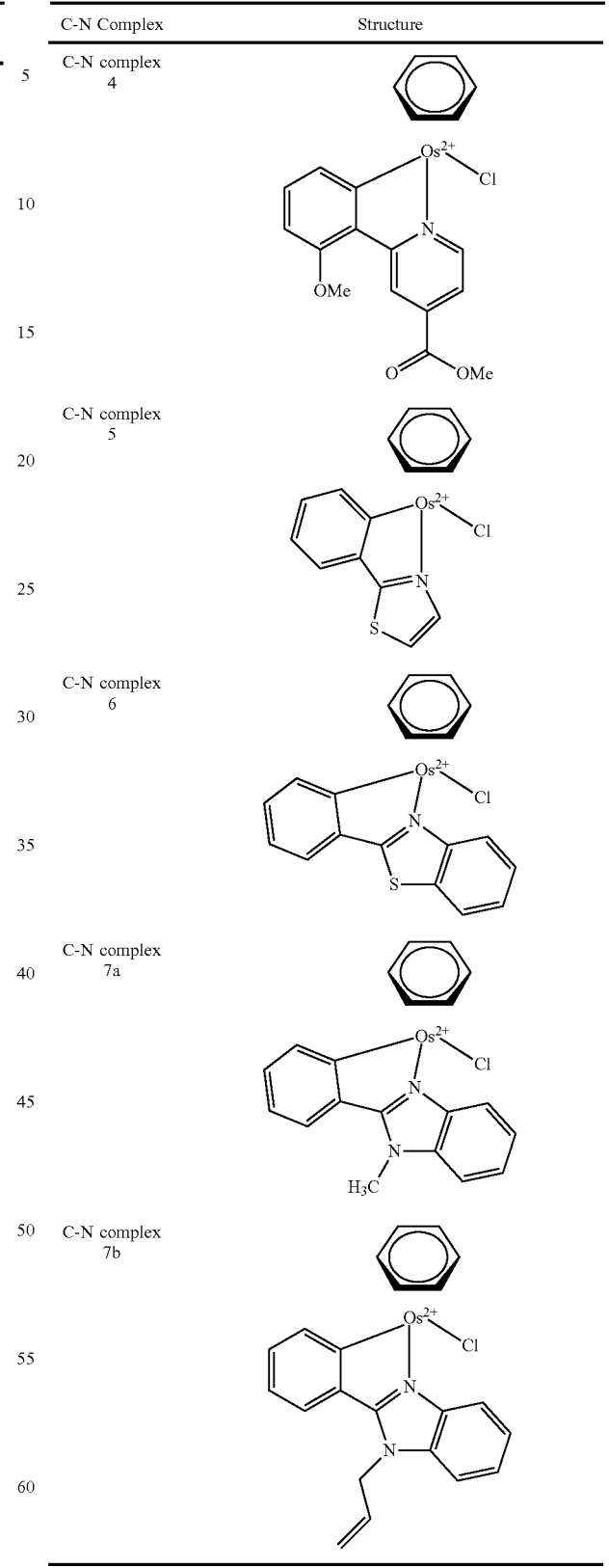
Step iii) is a step of introducing an N—N ligand into the C—N complex prepared in step ii) to finally prepare a transition metal complex of Chemical Formula 1. In the above step, the N—N ligand may be used in the amount of 2.0 to 2.2 equivalents based on the C—N complex. The reaction temperature during the reaction is 80° C., and the reaction time is 3 hours to 36 hours. The reaction solvent may be methanol, but is not limited thereto. The N—N ligand used in step ii) can be used without limitation as long as it has a structure in which heterocyclic rings having nitrogen are connected to each other ((nitrogen)heterocyclic ring-(nitrogen)heterocyclic ring). Preferably, it may be the N—N ligand of Chemical Formula 6.

Additionally, a further aspect of the present disclosure relates to a sensing layer for an electrochemical biosensor comprising an enzyme capable of subjecting a liquid biological sample to an oxidation-reduction reaction an electron transfer mediator including the transition metal complex.

The oxidoreductase is a generic term for an enzyme that catalyzes the redox reaction in a living organism. In the case of a target substance to be measured in the present disclosure, such as a biosensor, the oxidoreductase refers to an enzyme that is reduced by reacting with a target substance to be measured. The enzyme reduced in this way reacts with the electron transport medium and generate signal such as current change, and the metabolite is quantified by measuring the signal such as the current change occurring at this time. The oxidoreductase usable in the present disclosure may be at least one selected from the group consisting of various dehydrogenase, oxidase, esterase, and the like. Depending on the redox reaction or detection target material, an enzyme using the substrate as the target material may be selected and used among enzymes belonging to the enzyme group.

More specifically, the oxidoreductase may be one or more selected from the group consisting of glucose dehydrogenase, glutamate dehydrogenase, glucose oxidase, cholesterol oxidase, cholesterol esterase, lactate oxidase, ascorbic acid oxidase, alcohol oxidase, alcohol dehydrogenase, bilirubin oxidase, and the like.

Meanwhile, the oxidoreductase can also include a cofactor that plays a role of storing hydrogen deprived by the oxidoreductase from the target substance (e.g., metabolite) to be measured. For example, the cofactor may be one or more selected from the group consisting of flavin adenine dinucleotide (FAD), nicotinamide adenine dinucleotide (NAD), pyrroloquinoline quinone (PQQ) and the like.

For examples, when measuring the blood glucose concentration, glucose dehydrogenase (GDH) may be used as an oxidoreductase, and may include flavin adenine dinucleotide-glucose dehydrogenase (FAD-GDH) containing FAD as the cofactor and/or nicotinamide adenine dinucleotide-glucose dehydrogenase containing FAD-GDH as the cofactor.

In a specific embodiment, the available oxidoreductase may be at least one selected from the group consisting of FAD-GDH (e.g., EC 1.1.99.10 etc.), NAD-GDH (e.g., EC 1.1.1.47 etc.), PQQ-GDH (e.g., EC1.1.5.2 etc.), glutamate dehydrogenase (e.g., EC 1.4.1.2 etc.), glucose oxidase (e.g., EC 1.1.3.4 etc.), cholesterol oxidase (e.g., EC 1.1.3.6 etc.), cholesterol esterase (e.g., EC 3.1.1.13 etc.), lactate oxidase (e.g., EC 1.1.3.2 etc.), ascorbic acid oxidase (e.g., EC 1.10.3.3 etc.), alcohol oxidase (e.g., EC 1.1.3.13 etc.), alcohol dehydrogenase (e.g., EC 1.1.1.1 etc.), bilirubin oxidase (e.g., EC 1.3.3.5 etc.), and the like.

Most preferably, the oxidoreductase is a glucose dehydrogenase capable of maintaining an activity of 70% or more for 1 week in a buffer solution at 37° C.

The sensing layer according to the present disclosure may contain 20 to 700 parts by weight, for example, 60 to 700 parts by weight or 30 to 340 parts by weight of an oxidation-reduction polymer, based on 100 parts by weight of the oxidoreductase. The content of the oxidation-reduction polymer may be appropriately adjusted in accordance with the activity of the oxidoreductase.

Further, the sensing layer according to the present disclosure may further include a carbon nanotube to increase film performance. Specifically, when carbon nanotubes are used with a transition metal complex, particularly osmium, the electron transfer rate is increased and so the performance of the sensing layer can be further improved.

Additionally, the sensing layer according to the present disclosure may further include a crosslinking agent.

Meanwhile, the sensing layer according to the present disclosure may further include one or more additives selected from the group consisting of surfactants, water-soluble polymers, quaternary ammonium salts, fatty acids, thickeners, etc., for the role of a dispersant during reagent dissolution, an adhesive during reagent production, a stabilizer for long-term storage, and the like.

The surfactant may play a role in allowing the composition to spread evenly over the electrodes and be dispensed with a uniform thickness when dispensing the reagents. As the surfactant, at least one selected from the group consisting of Triton X-100, sodium dodecyl sulfate, perfluorooctane sulfonate, sodium stearate, etc. may be used. In order to properly perform the role of spreading the reagent uniformly on the electrodes and dispensing the reagent with uniform thickness when dispensing the reagent, the reagent composition according to the present disclosure may contain the surfactant in an amount of 3 to 25 parts by weight, for example 10 to 25 parts by weight, based on 100 parts by weight of the oxidoreductase. For example, when using an oxidoreductase with an activity of 700 U/mg, the reagent composition may contain 10 to 25 parts by weight of a surfactant based on 100 parts by weight of the oxidoreductase. When the activity of the oxidoreductase is higher than that, the content of the surfactant can be adjusted to lower level.

The water-soluble polymer may serve to stabilize and disperse enzymes as a polymer support for the reagent composition. The water-soluble polymers used herein may include at least one selected from the group consisting of polyvinyl pyrrolidone (PVP), polyvinyl alcohol (PVA), polyfluoro sulfonate, hydroxyethyl cellulose (HEC), and hydroxypropyl cellulose (HPC), carboxy methyl cellulose (CMC), cellulose acetate, polyamide, and the like. The reagent composition according to the present disclosure may contain the water-soluble polymer in an amount of 10 to 70 parts by weight, for example 30 to 70 parts by weight based on 100 parts by weight of the oxidoreductase, in order to sufficiently and appropriately exhibit the role of assisting the stabilization and dispersing of oxidoreductase. For example, when using an oxidoreductase having an activity of 700 U/mg, the composition may contain 30 to 70 parts by weight of a water-soluble polymer based on 100 parts by weight of the oxidoreductase. If the activity of the oxidoreductase is higher than that, the content of the water-soluble polymer can be adjusted to lower level.

The water-soluble polymer may have a weight average molecular weight of about 2,500 g/mol to 3,000,000 g/mol, for example, about 5,000 g/mol to 1,000,000 g/mol, in order to effectively assist the stabilization and dispersion of a support and an enzyme.

The thickener serves to firmly adhere the reagent to the electrode. As the thickener, at least one selected from the group consisting of natrosol, diethylaminoethyl-dextran hydrochloride, and the like may be used. The electrochemical sensor according to the present disclosure may contain the thickener in an amount of 10 to 90 parts by weight, for example, 30 to 90 parts by weight, based on 100 parts by weight of the oxidoreductase, in order to ensure that the oxidation-reduction polymer according to the present disclosure is firmly attached to the electrode. For example, when using an oxidoreductase having an activity of 700 U/mg, it may contain 30 to 90 parts by weight of a thickener based on 100 parts by weight of the oxidoreductase, and when the activity of the oxidoreductase is higher than that, the content of the thickener can be adjusted to lower level.

In another embodiment, the present disclosure provides a device including an organic electron transport medium, preferably an insertable device. Preferably, the device may be an electrochemical biosensor, more preferably, an electrochemical blood glucose (blood sugar) sensor.

Specifically, the type of the electrochemical biosensor is not limited, but a continuous blood glucose monitoring sensor can be preferably used.

In the configuration of such a continuous blood glucose monitoring sensor, the present disclosure may include, for example, an electrode, an insulator, a substrate, a sensing layer, a diffusion layer, a protection layer, and the like which include the oxidation-reduction polymer and the oxidoreductase. In the case of an electrode, it may include two types of electrodes such as a working electrode and a counter electrode, and it may also include three types of electrodes such as a working electrode, a counter electrode, and a reference electrode. In one embodiment, the biosensor according to the present disclosure may be an electrochemical biosensor prepared by coating a reagent composition containing an electron transfer medium and an enzyme capable of subjecting a liquid biological sample to an oxidization-reduction, onto a substrate having at least two, preferably two or three electrodes, and then drying it. For example, there is provided a planar electrochemical biosensor, characterized in that in the electrochemical biosensor, an working electrode and a counter electrode are provided on opposite surfaces of a substrate, and a sensing layer containing the oxidation-reduction polymer according to the present disclosure is stacked on the working electrode, and an insulator, a diffusion layer and a protective film are sequentially stacked on both sides of a substrate having an working electrode and a counter electrode.

In a specific embodiment, the substrate may be made of one or more materials selected from the group consisting of polyethylene terephthalate (PET), polycarbonate (PC), and polyimide (PI).

Further, as the working electrode, a carbon, gold, platinum, silver or silver/silver chloride electrode may be used.

Further, in the case of an electrochemical biosensor having a 2-electrode, since the counter electrode performs up to the role of a reference electrode, gold, platinum, silver or silver/silver chloride electrodes can be used as the counter electrode. In the case of a 3-electrode electrochemical biosensor including up to the reference electrode, a gold, platinum, silver, or silver/silver chloride electrode may be used as the reference electrode, and a carbon electrode may be used as the counter electrode.

Nafion, cellulose acetate, silicone rubber, and the like can be used as the diffusion layer, and silicone rubber, polyurethane, polyurethane-based copolymer, and the like can be used as the protective layer, without being limited thereto.

As a non-limiting example, in the case of the 2-electrode, silver chloride or silver may be used because the counter electrode performs up to the role of the reference electrode, and in the case of the 3-electrode, silver chloride or silver may be used as the reference electrode, and a carbon electrode may be used as the counter electrode.

In one embodiment, although a biosensor for measuring glucose is presented as an example of the applicable electrochemical biosensor, the present disclosure can be applied to a biosensor for quantitative determination of various substances such as cholesterol, lactate, creatinine, hydrogen peroxide, alcohol, amino acid and glutamate, by changing the types of enzymes contained in the reagent composition of the present disclosure.

Hereinafter, the present disclosure will be described with reference to the following examples. However, these examples are for illustrative purposed only, the scope of which shall not be limited thereto.

EXAMPLE

Experimental Material

Commercially purchased solvents and reagents were used without further purification process. In the case of alumina for purification of metal complexes, neutral alumina manufactured by Aldrich was filtered using a 10 mL pipette. For the resin for exchanging the chloride counterion of the complex, Dowex 1×4 chloride form, 50-100 mesh from Aldrich was used.

$^1$H-NMR and $^{13}$C-NMR spectra were obtained using Varian Inova 400 (400 MHz for $^1$H, 100 MHz for $^{13}$C). All chemical shifts were determined in proportion to the tetramethyl silane peak (δ0.00) or deuterated chloroform (CDCl3: δ7.26 for $^1$H NMR, CDCl3: δ77.16 for $^{13}$C NMR) and deuterated dimethylacetamide (DMSO: δ2.50 for $^1$H NMR, DMSO: δ39.52 for $^{13}$C NMR). The mass spectrum was obtained from Organic Chemistry Research Center, Sogang University through ESI-Iontrap mass spectrometer from ThermoFisher Scientific in case of low resolution, and through ESI-orbitrap mass spectrometer from ThermoFisher Scientific in the case of high resolution.

Experimental Method

In the case of the osmium complex represented by Chemical Formula 1, it can be synthesized through three steps from a commercially available osmium halide salt [(NH—$_4$)$_2$OsCl$_6$]. The first step is a step of synthesizing an osmium salt in a tetravalent ionic state in the form of an osmium dimer in a divalent ionic state. The second step is a step of synthesizing the osmium complex in the form in which the synthesized osmium dimer is bound to the CN ligand which is the first ligand. The third step is a step of synthesizing the osmium complex represented by Chemical Formula 1 by binding the remaining same N—N ligands.

[Chemical Formula 1]

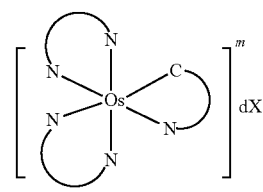

1. First Step

During the synthesis of an osmium dimer with benzene attached at the top and bottom as shown in Chemical Formula 7, it was synthesized by using a hydrate form of osmium salt ($OsCl_3 \cdot xH_2O$, $H_2OsCl_6 \cdot xH_2O$) or an osmium halide salt ($Na_2OsCl_6$) whose counter ion is sodium as commercially available osmium starting materials.

The proposed synthesis method uses an osmium halide salt [$(NH_4)_2OsCl_6$] whose counter ion is ammonium as a starting material, which has advantages in terms of supply and price as compared with osmium starting materials known in the literature.

[Chemical Formula 7]

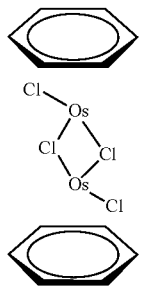

Synthesis of bis[($\eta^6$-benzene)dichlorodiosmium($\eta^6$-bz)OsCl$_2$]$_2$ (Compound A)

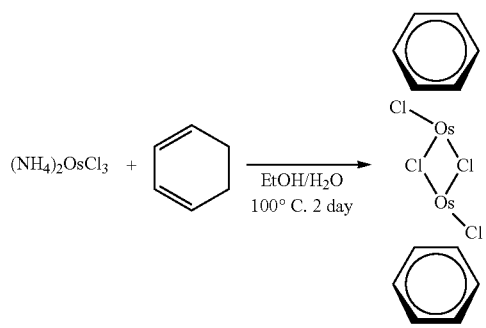

Hexachloroosmium ammonium salt (4.5 g, 10.2 mmol) and 80% aqueous ethanol solution (20 mL) were added to a glass culture tube to prepare a suspension. Then, 1,3-cyclohexadiene (5.0 mL, 74.2 mmol) was added thereto, and the mixture was stirred at 100° C. for one day. After cooling to room temperature, distilled water (15 mL) was added thereto, and the mixture was further stirred for one day. After completion of the reaction, the reaction solution was cooled to room temperature, diethyl ether (8 mL) and ethanol (20 mL) were added and stored at 0° C. for 2 hours to obtain a yellow precipitate. The precipitate was filtered and washed with cold ethanol and cold diethyl ether to obtain a final product.

Compound A; mass recovery: 2.9 g; $^1$H-NMR (400 MHz, DMSO): δ=7.20 (s, 6H), 6.17 (s, 6H); $^{13}$C-NMR (100 MHz, CDCl$_3$): δ=88.32, 79.51

When the proposed synthesis method is used, it shows a difference from the data known in the literature. In the case of NMR, it shows only a single peak at CDCl3: δ6.07 in the literature. In the case of the synthesized compound, it shows low solubility in CDCl3. As a result of DMSO-d6 analysis, it shows a single peak at δ7.20 and δ6.17. The two peaks have similar integral values, and the peak at δ7.20 may have a smaller integral value depending on the sample. The expected compound is determined to be a form ((Chemical Formula 6) in which one chloride is removed from Chemical Formula 2 or a form in which Compound A represented by Chemical Formula 6 and Chemical Formula 7 is mixed.

[Chemical Formula 6]

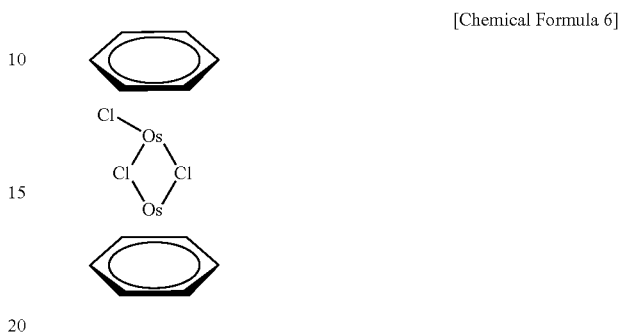

In the case of analysis by ESI-MS, the weak osmium-chloride bond is broken as shown in FIG. 1, and a mass value appears along with a specific mass modification of the compound exchanged with methanol, which is a solvent used in mass spectrometry. Also, the form of the dimer is broken and benzene remains in the osmium monomer, and similarly, the mass modification and mass value of the compound in which the osmium-chloride bond is exchanged with methanol as the solvent appear.

Compound A thus obtained was used in the second synthesis step without further purification to synthesize an osmium complex, followed by purification and analysis.

2. Second Step

This is a step of introducing the first ligand, C—N ligand by using the compound A synthesized in the above step. Various osmium complexes having a C—N ligand shown in FIG. 2 were synthesized by the proposed synthesis method.

Synthesis of Osmium Complex with One C—N Ligand Introduced in Compound A

1) Synthesis of (η6-Benzene)[2-(1-Methyl-imidazole-κN)phenyl-κC][1-Methyl-2-phenyl-imidazole-κN]osmiumchloride (C—N Complex 1)

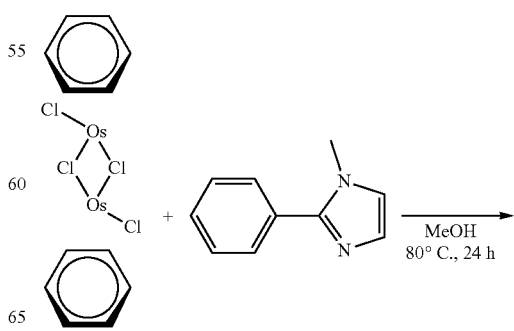

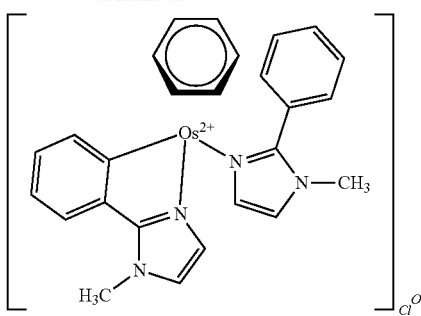

Compound A (338 mg, 0.50 mmol) and 1-methyl-2-phenyl-imidazole (343 mg, 2.00 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, aid the obtained solid was purified by alumina column chromatography using methylene chloride as a developing solution. The yellow bands of a column tube were collected, the solvent was removed by distillation under reduced pressure, and then the final product was obtained. Mass recovery: 178 mg; $^1$H-NMR (400 MHz, CDCl$_3$): δ=7.62 (d, J=7.4 Hz, 1H), 7.57 (t, J=7.4 Hz, 1H), 7.50 (m, 2H), 7.45 (d, J=7.7 Hz, 1H), 7.38 (s, 1H), 7.08 (s, 1H) 6.98 (m, 3H), 6.91 (d, J=1.3 Hz, 1H), 6.87 (d, J=1.3 Hz, 1H), 6.84 (t, J=7.4 Hz, 1H) 5.44 (s, 6H), 4.01 (s, 3H), 3.31 (s, 3H); $^{13}$C-NMR (100 MHz, CDCl$_3$): δ=160.23, 156.86, 149.93, 140.45, 135.43, 131.74, 130.65, 130.59, 130.22, 128.84, 128.62, 128.20, 123.95, 123.24, 122.10, 121.69, 77.68, 35.81, 35.08

For C—N complex 1, N-methylphenylimidazole was used as the C—N ligand, but unlike other complexes, a product in a form in which another nitrogen moiety of the ligand is attached instead of the osmium-chloride bond was obtained.

2) Synthesis of (η6-Benzene)chloro[2-(2-pyridinyl-κN)phenyl-κC]osmium (C—N Complex 2a)

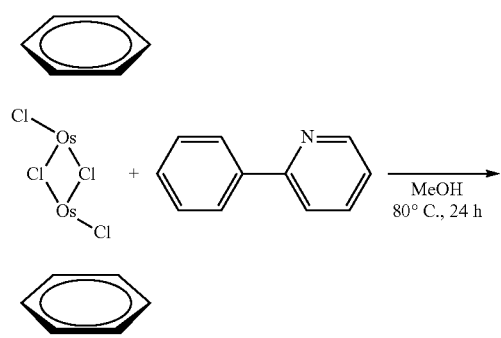

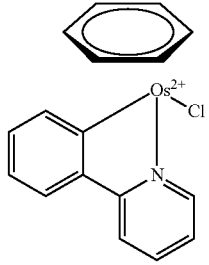

Compound A (952 mg, 1.40 mmol) and 2-phenylpyridine (478 mg, 3.08 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 450 mg; $^1$H-NMR (400 MHz, CDCl$_3$): δ=9.20 (d, J=5.8 Hz, 1H), 8.13 (d, J=7.4 Hz, 1H), 7.81 (d, J=8.1 Hz, 1H), 7.70 (d, J=7.8 Hz, 1H), 7.66 (t, J=7.8 Hz, 1H), 7.16 (t, J=7.4 Hz, 1H) 7.03 (m, 2H), 5.56 (s, 6H); $^{13}$C-NMR (100 MHz, CDCl$_3$): δ=166.79, 165.60, 155.20, 144.77, 139.11, 137.19, 130.65, 124.29, 123.04, 122.50, 119.14, 77.48

3) Synthesis of (η6-Benzene)chloro[2-(2-pyridinyl-κN)-4-allyl-phenyl-κC]osmium (C—N Complex 2b)

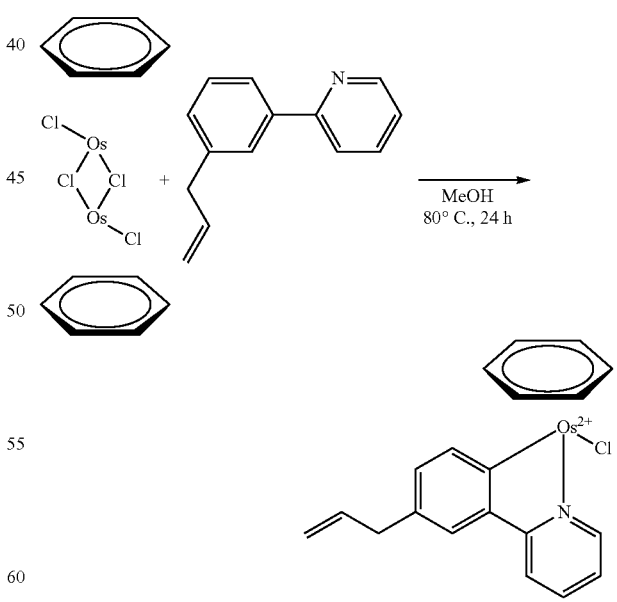

Compound A (524 mg, 0.77 mmol) and 2-(3-allylphenyl)pyridine (317 mg, 1.62 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled tinder reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 280 mg; $^1$H NMR (400 MHz, CDCl$_3$) δ9.21 (br, 1H), 8.04 (d, J=7.5 Hz, 1H), 7.83 (d, J=8.0 Hz, 1H), 7.67 (br, 1H), 7.53 (s, 1H), 7.03 (br, 2H), 6.00 (m, 1H), 5.56 (s, 6H), 5.10 (dd, J=22.1, 13.6 Hz, 2H)

4) Synthesis of (η6-Benzene)chloro[2-(2-pyridinyl-κN)-4-methoxymethyl-phenyl-κC]osmium (C—N Complex 2c-1)

5) Synthesis of (η6-Benzene)chloro[2-(2-pyridinyl-κN)-4-ethoxymethyl-phenyl-κC]osmium (C—N Complex 2c-2)

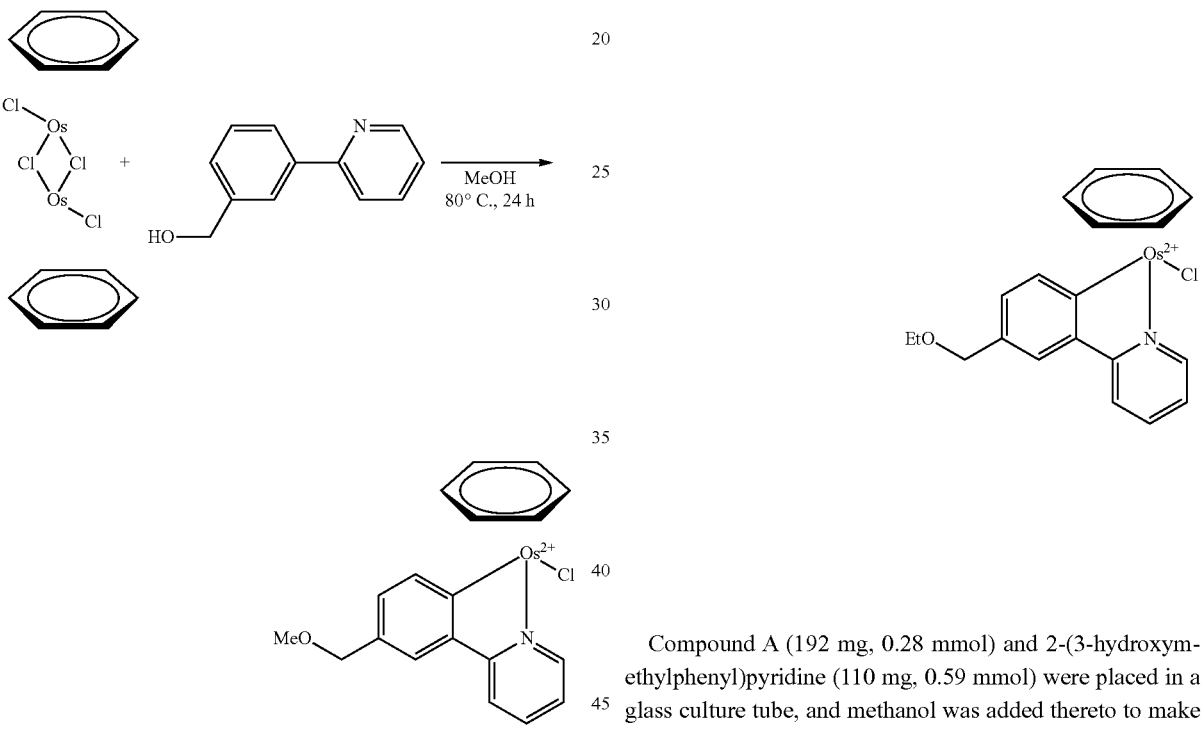

Compound A (432 mg, 0.64 mmol) and 2-(3-hydroxymethylphenyl)pyridine (247 mg, 1.34 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 209 mg; $^1$H NMR (400 MHz, CDCl$_3$) δ9.21 (d, J=5.6 Hz, 1H), 8.10 (d, J=7.6 Hz, 1H), 7.85 (d, J=8.0 Hz, 1H), 7.67 (br, 2H), 7.13 (d, J=7.6 Hz, 1H), 7.04 (t, J=6.0 Hz, 1H), 5.56 (s, 6H), 4.46 (s, 2H), 3.40 (s, 3H); $^{13}$C NMR (100 MHz, CDCl$_3$) δ166.53, 165.11, 155.09, 144.37, 138.98, 137.07, 132.58, 130.48, 123.80, 122.44, 119.12, 77.45, 74.91, 57.98.

Compound A (192 mg, 0.28 mmol) and 2-(3-hydroxymethylphenyl)pyridine (110 mg, 0.59 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 86 mg; $^1$H NMR (400 MHz, CDCl$_3$) δ9.20 (d, J=5.8 Hz, 1H), 8.09 (d, J=7.5 Hz, 1H), 7.85 (d, J=8.1 Hz, 1H), 7.67 (br, 2H), 7.13 (d, J=7.4 Hz, 1H), 7.03 (t, J=6.7 Hz, 1H), 5.56 (s, 6H), 4.50 (s, 2H), 3.55 (q, J=7.0 Hz, 2H), 1.24 (t, J=7.0 Hz, 3H); $^{13}$C NMR (100 MHz, CDCl$_3$) δ166.60, 164.95, 155.06, 144.33, 138.94, 137.03, 132.97, 130.56, 123.84, 122.37, 119.11, 77.43, 72.95, 65.45, 15.30.

6) Synthesis of (η6-Benzene)chloro[2-(2-pyridinyl-κN)-4-methoxyethanolmethyl-phenyl-κC]osmium (C—N Complex 2c-3)

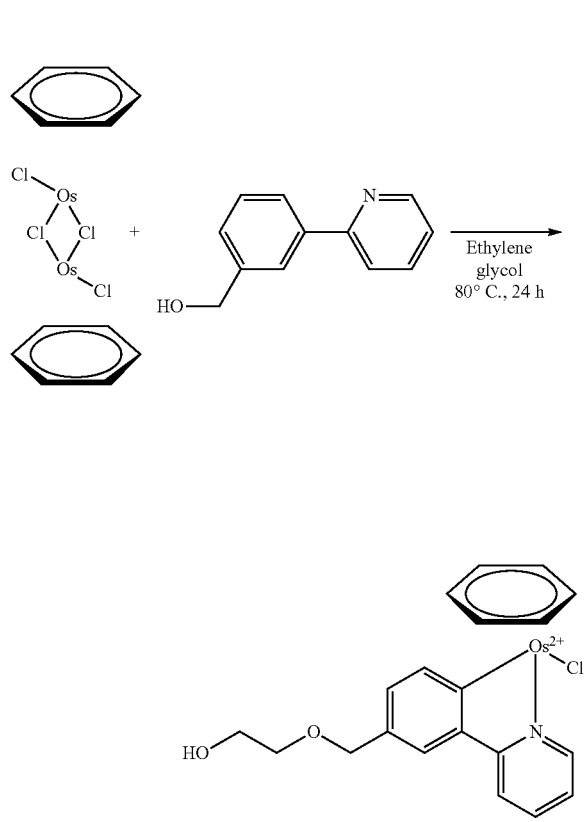

Compound A (188 mg, 0.28 mmol) and 2-(3-hydroxymethylphenyl)pyridine (108 mg, 0.58 mmol) were placed in a glass culture tube, and ethylene glycol was added thereto to mate a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 91 mg; $^1$H NMR (400 MHz, CDCl$_3$) δ9.21 (d, J=5.1 Hz, 1H), 8.10 (d, J=7.6 Hz, 1H), 7.85 (d, J=7.6 Hz, 1H), 7.69 (br, 2H), 7.13 (d, J=7.5 Hz, 1H), 7.04 (t, J=6.5 Hz, 1H), 5.56 (s, 6H), 4.56 (s, 2H), 3.76 (br, 2H), 3.62 (br, 2H), 2.01 (t, J=5.9 Hz, 1H); $^{13}$C NMR (100 MHz, CDCl$_3$) δ166.45, 165.36, 155.12, 144.45, 139.09, 137.11, 132.33, 130.55, 123.91, 122.51, 119.13, 77.48, 73.53, 71.10, 61.97.

For C—N complexes 2c-1, 2c-2, and 2c-3, a product of an osmium complex in which benzyl alcohol as a ligand was substituted with the solvent used could be obtained.

7) Synthesis of (η6-Benzene)chloro[2-(2-pyridinyl-κN)-5-methyl-phenyl-κC]osmium (C—N Complex 3a)

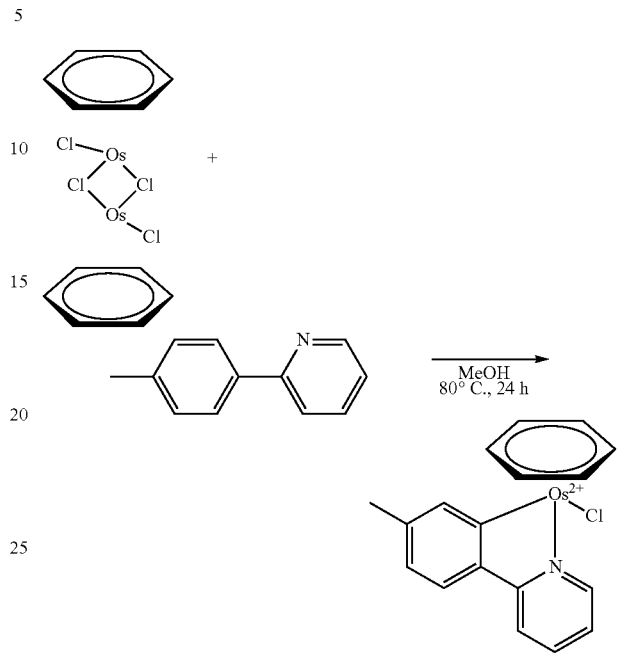

Compound A (447 mg, 0.66 mmol) and 2-(4-methylphenyl)pyridine (223 mg, 1.32 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 289 mg; $^1$H NMR (400 MHz, CDCl$_3$) δ 9.17 (d, J=5.2 Hz, 1H), 7.96 (s, 1H), 7.76 (d, J=8.1 Hz, 1H), 7.64 (t, J=7.7 Hz, 1H), 7.60 (d, J=7.9 Hz, 1H), 6.98 (t, J=6.6 Hz, 1H), 6.88 (d, J=7.9 Hz, 1H), 5.57 (s, 6H), 2.39 (s, 3H); $^{13}$C NMR (100 MHz, CDCl$_3$) δ 166.78, 165.60, 155.05, 141.81, 140.53, 139.67, 137.07, 124.28, 124.14, 121.99, 118.80, 77.42, 21.83.

8) Synthesis of (η6-Benzene)chloro[2-(2-pyridinyl-κN)-5-methoxy-phenyl-κC]osmium (C—N Complex 3b)

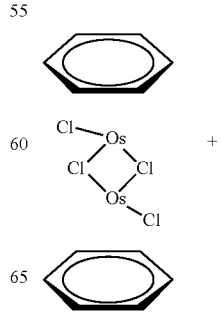

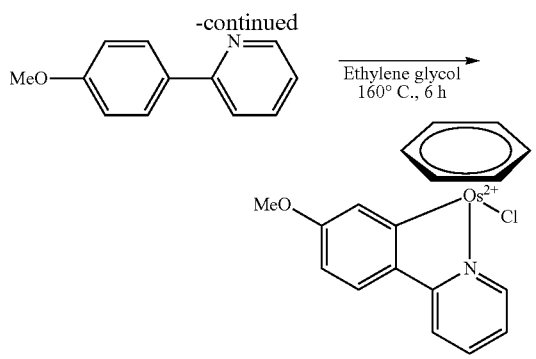

Compound A (119 mg, 0.17 mmol) and 2-(4-methoxyphenyl)pyridine (65 mg, 0.35 mmol) were placed in a glass culture tube, and ethylene glycol was added thereto to make a mixed solution. The mixed solution was refluxed at 160° C. for 6 hours. After completion of the reaction, ethylene glycol, which is a solvent, was removed by heating under reduced pressure. The solid from which the solvent was removed was purified by alumina column chromatography using methylene chloride as a developing solution. The yellow bands of a column tube were collected, the solvent was removed by distillation under reduced pressure, and then the final product was obtained. Mass recovery: 75 mg; $^1$H NMR (400 MHz, CDCl$_3$) δ9.10 (d, J=5.3 Hz, 1H), 7.60 (m, 4H), 6.90 (t, J=6.0 Hz, 1H), 6.58 (dd, J=8.5, 2.3 Hz, 1H), 5.52 (s, 6H), 3.86 (s, 3H); $^{13}$C NMR (100 MHz, CDCl$_3$) δ167.29, 166.23, 160.79, 154.94, 137.53, 136.99, 125.59, 123.23, 121.31, 118.44, 109.28, 77.41, 55.22.

9) Synthesis of (η6-Benzene)chloro[2-(2-pyridinyl-κN)-5-formyl-phenyl-κC]osmium (C—N Complex 3c)

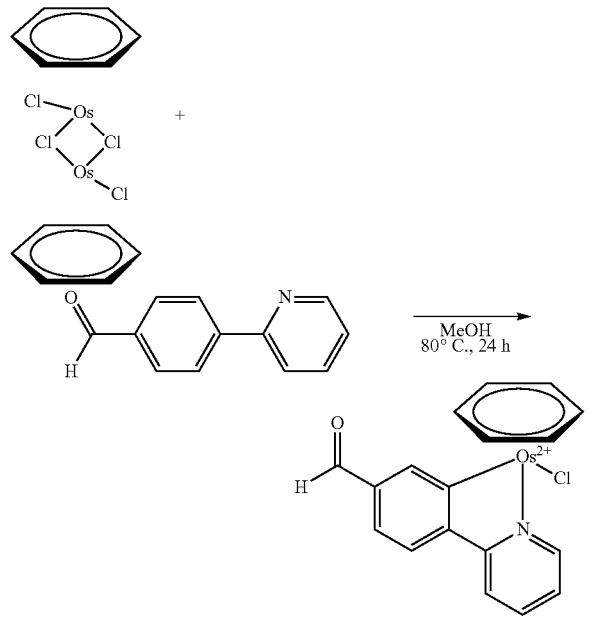

Compound A (483 mg, 0.71 mmol) and 2-(4-formylphenyl)pyridine (261 mg, 1.42 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure. The solid obtained after alumina filtration was dissolved in acetonitrile, added with water, water was added, and the mixture was stirred overnight at 80° C., and then the solvent was removed to obtain the final product. Mass recovery: 353 mg; $^1$H NMR (400 MHz, CDCl$_3$) δ10.05 (s, 1H), 9.26 (d, J=5.8 Hz, 1H), 8.57 (d, J=1.5 Hz, 1H), 7.91 (d, J=8.1 Hz, 1H), 7.81 (d, J=8.0 Hz, 1H), 7.74 (td, J=8.1, 1.5 Hz, 1H), 7.54 (dd, J=8.0, 1.6 Hz, 1H), 7.14 (ddd, J=7.3, 5.8, 1.4 Hz, 1H), 5.62 (s, 6H); $^{13}$C NMR (100 MHz, CDCl$_3$) δ193.24, 165.30, 165.25, 155.53, 150.08, 140.86, 137.45, 136.63, 124.20, 124.17, 123.74, 120.27, 77.86.

10) Synthesis of (η6-Benzene)chloro[2-(2-pyridinyl-κN)-5-methaneamine-phenyl-κC]osmium (C—N Complex 3c)

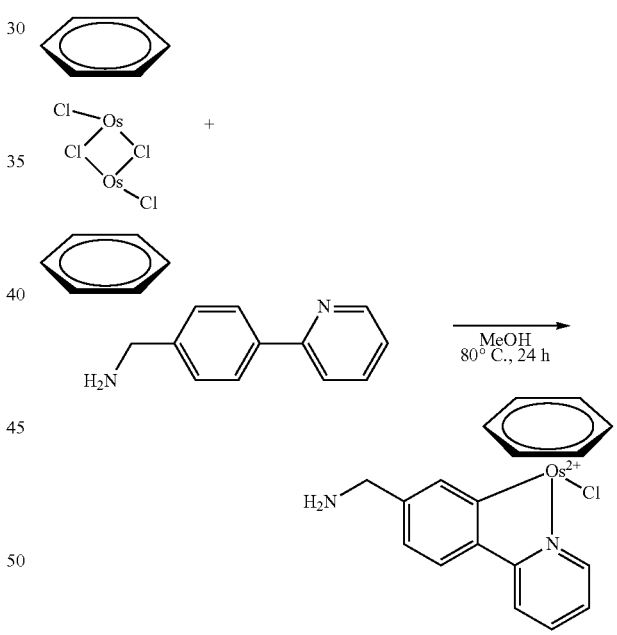

Compound A (353 mg, 0.52 mmol) and 4-pyridinyl-2-yl-benzylamine (267 mg, 1.04 mmol) were placed in a glass culture tube, and methanol was added thereto to make a mixed solution. The mixed solution was refluxed at 80° C. for 24 hours. After completion of the reaction, the reaction mixture was cooled to room temperature. The resulting precipitate was removed by vacuum filtration and washed with excess methylene chloride and methanol to collect the filtrate. The filtrate was distilled under reduced pressure to remove the solvent, and the obtained solid was purified by column chromatography using neutral alumina. Impurities were removed by the column using methylene chloride and acetonitrile, and then methanol was used as a developing solution to obtain 312 mg of a final product. The product obtained at this time proceeded with the next reaction without further purification.

11) Synthesis of (η6-Benzene)chloro[2-(2-[4-carboxlicacidmethylesterpyridnyl]-κN)-3-methoxyphenyl-κC]osmium (C—N Complex 4)

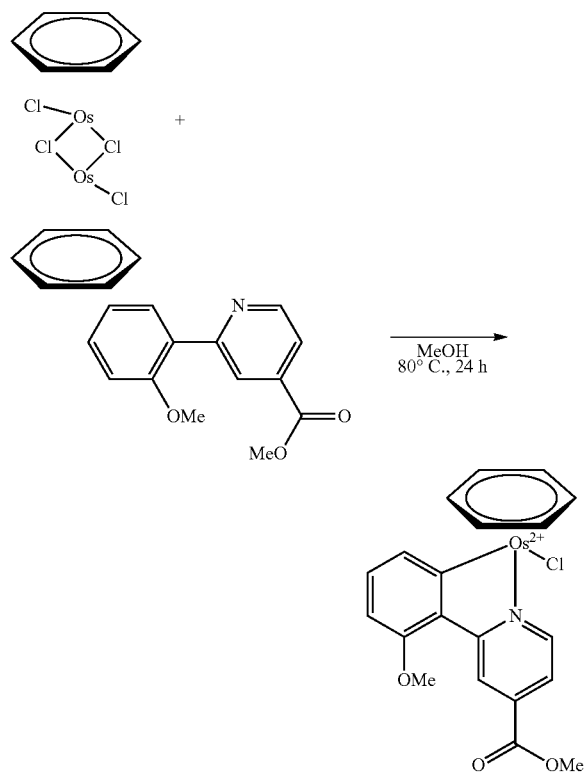

Compound A (155 mg, 0.23 mmol) and 2-(2-methoxyphenyl)-4-pyridinecarboxylic acid ester (111 mg, 0.46 mmol) were placed in a glass culture tube, and methanol was added thereto to make a mixed solution. The mixed solution was refluxed at 80° C. for 24 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 98 mg; $^1$H NMR (400 MHz, CDCl$_3$) δ9.21 (d, J=5.6 Hz, 1H), 8.10 (d, J=7.6 Hz, 1H), 7.85 (d, J=8.0 Hz, 1H), 7.67 (d, J=9.4 Hz, 2H), 7.13 (d, J=7.6 Hz, 1H), 7.04 (t, J=6.0 Hz, 1H), 5.56 (s, 4H), 5.30 (s, 1H), 4.46 (s, 2H), 3.40 (s, 2H); $^{13}$C NMR (100 MHz, CDCl$_3$) δ169.34, 166.68, 165.19, 159.28, 155.42, 137.50, 131.70, 131.62, 131.58, 123.84, 120.47, 105.63, 78.22, 55.11, 52.89.

12) Synthesis of (η6-Benzene)chloro[2-(2-thiazolyl-κN)phenyl-κC]osmium (C—N Complex 5)

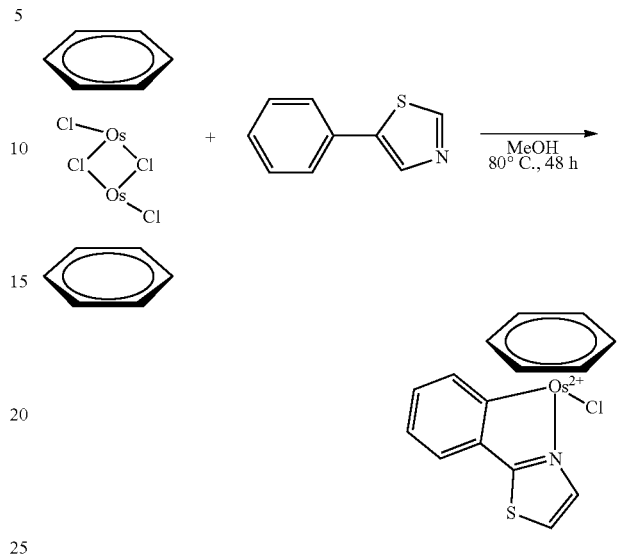

Compound A (267 mg, 0.39 mmol) and 2-phenylthiazole (138 mg, 0.86 mmol) were placed in a glass culture tube, and methanol was added thereto to make a mixed solution. The mixed solution was refluxed at 80° C. for 48 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 168 mg; $^1$H-NMR (400 MHz, CDCl$_3$): δ=8.14 (d, J=7.4 Hz, 1H), 8.02 (d, J=3.6 Hz, 1H), 7.59 (d, J=7.8 Hz, 1H), 7.24 (d, J=3.6 Hz, 1H), 7.14 (t, J=6.9 Hz, 1H), 7.03 (t, J=7.4 Hz, 1H), 5.56 (s, 6H); $^{13}$C-NMR (100 MHz, CDCl$_3$): δ=178.08, 165.24, 144.71, 140.42, 139.42, 130.74, 124.77, 123.32, 117.84, 76.86

13) Synthesis of (η6-Benzene)chloro[2-(2-benzothiazolyl-N)phenyl-κC]osmium (C—N Complex 6)

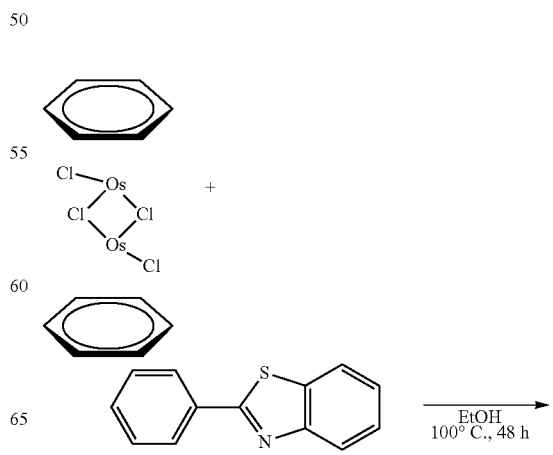

-continued

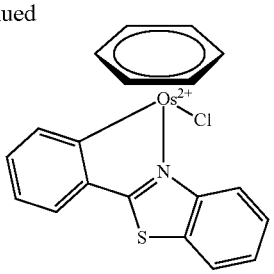

Compound A (366 ng, 0.54 mmol) and 2-phenylbenzothiazole (251 ng, 1.19 mmol) were placed in a glass culture tube, and ethanol was added thereto to make a mixed solution. The mixed solution was refluxed at 100° C. for 48 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 148 mg; $^1$H-NMR (400 MHz, CDCl$_3$): δ=8.22 (d, J=7.5 Hz, 1H), 8.18 (d, J=8.3 Hz, 1H), 7.88 (d, J=8.0 Hz, 1H), 7.78 (d, J=7.5 Hz, 1H), 7.63 (t, J=7.7 Hz, 1H), 7.47 (t, J=7.6 Hz, 1H) 7.20 (t, J=7.4 Hz, 1H), 7.11 (t, J=7.4 Hz, 1H) 5.75 (s, 6H); $^{13}$C-NMR (100 MHz, CDCl$_3$): δ=178.08, 165.24, 144.71, 140.42, 139.42, 130.74, 124.77, 123.32, 117.84, 77.48, 77.16, 76.86, 76.84.

14) Synthesis of (η6-Benzene)chloro[2-(1-Methyl-benzoimidazole-κN)phenyl-κC]osmium (C—N Complex 7a)

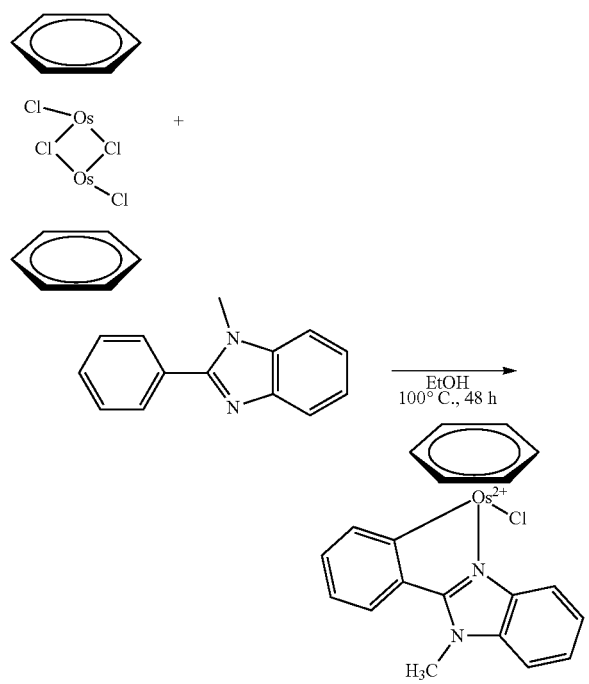

Compound A (100 mg, 0.15 mmol) and 1-methyl-2-phenyl-benzoimidazole (251 mg, 0.32 mmol) were placed in a glass culture tube, and ethanol was added thereto to make a mixed solution. The mixed solution was refluxed at 100° C. for 48 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 59 mg; $^1$H-NMR (400 MHz, CDCl$_3$): δ=8.29 (d, J=7.5 Hz, 1H), 7.86 (d, J=7.8 Hz, 1H), 7.74 (d, J=8.1 Hz, 1H), 7.40 (m, 3H), 7.19 (t, J=7.3 Hz, 1H), 7.10 (t, J=7.5 Hz, 1H) 5.75 (s, 6H), 4.16 (s, 3H); $^{13}$C-NMR (100 MHz, CDCl$_3$): δ=167.44, 162.08, 140.83, 140.41, 136.05, 134.27, 130.38, 124.52, 123.64, 123.52, 123.09, 117.36, 110.05, 76.26, 31.90

15) Synthesis of (η6-Benzene)chloro[2-(2-[1-allyl-benzimidazole]-κN)phenyl-κC]osmium (C—N Complex 7b)

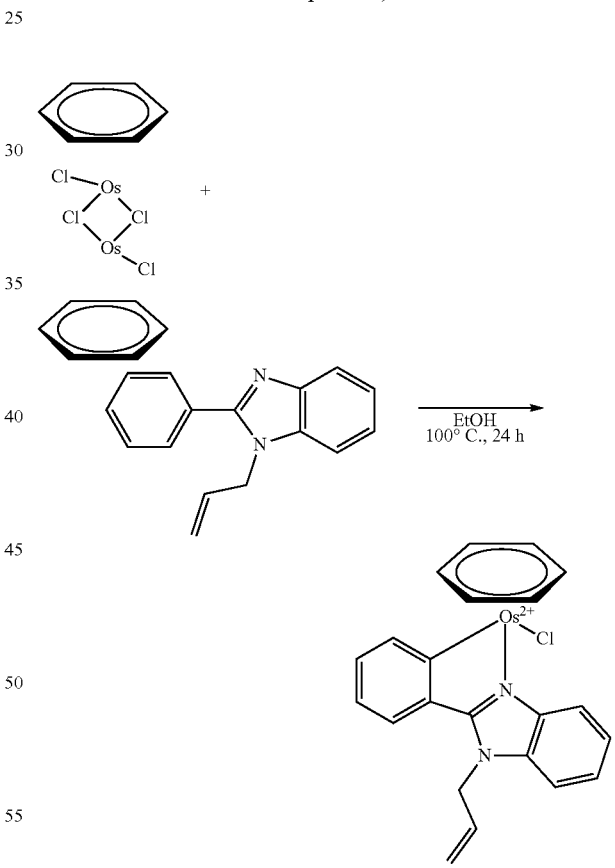

Compound A (1291 mg, 0.19 mmol) and 1-methyl-2-phenyl-benzoimidazole (98 mg, 0.42 mmol) were placed in a glass culture tube, and ethanol was added thereto to make a mixed solution. The mixed solution was refluxed at 100° C. for 48 hours. After completion of the reaction, the reaction mixture was cooled to room temperature, and the resulting precipitate was removed by vacuum filtration. After filtration, the filtrate was distilled under reduced pressure to remove the solvent, and the obtained solid was purified by alumina column chromatography using methylene chloride as a developing solution. The yellow bands of a column tube were collected, the solvent was removed by distillation under reduced pressure, and then the final product was obtained. Mass recovery: 25 mg; $^1$H NMR (400 MHz, CDCl$_3$) δ=8.29 (d, J=7.5 Hz, 1H), 7.75 (d, J=7.9 Hz, 1H), 7.68 (d, J=7.8 Hz, 1H), 7.46-7.35 (m, 3H), 7.17 (t, J=7.4 Hz, 1H), 7.07 (t, J=7.5 Hz, 1H), 6.19-6.05 (m, 1H), 5.72 (s, 6H), 5.31 (d, J=10.2 Hz, 1H), 5.25-5.03 (M, 3H). $^{13}$C NMR (100 MHz, CDCl$_3$) δ=167.47, 161.81, 140.78, 140.24, 135.60, 133.52, 130.75, 130.30, 124.49, 123.73, 123.57, 123.00, 118.32, 117.34, 110.02, 76.18, 46.87.

3. Third Step

The third step is a process of introducing two identical N—N ligands into the osmium complex into which the C—N ligand was introduced in the second step. Various osmium organometallic complexes corresponding to Chemical Formula 1 as shown in FIGS. 3a to 3c were synthesized by the proposed synthesis method. For the resulting organometallic complex, the results of the synthesis and the oxidation state of the substance was determined by ESI-MS. The yield was calculated on the basis of the high oxidation state.

Cyclic voltammograms (CV) were measured using the Palmsens EmStat$^3$ model for Os-complexes 1 to 7 and Os-complex 8, and measured using the model of CH Instruments' CHI1040C for Os-complex 8 and Os-complex 10 to 20. And, the measurement was performed at a scanning rate of 10 mV/s using Ag/AgCl as a reference electrode, a carbon glass electrode as a working electrode and a Pt electrode as a counter electrode. Substances having a counterion of PF$_6^-$ were measured at a concentration of 3 mg/mL in a 0.1M acetonitrile solution of TBAP. Concentrations of substances having a counterion of Cl$^-$ were measured in a non-constant state. The results are shown in Table 1 and FIGS. 5 to 25 below.

Synthesis of Osmium Organometallic Complex of General Formula [Os(C—N)$_1$(N—N)$_2$] from the Starting Material C—N Complex 1) Synthesis of Os-Complex 1

[Os(2-(1-Methyl-imidazole-κN)phenyl-κC)(bithiazole)$_2$]2PF$_6$

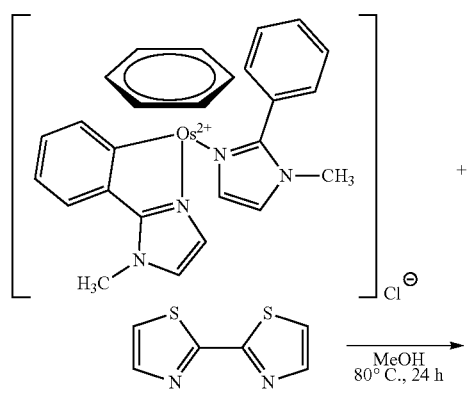

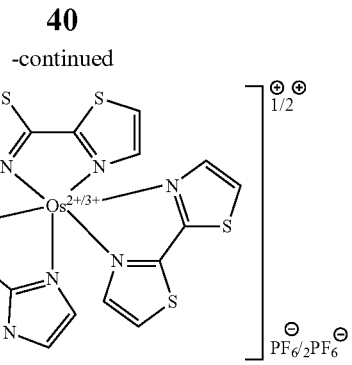

C—N complex 1 (40 mg, 0.065 mmol) and bithiazole (22 mg, 0.13 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 24 hours. An excessive amount of hexafluorophosphate ammonium salt (NH$_4$PF$_6$) was added to distilled water, and the solution after the reaction was slowly dropped into a saturated solution. The precipitate formed in the solution was filtered under reduced pressure, and washed with distilled water and excess diethyl ether to obtain a solid. In order to remove the residual ligand, an alumina filter process using methylene chloride was further performed, and then precipitated using methylene chloride/diethyl ether to obtain a product having a counterion of PF$_6^-$. (28 mg, 44%). In order to replace the counter ion with Cl$^-$ again, the product was dissolved in a small amount (~1 mL) of acetonitrile, and then along stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counter ion of Cl$^-$ was obtained. ESI-MS (Low resolution): Calcd for cation [M]$^+$ C$_{22}$H$_7$N$_6$OsS$_4$: 685.00 Found: 685.08 [M]$^+$, 342.58 [M]$^{2+}$ 2) Synthesis of Os-Complex 2

[Os(2-(1-Methyl-imidazole-κN)phenyl-κC)(bipyridine)$_2$]2PF$_6$

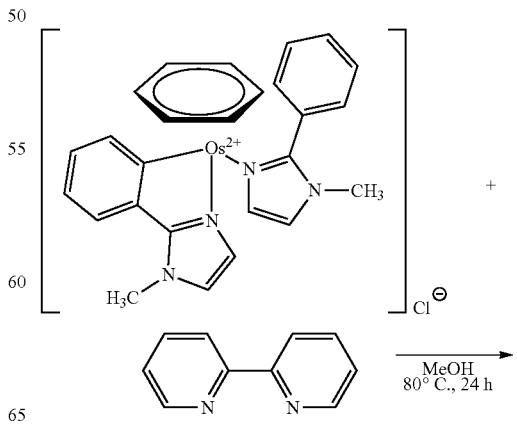

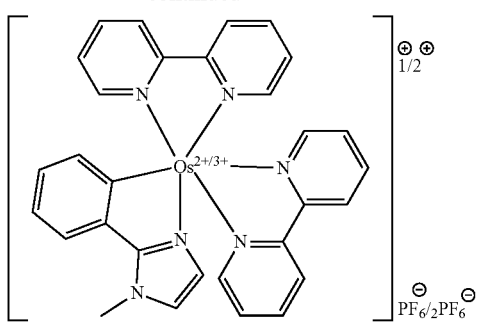

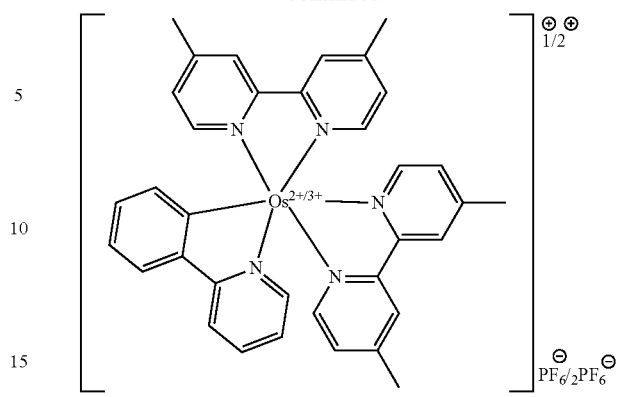

C—N complex 1 (60 mg, 0.097 nmol) and bipyridine (31 mg, 0.194 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 24 hours. An excessive amount of hexafluorophosphate ammonium salt ($NH_4PF_6$) was added to distilled water, and the solution after the reaction was slowly dropped into a saturated solution. The precipitate formed in the solution was filtered, and washed with distilled water and excess diethyl ether to obtain a solid. In order to remove the residua ligand, an alumina filter process using methylene chloride was further performed, and then precipitated using methylene chloride/diethyl ether to obtain a product having a counterion of PF). (61 mg, 67%). In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (Low resolution): Calcd for cation $[M]^+$ $C_{30}H_{25}N_6Os$: 661.18 Found: 661.33 $[M]^+$, 330.67 $[M]^{2+}$ C—N complex 2a (120 mg, 0.26 mmol) and 1,1'-dimethyl-2,2'-bipyridine (96 mg, 0.52 mmol) were placed in a glass culture tube, and methanol was added thereto to ma e a mixed solution. Then, argon gas was blown into the glass culture tube for 10 minutes to create an argon atmosphere inside the glass culture tube, and then the mixture was refluxed at 80° C. for 3 hours. An excessive amount of hexafluorophosphate ammonium salt ($NH_4PF_6$) was added to distilled water, and the solution after the reaction was slowly dropped into a saturated solution. The precipitate formed in the solution was filtered, and washed with distilled water and excess diethyl ether to obtain a final product with a counterion of $PF_6^-$. (108 mg, 92%). In order to replace the counter ion with Cl⁻ again, the product was dissolved in a small amount (~1 ml) of acetonitrile, and then stirred along with Dowex 1×4 chloride resin in an excessive amount of distilled water (25 mL) for 24 hours. The resin was removed by vacuum filtration, and the filtrate was distilled tinder reduce pressure to remove the solvent. Thereby, a product having a counterion of Cl⁻ was obtained. ESI-MS (Low resolution): Calcd for cation $[M]^+$ $C_{23}H_{20}N_5O_2OsS_2$: 654.07 Found: 654.00 $[M]^+$ 3) Synthesis of Os-Complex 3

[Os(2-(2-pyridine-κN)phenyl-κC)(1,1'-dimethyl-2,2'-bipyridine)₂]2PF₆

4) Synthesis of Os-Complex 4

[Os(2-(2-pyridine-κN)phenyl-κC)(2-Thiazol-2-yl-4,5-dihydro-oxazole)₂]₂PF₆

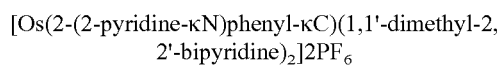

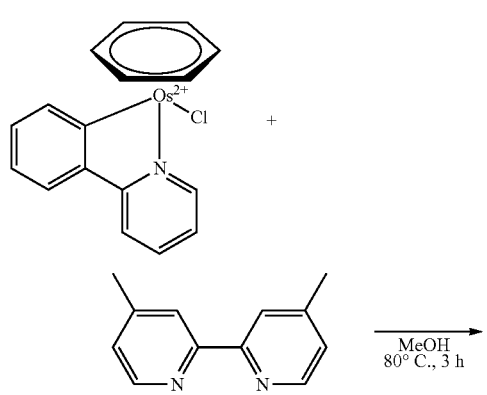

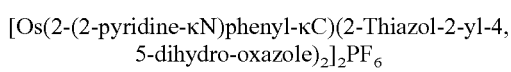

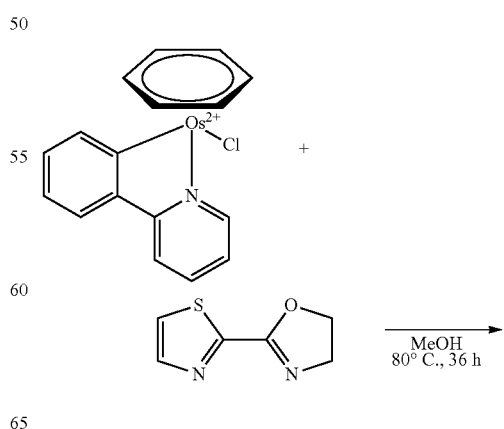

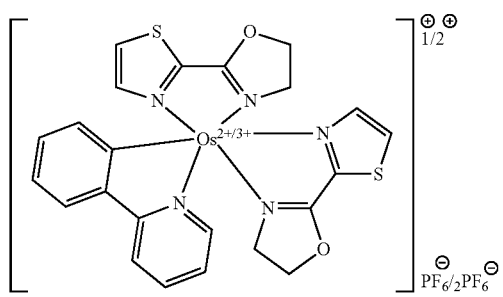

C—N complex 2a (56 mg, 0.12 mmol) and 2-thiazol-2-yl-4,5-dihydro-oxazole (37 mg, 0.24 mmol) were placed in a glass culture tube, and methanol was added thereto to make a mixed solution. Then, argon gas was blown into the glass culture tube for 10 minutes to create an argon atmosphere inside the class culture tube, and then the mixture was refluxed at 80° C. for 36 hours. An excessive amount of hexafluorophosphate ammonium salt ($NH_4PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (85 mg, 74%). In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (Low resolution): Calcd for cation $[M]^+$ $C_{23}H_{20}N_5O_2OsS_2$: 654.07 Found: 654.00 $[M]^+$, 327.08 $[M]^{2+}$ 5) Synthesis of Os-Complex 5

[Os(2-(2-pyridine-κN)phenyl-κC)(2-Pyridin-2-yl-benzothiazole)₂]PF₆

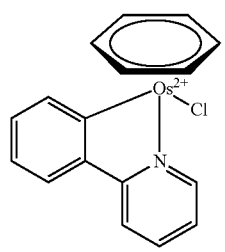

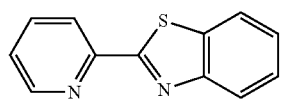

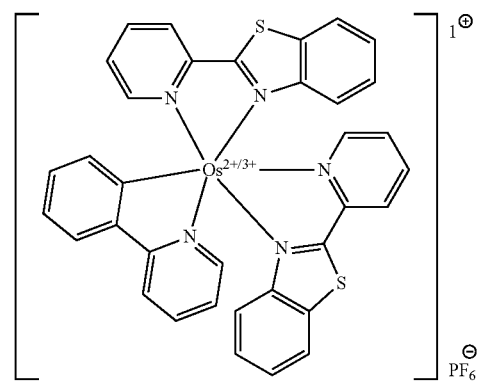

C—N complex 2a (63 mg, 0.14 mmol) and 2-pyridin-2-yl-4,5-benzothiazole (58 mg, 0.28 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 24 hours. An excessive amount of hexafluorophosphate ammonium salt ($NH_4PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (115 mg, 92%). In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (Low resolution): Calcd for cation $[M]^+$ $C_{23}H_{20}N_5O_2OsS_2$: 654.07 Found: 654.00 $[M]^+$, 327.08 $[M]^{2+}$ 6) Synthesis of Os-Complex 6

[Os(2-(2-pyridine-κN)phenyl-κC)(2-Pyridin-2-yl-benzooxazole)₂]PF₆

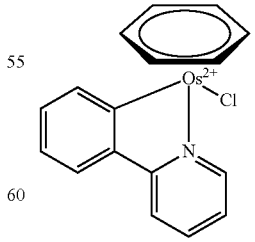

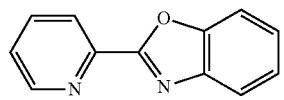

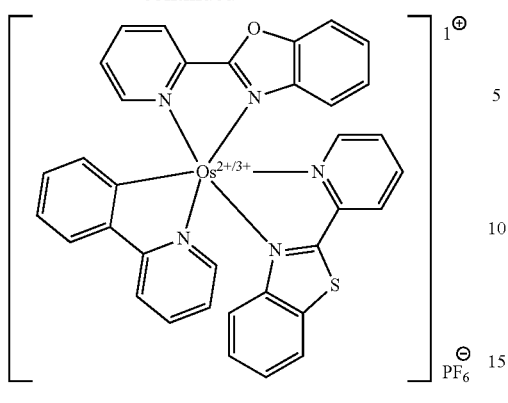

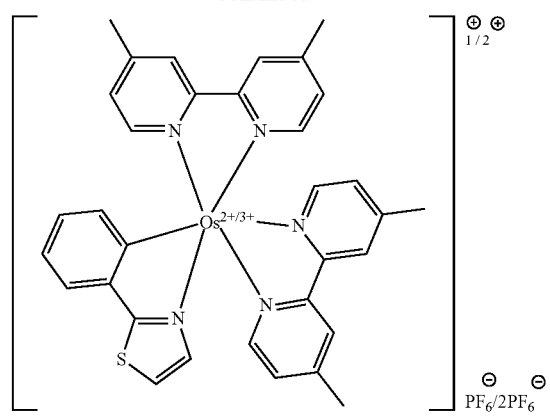

C—N complex 2a (63 mg, 0.15 mmol) and 2-pyridin-2-yl-4,5-benzoxazole (59 mg, 0.30 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 24 hours. An excessive amount of hexafluorophosphate ammonium salt (NH$_4$PF$_6$) was added to distilled water, and the solution after the reaction was slowly dropped into a saturated solution. The precipitate formed in the solution was filtered, and washed with distilled water and excess diethyl ether to obtain a final product with a counterion of PF$_6^-$. (65 mg, 50%). In order to replace the counter ion with Cl$^-$ again, the product was dissolved in a small amount (~1 ml) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl$^-$ was obtained. ESI-MS (Low resolution): Calcd for cation [M]$^+$ C$_{35}$H$_{24}$N$_5$O$_2$Os: 738.15 Found: 738.33 [M]$^+$ C—N complex 5 (50 mg, 0.11 mmol) and 2-pyridin-2-yl-4,5-benzoxazole (40 mg, 0.22 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 4 hours. An excessive amount of hexafluorophosphate ammonium salt (NH$_4$PF$_6$) was added to distilled water, and the solution after the reaction was slowly dropped into a saturated solution. The formed precipitate was filtered, and washed with distilled water and excess diethyl ether to obtain a final product with a counterion of PF$_6^-$. (69 mg, 64%). In order to replace the counter ion with Cl$^-$ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl$^-$ was obtained. ESI-MS (Low resolution): Calcd for cation [M]$^+$ C$_{33}$H$_{30}$N$_5$OsS: 720.18 Found: 720.33 [M]$^+$, 360.25 [M]$^{2+}$ 7) Synthesis of Os-Complex 7

[Os(2-(2-thiazole-κN)phenyl-κC)(1,1'-dimethyl-2,2'-bipyridine)$_2$]2PF$_6$

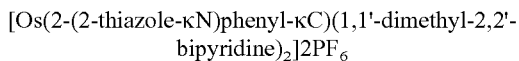

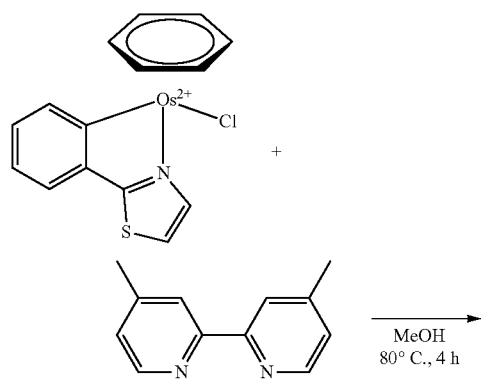

8) Synthesis of Os-Complex 8

[Os(2-(2-thiazole-κN)phenyl-κC)(4,5-Diazafluorenone)$_2$]PF$_6$

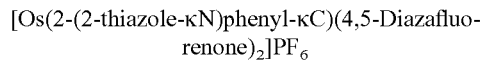

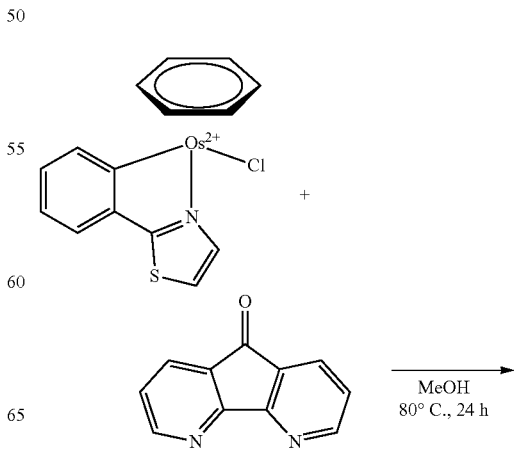

47

-continued

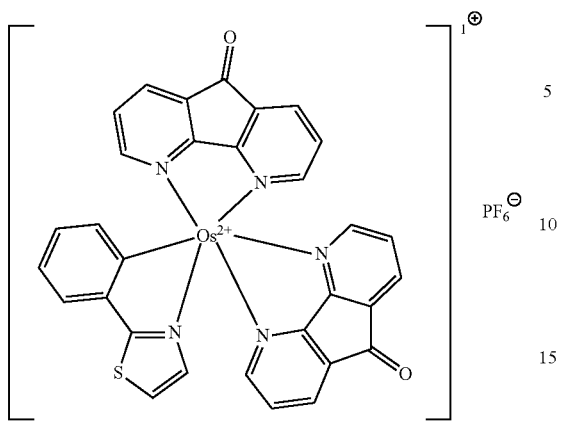

48

-continued

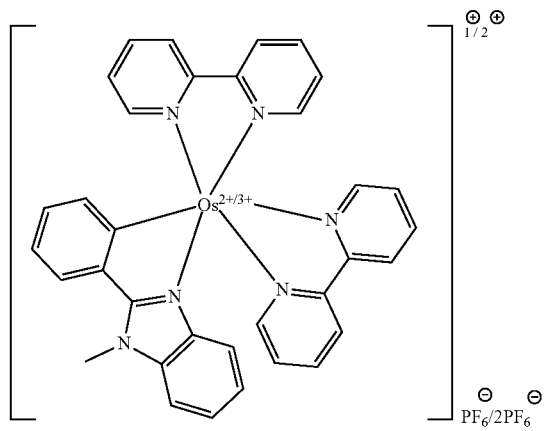

C—N complex 5 (35 mg, 0.075 mmol) and 4,5-diazafullerenone (28 mg 0.15 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 24 hours. An excessive amount of hexafluorophosphate ammonium salt ($NH_4PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (58 mg, 90%). In order to replace the counter ion with $Cl^-$ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of $Cl^-$ was obtained. ESI-MS (Low resolution): Calcd for cation $[M]^+$ $C_{31}H_{18}N_5O_2OsS$: 716.078 Found: 716.079 $[M]^+$ C—N complex 7a (45 mg, 0.098 mmol) and bipyridine (31 mg, 0.196 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 12 hours. An excessive amount of hexafluorophosphate ammonium salt ($NH_4PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (58 mg, 59%). In order to replace the counter ion with $Cl^-$ again, the product was dissolved in a small amount (~1 ml) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of $Cl^-$ was obtained. ESI-MS (Low resolution): Calcd for cation $[M]^+$ $C_{34}H_{27}N_5Os$: 711.191 Found: 711.33 $[M]^+$, 355.75 $[M]^{2+}$ 9) Synthesis of Os-Complex 9

[Os(2-(1-Methyl-benzoimidazole-κN)phenyl-κC)(bipyridine)$_2$]2PF$_6$

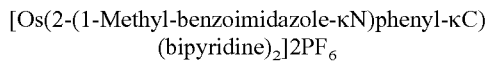

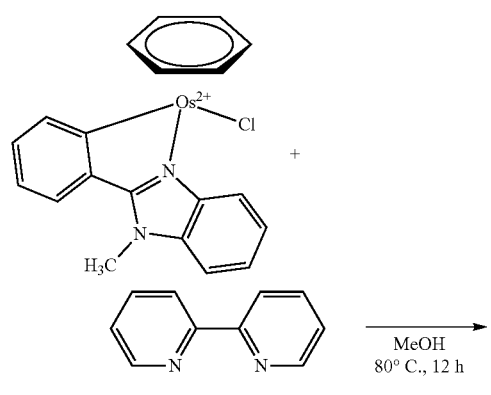

10) Synthesis of Os-Complex 10

[Os(2-(2-[1-allyl-benzimidazole]-κN)phenyl-κC)(4,4'-dimethyl-2,2'-bipyridine)$_2$]2PF$_6$

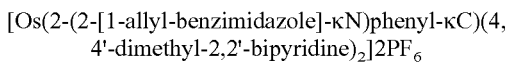

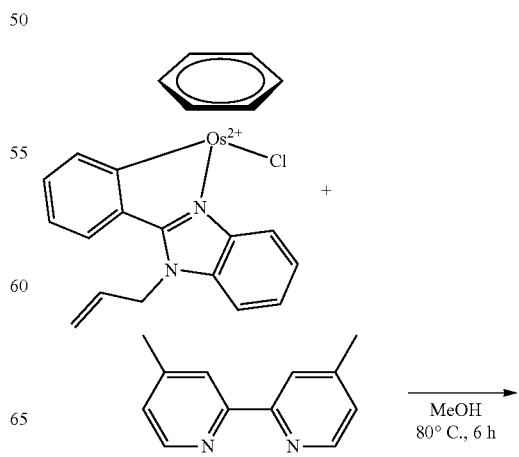

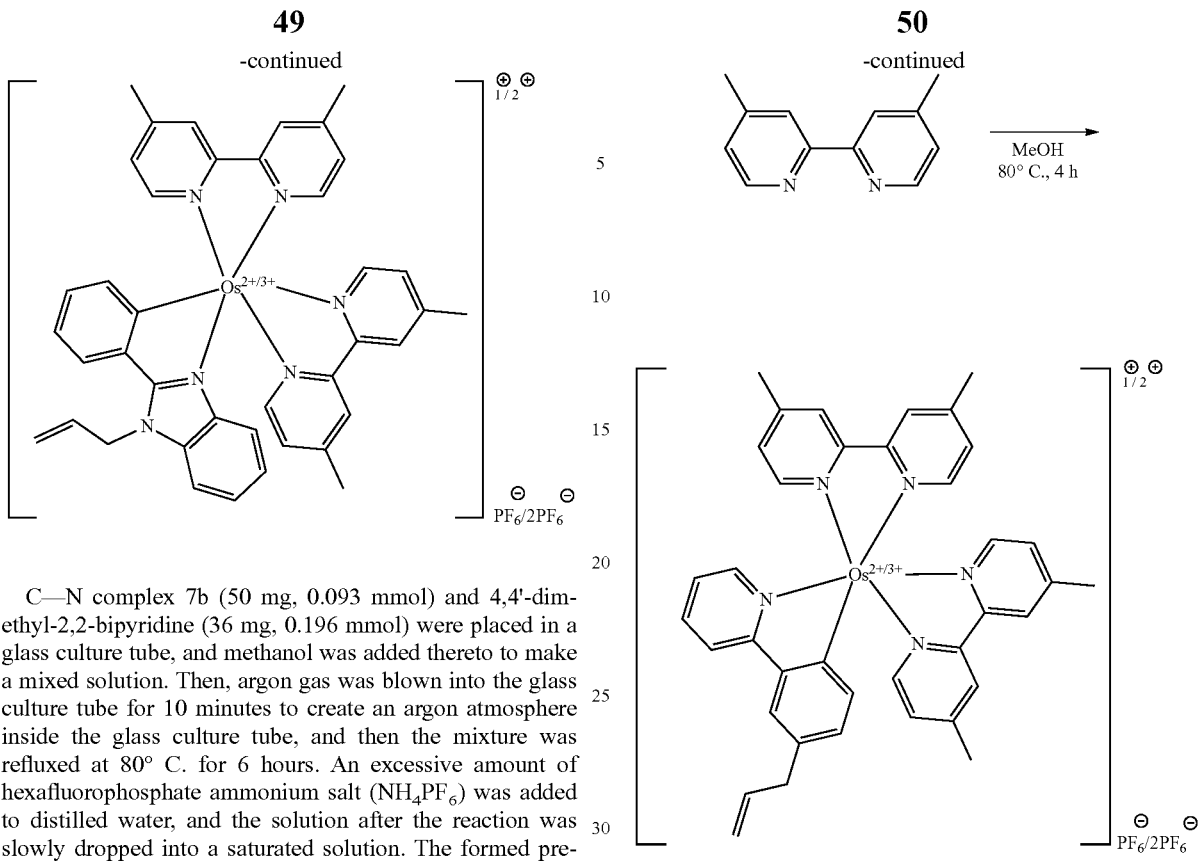

C—N complex 7b (50 mg, 0.093 mmol) and 4,4'-dimethyl-2,2-bipyridine (36 mg, 0.196 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 6 hours. An excessive amount of hexafluorophosphate ammonium salt ($NH_4PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (74 mg, 74%). In order to replace the counter ion with $Cl^-$ again, the product was dissolved in a small amount (~1 mL) of acetonitrile, and then stirred along with Dowex 1×4 chloride resin in an excessive amount of distilled water (25 ml) for 24 hours. The resin was removed by vacuum filtration, and the filtrate was distilled under reduce pressure to remove the solvent. Thereby, a product having a counterion of $Cl^-$ was obtained. ESI-MS (Low resolution): Calcd for cation $[M]^+$ $C_{40}H_{37}N_5Os$: 793.269 Found: 793.42 $[M]^+$, 396.75 $[M]^{2+}$ 11) Synthesis of Os-Complex 11

[Os(2-(2-pyridinyl-κN)-4-allyl-phenyl-κC)(4,4'-dimethyl-2,2'-bipyridine)$_2$]2PF$_6$

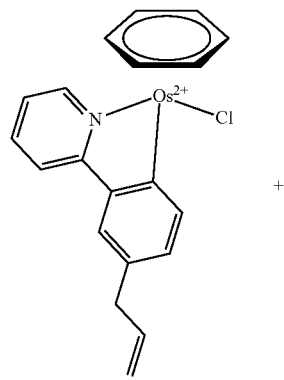

+

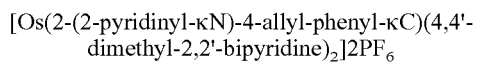

C—N complex 2b (155 mg, 031 mmol) and 4,4'-dimethyl-2,2'-bipyridine (175 mg, 0.64 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 4 hours. An excessive amount of hexafluorophosphate ammonium salt ($NH_{14}PF_6$) was added to distilled water, and the solution after the reaction was slowly dropped into a saturated solution. The formed precipitate was filtered, and washed with distilled water and excess diethyl ether to obtain a final product with a counterion of $PF_6^-$. (267 mg, 82%). In order to replace the counter ion with $CL^-$ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of $Cl^-$ was obtained. ESI-MS (Low resolution): Calcd for cation $[M]^+$ $C_{38}H_{36}N_5Os$: 754.259 Found: 754.42 $[M]^+$, 377.25 $[M]^{2+}$

12) Synthesis of Os-Complex 12

[Os(2-(2-pyridinyl-κN)-4-allyl-phenyl-κC)(bipyridine)₂]2PF₆

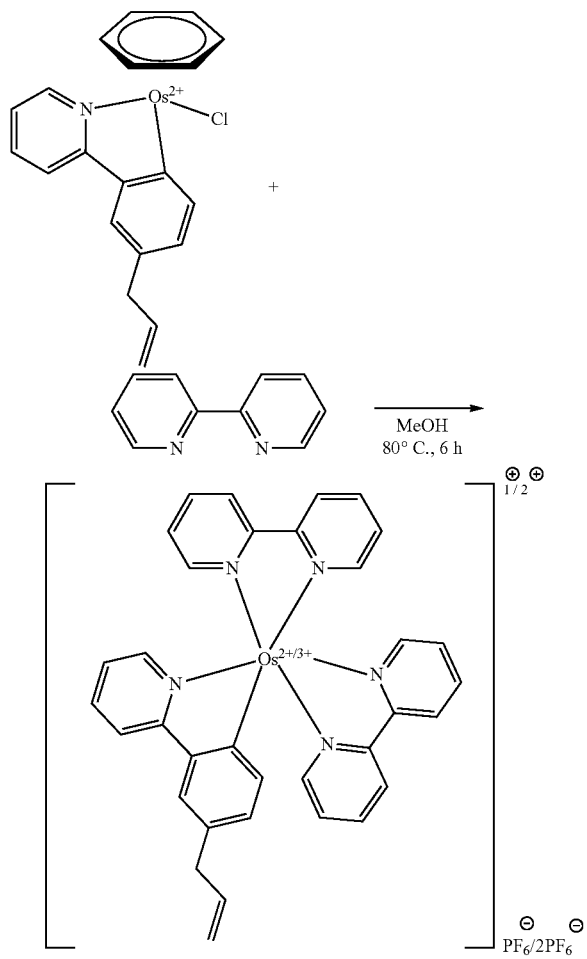

C—N complex 2b (163 ng, 0.33 mmol) and bipyridine (102 mg, 0.66 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 6 hours. An excessive amount of hexafluorophosphate ammonium salt (NH₄PF₆) was added to distilled water, and the solution after the reaction was slowly dropped into a saturated solution. The formed precipitate was filtered, and washed with distilled water and excess diethyl ether to obtain a final product with a counterion of PF₆⁻. (220 mg, 68%). In order to replace the counterion with Cl⁻ again, the product was dissolved in a small amount (~1 mL) of acetonitrile, and then stirred along with Dowex 1×4 chloride resin in an excessive amount of distilled water (25 ml) for 24 hours. The resin was removed by vacuum filtration, and the filtrate was distilled under reduce pressure to remove the solvent. Thereby, a product having a counterion of Cl⁻ was obtained. ESI-MS (High resolution): Calcd for cation [M]⁺ $C_{34}H_{28}N_5Os$: 698.1954 Found: 698.1954 [M]⁺, 349.0974 [M]²⁺

13) Synthesis of Os-Complex 13

[Os(2-(2-pyridinyl-κN)-5-methaneamine-phenyl-κC)(bipyridine)₂]2PF₆

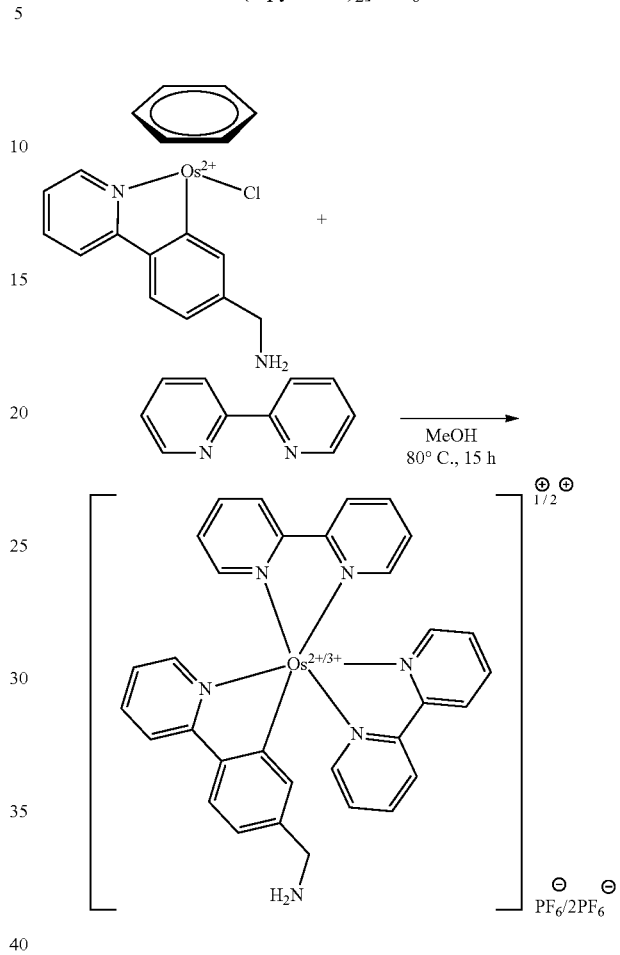

C—N complex 3d (226 mg, 0.46 mmol) and bipyridine (145 mg, 0.93 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 15 hours. An excessive amount of hexafluorophosphate ammonium salt (NH₄PF₆) was added to distilled water, and the solution after the reaction was slowly dropped into a saturated solution. The formed precipitate was filtered, and washed with distilled water and excess diethyl ether to obtain a final product with a counterion of PF₆⁻. (306 mg, 68%). In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (High resolution): Calcd for cation [M]⁺ $C_{32}H_{27}N_6Os$: 687.1912 Found: 687.1908 [M]⁺, 343.5948 [M]²⁺, 335.5856 [M–NH₂]²⁺

14) Synthesis of Os-Complex 14

[Os(2-(2-pyridinyl-κN)-5-methaneamine-phenyl-κC)(4,4'-dimethyl-2,2'-bipyridine)₂]2PF₆

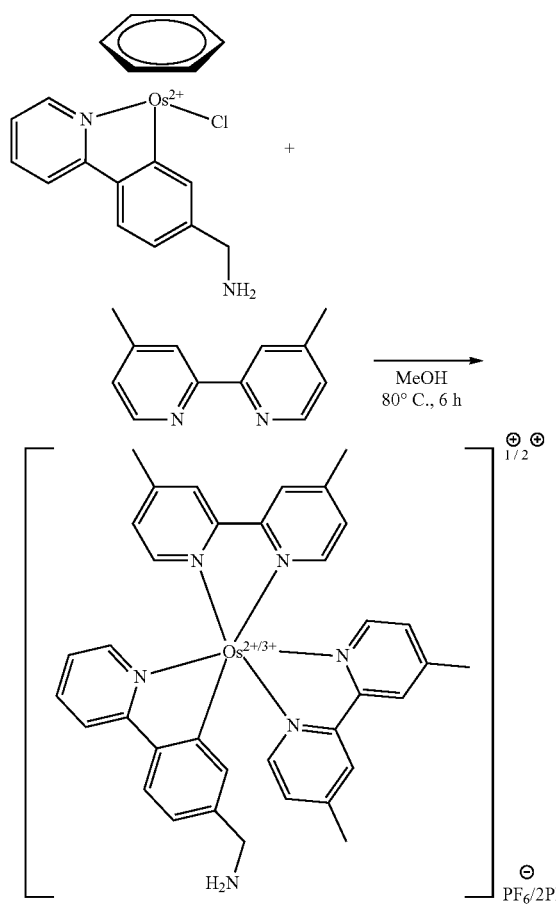

C—N complex 3d (267 ng, 0.55 mmol) and 4,4'-dimethyl-2,2'-bipyridine (305 mg, 1.10 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 6 hours. An excessive amount of hexafluorophosphate ammonium salt (NH₄PF₆) was added to distilled water, and the solution after the reaction was slowly dropped into a saturated solution. The formed precipitate was filtered, and washed with distilled water and excess diethyl ether to obtain a final product with a counterion of $PF_6^-$. (375 mg, 66%). In order to replace the counter ion with CL-again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of $Cl^-$ was obtained. ESI-MS (High resolution): Calcd for cation [M]⁺ $C_{36}H_{35}N_6Os$: 743.2538 Found: 743.2532 [M]⁺, 371.6262 [M]²⁺, 363.6172 [M–NH₂]²⁺

15) Synthesis of Os-Complex 15

[Os(2-(2-pyridinyl-κN)-5-methaneamine-phenyl-κC)(4,4'-dimethoxy-2,2'-bipyridine)₂]2PF₆

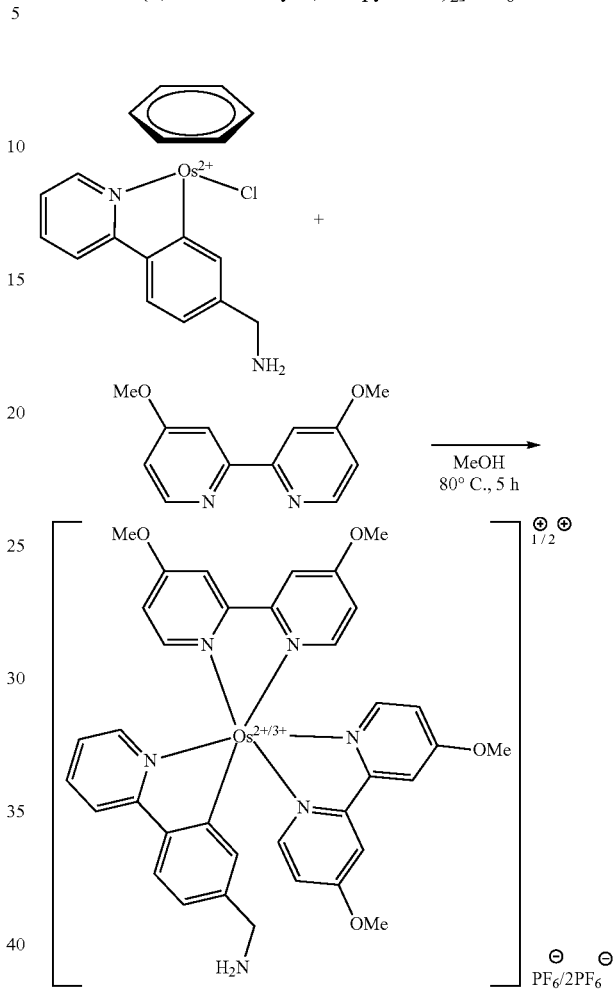

C—N complex 3d (179 mg, 0.37 mmol) and 4,4'-dimethoxy-2,2'-bipyridine (159 ng, 0.74 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 5 hours. An excessive amount of hexafluorophosphate ammonium salt (NH₄PF₆) was added to distilled water, and the solution after the reaction was slowly dropped into a saturated solution. The formed precipitate was filtered, and washed with distilled water and excess diethyl ether to obtain a final product with a counterion of $PF_6^-$. (228 mg, 57%). In order to replace the counter ion with $Cl^-$ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of $Cl^-$ was obtained. ESI-MS (High resolution): Calcd for cation [M]⁺ $C_{36}H_{35}N_6O_4Os$: 807.2334 Found: 807.2330 [M]⁺, 403.6158 [M]²⁺, 376.2595 [M–NH₂]²⁺

16) Synthesis of Os-Complex 16

[Os(2-(2-pyridinyl-κN)-5-methaneamine-phenyl-κC)(bithiazole)₂]2PF₆

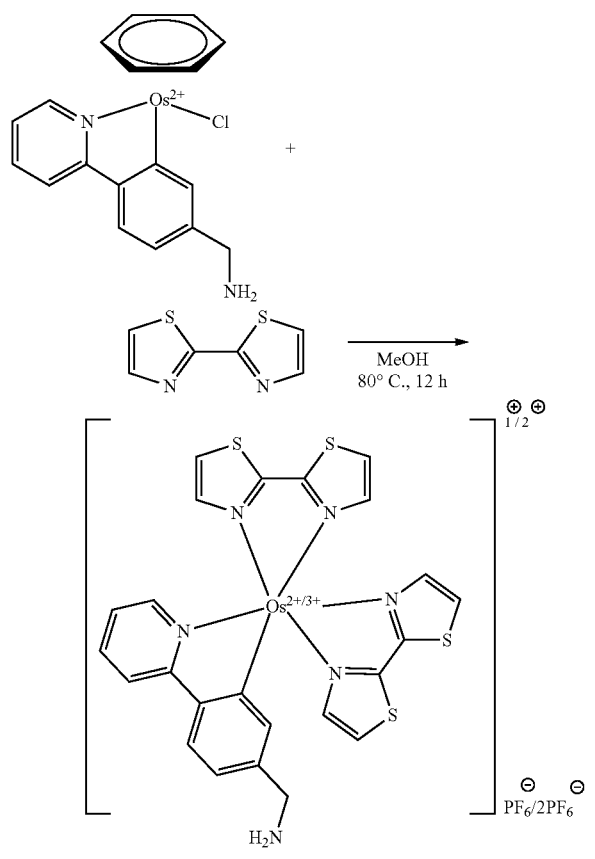

17) Synthesis of Os-Complex 17

[Os(2-(2-pyridinyl-κN)-5-formyl-phenyl-κC)(bipyridine)₂]PF₆

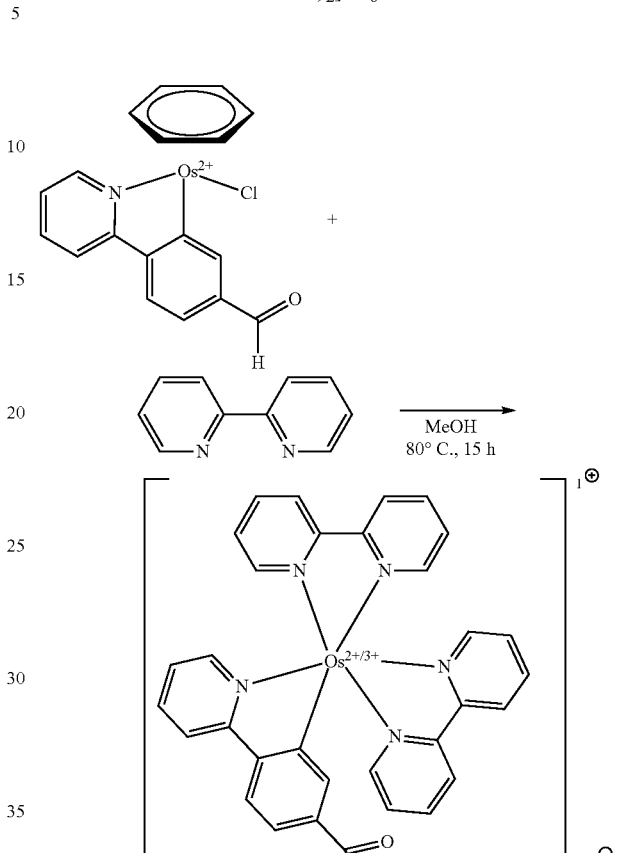

C—N complex 3d (137 mg, 0.28 mmol) and bithiazole (95 mg, 0.56 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 12 hours. An excessive amount of hexafluorophosphate ammonium salt (NH$_4$PF$_6$) was added to distilled water, and the solution after the reaction was slowly dropped into a saturated solution. The formed precipitate was filtered, and washed with distilled water and excess diethyl ether to obtain a final product with a counterion of PF$_6^-$. (124 mg, 44%). In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (High resolution): Calcd for cation [M]⁺ $C_{24}H_{19}N_6OsS_4$: 711.0169 Found: 711.0163 [M]⁺, 355.5080 [M]²⁺, 347.4955 [M–NH$_2$]²⁺

C—N complex 3c (67 mg, 0.14 mmol) and bipyridine (43 mg, 0.28 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 15 hours. An excessive amount of hexafluorophosphate ammonium salt (NH$_4$PF$_6$) was added to distilled water, and the solution after the reaction was slowly dropped into a saturated solution. The formed precipitate was filtered, and washed with distilled water and excess diethyl ether to obtain a final product with a counterion of PF$_6^-$. (91 mg, 79%). In order to replace the counter ion with C again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl⁻ was obtained. ESI-MS (High resolution): Calcd for cation [M]⁺ $C_{32}H_{24}N_5OOs$: 686.1585 Found: 686.1591 [M]⁺

18) Synthesis of Os-Complex 18

[Os(2-(2-pyridinyl-κN)-5-formyl-phenyl-κC)(4,4'-dimethyl-2,2'-bipyridine)$_2$]Cl

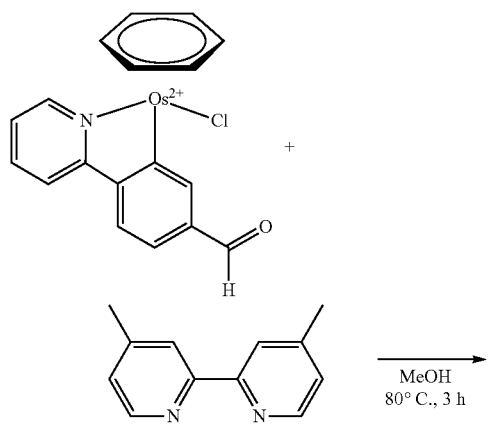

19) Synthesis of Os-Complex 19

[Os(2-(2-pyridine-κN)-5-methyl-phenyl-κC)(4-methyl-4'-carbaldehyde-2,2'-bipyridine)$_2$]2Cl

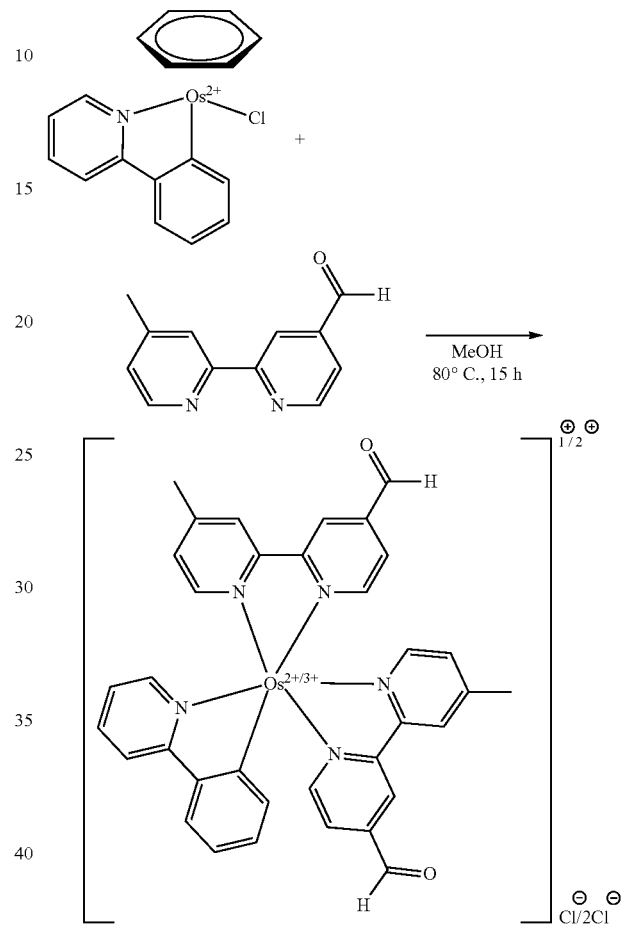

C—N complex 3c (102 mg, 0.21 mmol) and 4,4'-dimethyl-2,2'-bipyridine (77 mg, 0.43 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 3 hours. An excessive amount of hexafluorophosphate ammonium salt (NH$_4$PF$_6$) was added to distilled water, and the solution after the reaction was slowly dropped into a saturated solution. The formed precipitate was filtered, and washed with distilled water and excess diethyl ether to obtain a final product with a counterion of PF$_6^-$. In order to replace the counter ion with Cl$^-$ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent. Thereby, a product having a counterion of Cl$^-$ was obtained. (131 mg, 70%) ESI-MS (High resolution): Calcd for cation [M]$^+$ C$_{36}$H$_{32}$N$_5$OOs: 742.2211 Found: 742.2217 [M]$^+$ C—N complex 2a (60 mg, 0.13 mmol) and 4-methyl-4-carboaldehyde-2,2'-bipyridine (52 mg, 0.26 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 15 hours. An excessive amount of hexafluorophosphate ammonium salt (NH$_4$PF$_6$) was added to distilled water, and the solution after the reaction was slowly dropped into a saturated solution. The formed precipitate was filtered, and washed with distilled water and excess diethyl ether to obtain a final product with a counterion of PF$_6^-$. In order to replace the counter ion with Cl$^-$ again, the product was dissolved in a small amount (~1 nL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent, and then dissolved in distilled water again, and the mixture was stirred at 100° C. for 18 hours to remove the solvent. Thereby, a product having a counterion of Cl$^-$ was obtained. (101 mg, 95%) ESI-MS (High resolution): Calcd for cation [M]⁺ $C_{35}H_{28}N_5O_2Os$: 742.1858 Found: 742.1854 [M]⁺ 774.2117 [M+MeOH]⁺ 806.2367 [M+2MeOH]⁺

20) Synthesis of Os-Complex 20

[Os(2-(2-pyridine-κN)phenyl-κC)(4-methyl-4'-carbaldehyde-2,2'-bipyridine)₂]2Cl (Os-Complex 20)

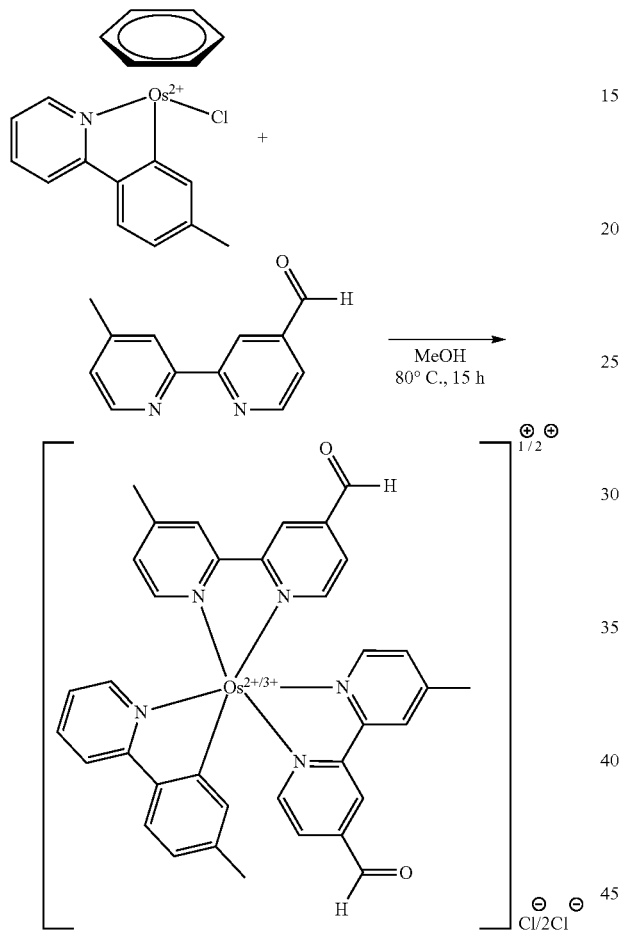

C—N complex 3a (73 mg, 0.16 mmol) and 4-methyl-4-carboxaldehyde-2,2'-bipyridine (61 mg, 0.31 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 15 hours. An excessive amount of hexafluorophosphate ammonium salt (NH₄PF) was added to distilled water, and the solution after the reaction was slowly dropped into a saturated solution. The formed precipitate was filtered, and washed with distilled water and excess diethyl ether to obtain a final product with a counterion of $PF_6^-$. In order to replace the counter ion with Cl⁻ again, the product was dissolved in a small amount (~1 nL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent, and then dissolved in distilled water again, and the mixture was stirred at 100° C. for 18 hours to remove the solvent. Thereby, a product having a counterion of Cl⁻ was obtained. (92 mg, 72%) ESI-MS (High resolution): Calcd for cation [M]⁺ $C_{36}H_{30}N_5O_2Os$: 756.2014 Found: 756.2014 [M]⁺, 788.2275 [M+MeOH]⁺, 820.2534 [M+2MeOH]⁺, 394.1133 [M+MeOH]²⁺, 410.1262 [M+2MeOH]²⁺

21) Synthesis of Os-Complex 21

[Os(2-(2-pyridine-κN)phenyl-κC)(4-metoxy-4'-carbaldehyde-2,2'-bipyridine)₂]2Cl (Os-Complex 21)

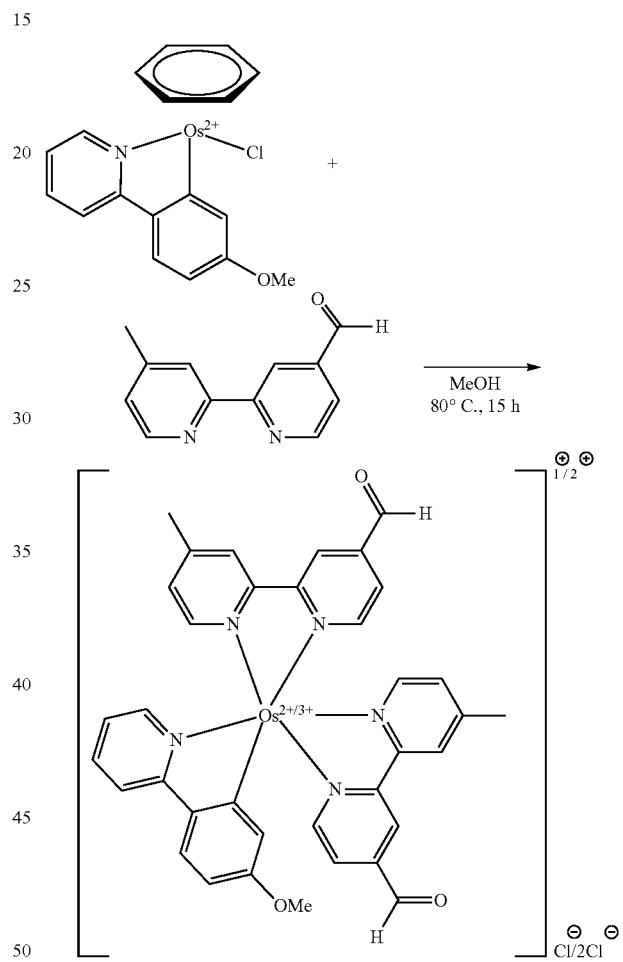

C—N complex 3b (61 mg, 0.12 mmol) and 4-methoxy-4'-carboaldehyde-2,2'-bipyridine (50 mg 0.25 mmol) were placed in a glass culture tube, and methanol was added thereto to make a mixed solution. Then, argon gas was blown into the glass culture tube for 10 minutes to create an argon atmosphere inside the glass culture tube, and then the mixture was refluxed at 80° C. for 15 hours. An excessive amount of hexafluorophosphate ammonium salt (NH₄PF₆) was added to distilled water, and the solution after the reaction was slowly dropped into a saturated solution. The formed precipitate was filtered, and washed with distilled water and excess diethyl ether to obtain a final product with a counterion of $PF_6^-$. In order to replace the counter ion with Cl⁻ again, the product was dissolved in a small amount (~1 mL) of acetonitrile, and then stirred along with Dowex 1×4 chloride resin in an excessive amount of distilled water (25 mL) for 24 hours. The resin was removed by vacuum filtration, and the filtrate was distilled under reduce pressure to remove the solvent, and then dissolved in distilled water again, and the mixture was stirred at 100° C. for 18 hours to remove the solvent. Thereby, a product having a counterion of Cl⁻ was obtained. (83 mg, 79%) ESI-MS (High resolution): Calcd for cation $[M]^+$ $C_{36}H_{30}N_5O_3Os$: 772.196; Found: 804.222 $[M+CH_3OH]^+$, 836.248 $[M+2CH_3OH]^+$, 418.124 $[M+2CH_3OH]^{2+}$

TABLE 1

Structure and oxidation-reduction potential of synthesized osmium complex

| Os-complex | Structure | $E_{1/2}$ (vs Ag/AgCl)/mV |
|---|---|---|
| 1 | | $PF_6^-$: 215<br>$Cl^-$: 15(predicted)[b] |
| 2 | | $PF_6^-$: 145<br>$Cl^-$: (−) 55(predicted) |
| 3 | | $PF_6^-$: 160<br>$Cl^-$: (−) 75 |
| 4 | | $PF_6^-$: 205<br>$Cl^-$: (−) 20 |

TABLE 1-continued

Structure and oxidation-reduction potential of synthesized osmium complex

| Os-complex | Structure | $E_{1/2}$ (vs Ag/AgCl)/mV |
|---|---|---|
| 5 | | $PF_6^-$: 390<br>$Cl^-$: 160(predicted) |
| 6 | | $PF_6^-$: 360<br>$Cl^-$: 130(predicted) |
| 7 | | $PF_6^-$: 165<br>$Cl^-$: (−) 35(predicted) |

TABLE 1-continued
Structure and oxidation-reduction potential of synthesized osmium complex
| Os-complex | Structure | $E_{1/2}$ (vs Ag/AgCl)/mV |
|---|---|---|
| 8 | 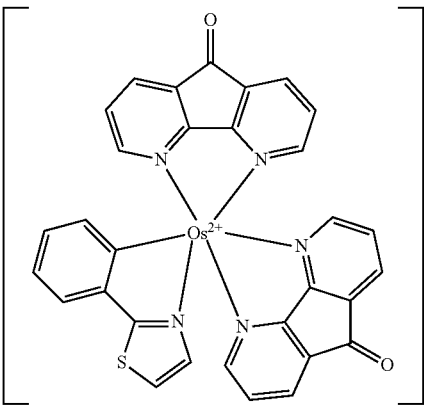 | $PF_6^-$: 385<br>$Cl^-$: 185(predicted) |
| 9 | 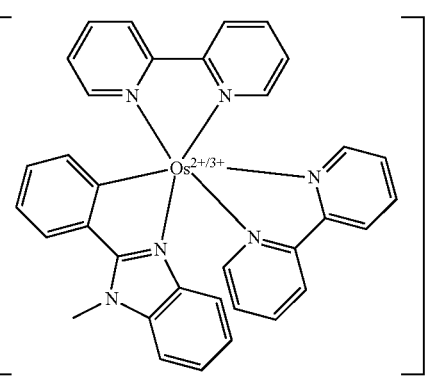 | $PF_6^-$: 185<br>$Cl^-$: (−) 15(predicted) |
| 10 | 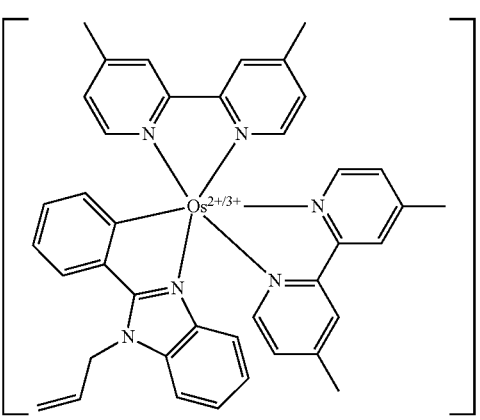 | $PF_6^-$: 72<br>$Cl^-$: (−) 128(predicted) |

TABLE 1-continued

Structure and oxidation-reduction potential of synthesized osmium complex

| Os-complex | Structure | $E_{1/2}$ (vs Ag/AgCl)/mV |
|---|---|---|
| 11 | | $PF_6^-$: 115<br>$Cl^-$: (−) 82 |
| 12 | | $PF_6^-$: 214<br>$Cl^-$: (−) 21 |
| 13 | | $PF_6^-$: 269<br>$Cl^-$: 21 |

TABLE 1-continued

Structure and oxidation-reduction potential of synthesized osmium complex

| Os-complex | Structure | $E_{1/2}$ (vs Ag/AgCl)/mV |
|---|---|---|
| 14 | | $PF_6^-$: 160<br>$Cl^-$: (−) 94 |
| 15 | | $PF_6^-$: 3<br>$Cl^-$: (−) 203 |
| 16 | | $PF_6^-$: 311<br>$Cl^-$: 95 |

TABLE 1-continued
Structure and oxidation-reduction potential of synthesized osmium complex
| Os-complex | Structure | $E_{1/2}$ (vs Ag/AgCl)/mV |
|---|---|---|
| 17 | 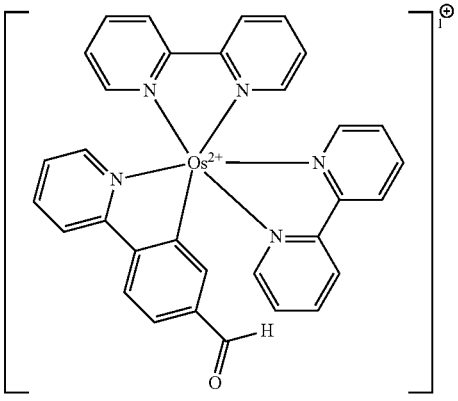 | $PF_6^-$: 310<br>$Cl^-$: 96 |
| 18 | 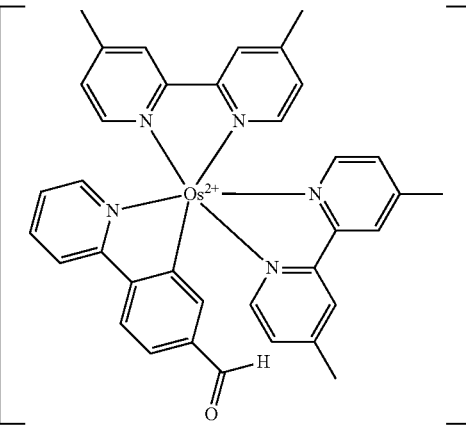 | $PF_6^-$: 195<br>$Cl^-$: (−) 39 |
| 19 | 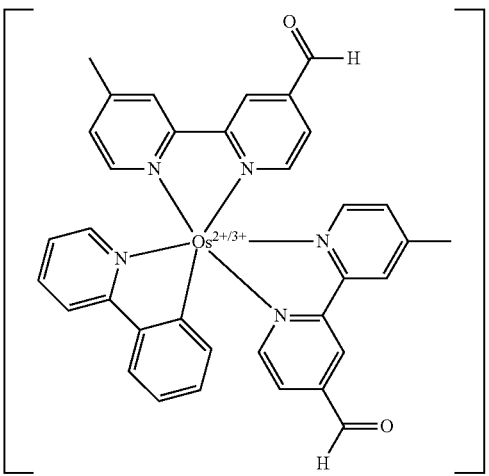 | $PF_6^-$: 349<br>$Cl^-$: 38 |

TABLE 1-continued

Structure and oxidation-reduction potential of synthesized osmium complex

| Os-complex | Structure | $E_{1/2}$ (vs Ag/AgCl)/mV |
|---|---|---|
| 20 | [Os²⁺/³⁺ complex structure] | $PF_6^-$: 343<br>$Cl^-$: 4 |
| 21 | [Os²⁺/³⁺ complex structure with OMe] | $PF_6^-$: 225<br>$Cl^-$: 15 |

([a] It was assumed that the value of $E_{1/2}$ expected for a $Cl^-$ substance shifted −200 mV through comparison with other substances in consideration of the solubility in water.)

The invention claimed is:
1. A transition metal complex useful as electron transport media having the following chemical structural formula:

[M(C—N)$_\alpha$(N—N)$_{3-\alpha}$]$^m$dX            [Chemical Formula 1]

wherein, M is Os;
α is an integer of 1;
m is a negative or positive charge representing −1 to −5 or 1 to 5;
d is an integer from 0 to 2;
X is a counter ion;
C—N is one selected from the group consisting of and
N—N is one selected from the group consisting of

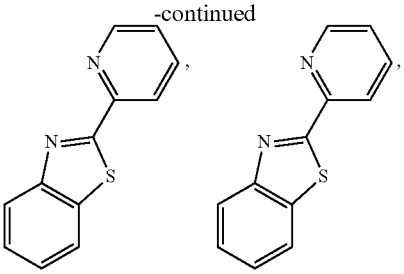

2. A device comprising the transition metal complex of claim 1 as an electron transport medium.
3. The device of claim 2, wherein the device is an electrochemical biosensor.
4. The device of claim 2, wherein the device is insertable.

* * * * *